US008429634B2

(12) United States Patent
Dembo et al.

(10) Patent No.: US 8,429,634 B2
(45) Date of Patent: Apr. 23, 2013

(54) SEMICONDUCTOR DEVICE, MEMORY CIRCUIT, AND MACHINE LANGUAGE PROGRAM GENERATION DEVICE, AND METHOD FOR OPERATING SEMICONDUCTOR DEVICE AND MEMORY CIRCUIT

(75) Inventors: Hiroki Dembo, Isehara (JP); Yoshiyuki Kurokawa, Sagamihara (JP); Masami Endo, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 1422 days.

(21) Appl. No.: 11/878,518

(22) Filed: Jul. 25, 2007

(65) Prior Publication Data

US 2008/0028377 A1    Jan. 31, 2008

(30) Foreign Application Priority Data

Jul. 26, 2006 (JP) ................................. 2006-203438

(51) Int. Cl.
*G06F 9/45* (2006.01)
(52) U.S. Cl.
USPC ........................... 717/153; 717/141; 712/202
(58) Field of Classification Search .................... 717/153
See application file for complete search history.

(56) References Cited

U.S. PATENT DOCUMENTS 4,607,332 A * 8/1986 Goldberg ..................... 714/6.13
4,811,208 A * 3/1989 Myers et al. .................. 711/132
5,638,506 A * 6/1997 Peterson et al. .............. 714/6.13

(Continued)

FOREIGN PATENT DOCUMENTS

| JP | 05-224947 A | 9/1993 |
|---|---|---|
| JP | 07-200295 A | 8/1995 |
| JP | 2001-085641 | 3/2001 |
| JP | 2001-202252 A | 7/2001 |
| JP | 2003-157200 | 5/2003 |

(Continued)

OTHER PUBLICATIONS

Samuel Larsen, Emmett Witchel, and Saman P. Amarasinghe. 2002. Increasing and Detecting Memory Address Congruence. In Proceedings of the 2002 International Conference on Parallel Architectures and Compilation Techniques (PACT '02). IEEE Computer Society, Washington, DC, USA, 18-29.*

(Continued)

*Primary Examiner* — Wei Zhen
*Assistant Examiner* — Matthew Brophy
(74) *Attorney, Agent, or Firm* — Eric J. Robinson; Robinson Intellectual Property Law Office, P.C.

(57) ABSTRACT

A semiconductor device has an arithmetic processing circuit provided with an arithmetic circuit and a control circuit and a memory circuit provided with a ROM and a RAM, where the arithmetic processing circuit and the memory circuit are connected to each other through an address bus and a data bus, a machine language program executed using the arithmetic processing circuit is stored in the ROM, the RAM has a plurality of banks, processing data obtained by executing the machine language program is divided into a plurality of stacks to be written to the plurality of banks, and the arithmetic processing circuit is operated in accordance with the machine language program so that, in the plurality of stacks stored in the plurality of banks, a stack of which data is not used until the machine language program is terminated is omitted and contiguous stacks are written to the same bank.

10 Claims, 33 Drawing Sheets

U.S. PATENT DOCUMENTS

| | | | | |
|---|---|---|---|---|
| 6,021,469 | A * | 2/2000 | Tremblay et al. | 711/125 |
| 6,249,844 | B1 * | 6/2001 | Schloss et al. | 711/122 |
| 6,263,401 | B1 * | 7/2001 | Ross et al. | 711/109 |
| 6,321,240 | B1 * | 11/2001 | Chilimbi et al. | 1/1 |
| 6,438,655 | B1 * | 8/2002 | Nicol et al. | 711/136 |
| 6,490,695 | B1 * | 12/2002 | Zagorski et al. | 714/38.11 |
| 6,529,400 | B1 * | 3/2003 | Bhavnagarwala et al. | 365/154 |
| 6,795,963 | B1 * | 9/2004 | Andersen et al. | 717/130 |
| 7,134,118 | B1 * | 11/2006 | McNutt | 717/138 |
| 7,266,641 | B2 | 9/2007 | Kamei et al. | |
| 7,280,396 | B2 * | 10/2007 | Li et al. | 365/185.03 |
| 7,647,481 | B2 * | 1/2010 | Rychlik | 712/220 |
| 7,675,808 | B2 | 3/2010 | Kurokawa | |
| 7,984,304 | B1 * | 7/2011 | Waldspurger et al. | 713/187 |
| 2007/0028194 | A1 | 2/2007 | Kurokawa | |
| 2007/0029994 | A1 | 2/2007 | Dembo | |
| 2007/0126059 | A1 | 6/2007 | Dembo et al. | |

FOREIGN PATENT DOCUMENTS

| | | |
|---|---|---|
| JP | 2004-178016 A | 6/2004 |
| JP | 2005-100240 A | 4/2005 |

OTHER PUBLICATIONS

N. AbouGhazaleh, B. Childers, D.Mosse', and R. Melhem, "Energy Conservation in Memory Hierarchies Using Power-Aware Cached-DRAM," Proc. Dagstuhl Seminar Power-Aware Computing Systems, Apr. 2005.*

Emmett Witchel, Sam Larsen, C. Scott Ananian, and Krste Asanovi;. 2001. Direct addressed caches for reduced power consumption. In Proceedings of the 34th annual ACM/IEEE international symposium on Microarchitecture (MICRO 34). IEEE Computer Society, Washington, DC, USA, 124-133.*

Larsen, S. and Witchel, E. and Amarasinghe, Techniques for increasing and detecting memory alignment MIT. (2001).*

Luca Benini, Alberto Macii, and Massimo Poncino. 2000. A recursive algorithm for low-power memory partitioning. In Proceedings of the 2000 international symposium on Low power electronics and design (ISLPED '00), David Blaauw, Christian Enz, Thad Gabara, and Enrico Macii (Eds.). ACM, New York, NY, USA, 78-83.*

Delaluz et al., "Hardware and Software Techniques for Controlling DRAM Power Modes", IEEE Transactions on Computers, vol. 50, No. 11, Nov. 2001, pp. 1154-1173.

Marchal et al., "SDRAM—Energy-Aware Memory Allocation for Dynamic Multi-Media Applications on Multi-Processor Platforms", Proceedings of the Design, Automation and Test in Europe Conference and Exhibition, IEEE Computer Society, 2003, pp. 1-6.

Search Report (Application No. 07014617.0) dated Jan. 2, 2008.

Hennessy et al., *Computer Architecture: A Quantitative Approach*, Third Edition, Morgan Kaufmann Publishers, 2003, pp. 2-86.

* cited by examiner

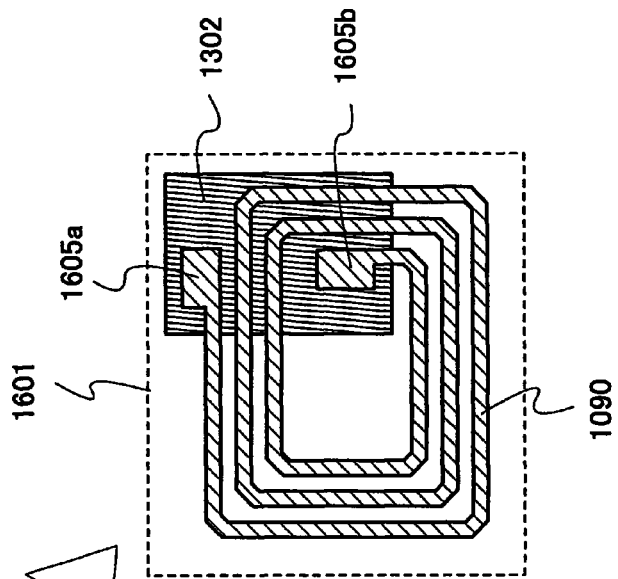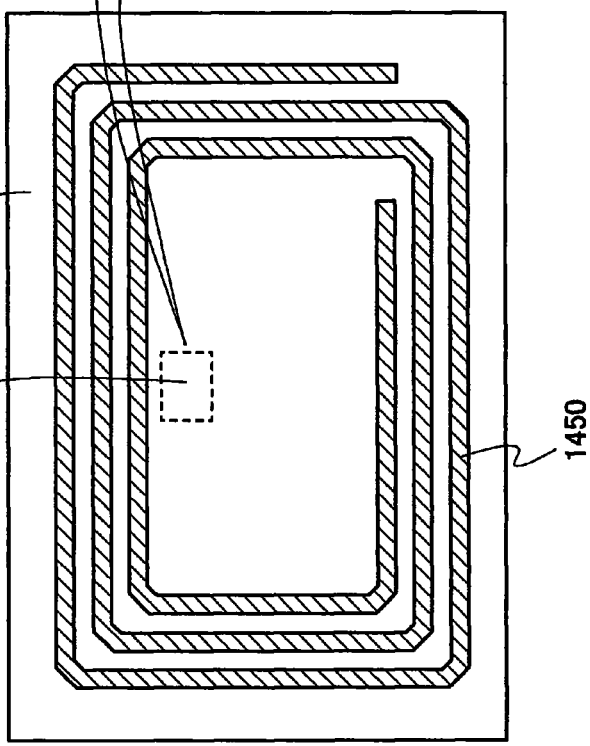
FIG. 26A
FIG. 26B

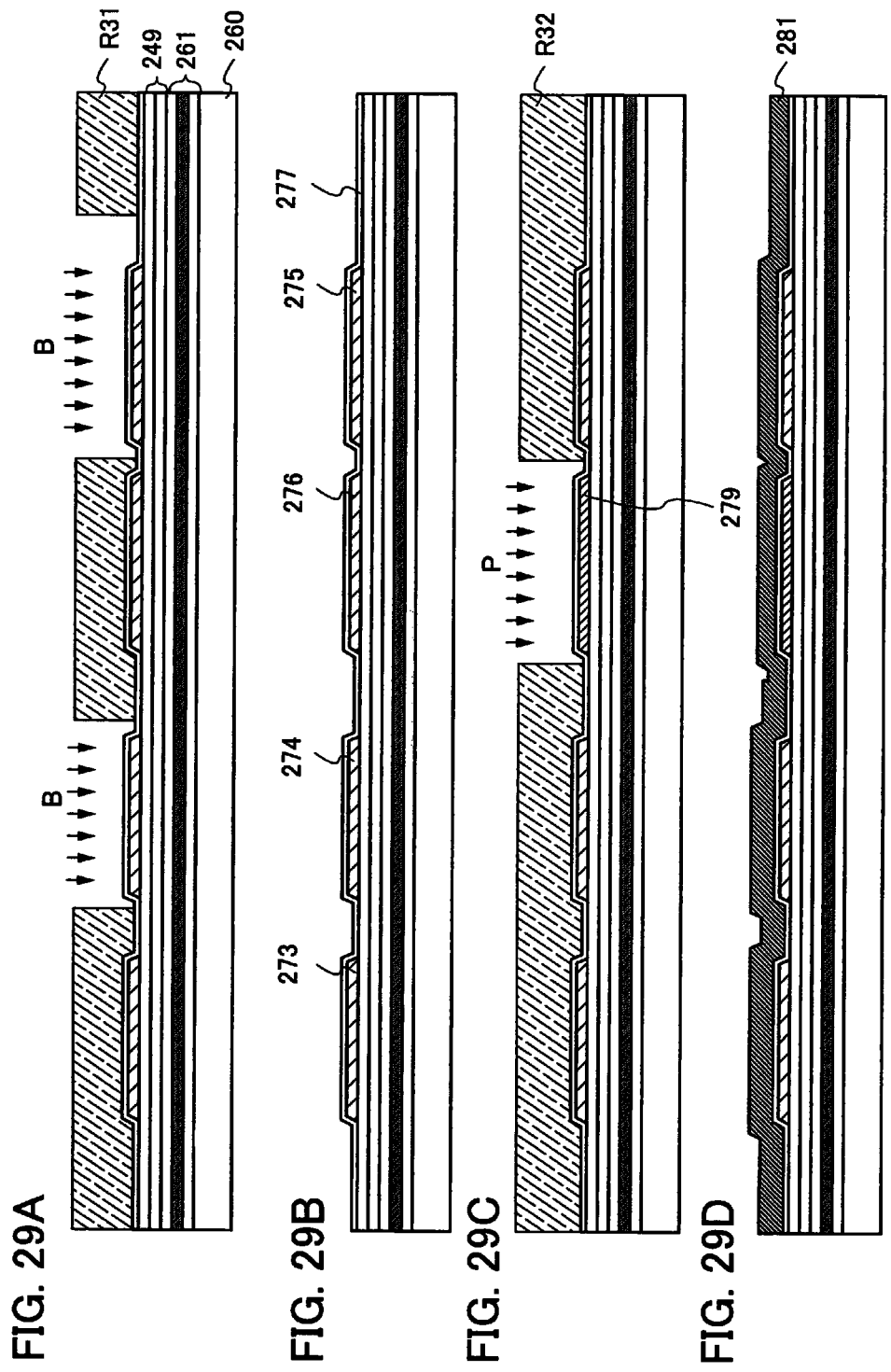

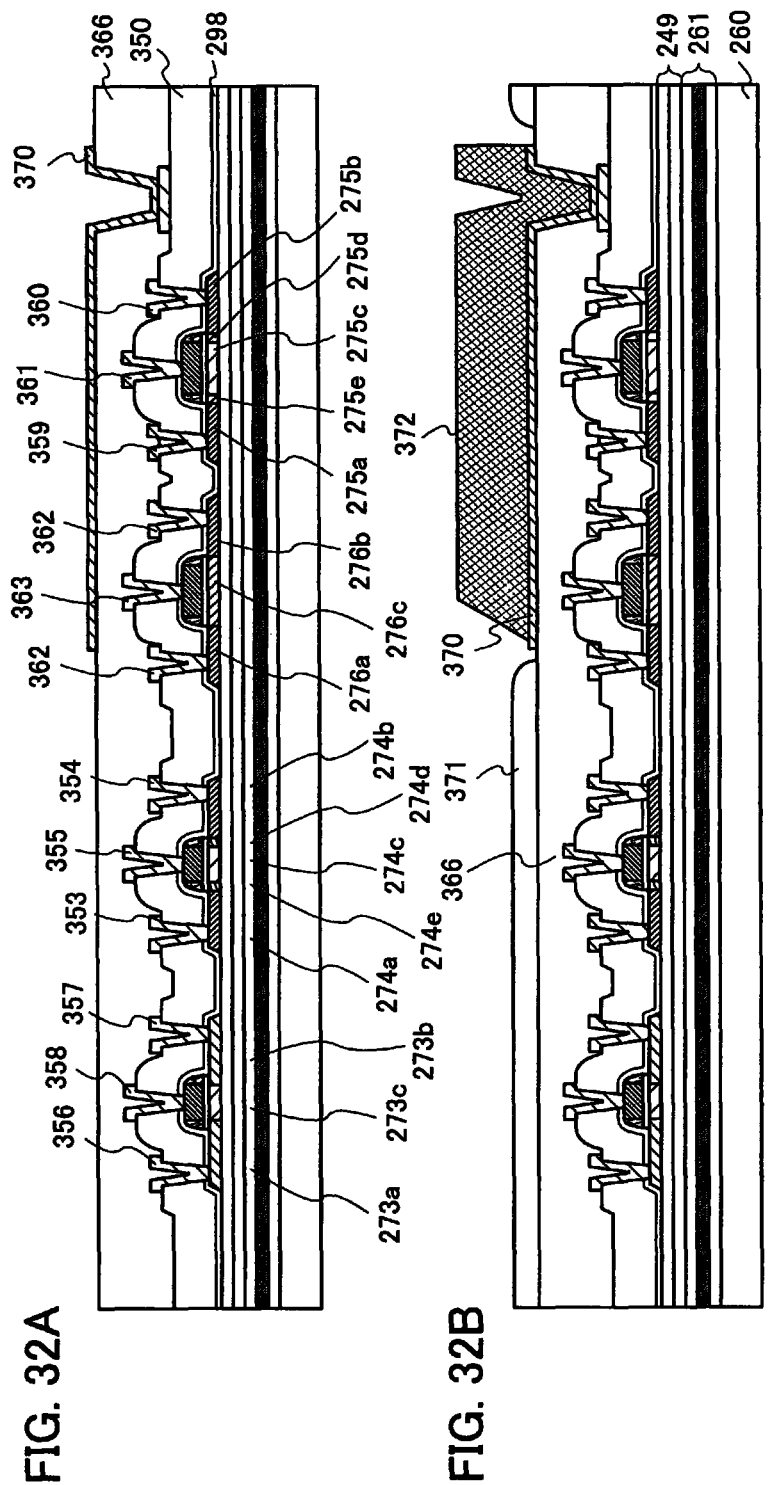

SEMICONDUCTOR DEVICE, MEMORY CIRCUIT, AND MACHINE LANGUAGE PROGRAM GENERATION DEVICE, AND METHOD FOR OPERATING SEMICONDUCTOR DEVICE AND MEMORY CIRCUIT

BACKGROUND OF THE INVENTION

1. Field of the Invention

The present invention relates to a semiconductor device and a memory circuit, and a method for operating the semiconductor device and the memory circuit. Specifically, the present invention relates to a memory circuit which stores a machine language program generated from a high-level language program and a semiconductor device incorporating the memory circuit, and a method for operating the semiconductor device and the memory circuit. Further, the present invention relates to a machine language program generation device which codes the machine language program stored in the semiconductor device and the memory circuit.

2. Description of the Related Art

In recent years, information equipment utilizing a semiconductor device has been spreading due to development of electronics and the coming of an advanced information society, and has been utilized in various fields such as military affairs, medical treatment, communication, education, and commercial transaction. Particularly, in information equipment, a semiconductor device which performs operation in accordance with a program is referred to as a computer. It is expected that information equipment mounted with the computer spreads more and more in the future.

The computer which is widely utilized at present has an arithmetic processing circuit and a memory circuit, and operates in accordance with a machine language program stored in the memory circuit. The computer changes its function by rewriting the machine language program stored in the memory circuit. Such an architecture concept of the computer is referred to as a program built-in system (also referred to as a stored program system). For example, Non-Patent Document 1 (Non-Patent Document 1: John L. Hennessy and David A. Patterson, "Computer Architecture: A Quantitative Approach", Third Edition, Morgan Kaufmann Publishers, pp. 2-86, 2003) shows a configuration method of a stored program computer.

In a computer mounted with an arithmetic processing circuit and a memory circuit, computer performance is determined by operation speed of the memory circuit. For example, a machine language program executed by the arithmetic processing circuit is sequentially read from the memory circuit and executed. Further, when the machine language program is executed by the arithmetic processing circuit, the arithmetic processing circuit reads and writes processing data from/to the memory circuit. That is, the semiconductor device mounted with the arithmetic processing circuit and the memory circuit requires a high-speed memory circuit to achieve high-speed operation.

However, there is a problem that power consumption of the semiconductor device equipped with the memory circuit becomes high as the operation speed of the memory circuit becomes high. Further, in consideration of the maximum power consumption of a memory, it is necessary to provide measures against power source allotment, heat dissipation, and the like in designing a semiconductor device mounted with a memory circuit, leading to increase in design cost proportional to power consumption. Accordingly, a portable computer driven with a battery is particularly required to reduce power consumption of a semiconductor device.

There are various methods for reducing power consumption of a memory circuit. For example, a method is proposed, in which power consumption is reduced by dividing a memory into block units and arranging a memory block, where instruction routines are stored in sequence of high execution frequencies of the instruction routines, in sequence of low memory address of a memory circuit (for example, Patent Document 1: Japanese Published Patent Application No. 2003-157200). Further, a method is disclosed in which low power consumption is achieved by optimizing the position and the number of transfer gates inserted in a memory circuit (for example, Patent Document 2: Japanese Published Patent Application No. 2001-85641).

SUMMARY OF THE INVENTION

As described above, reduction of power consumption is attempted by various methods. The power consumption of the memory circuit is better the smaller it is; however, at present it is hard to say that low power consumption is sufficiently attempted. Thus, further low power consumption is desired.

It is an object of the present invention to propose a semiconductor device and a memory circuit, which are capable of reducing power consumption, and a method for operating the semiconductor device and the memory circuit.

It is another object of the present invention to propose a machine language program generation device which codes a machine language program stored in a semiconductor device and a memory circuit.

One aspect of the present invention is a semiconductor device in which a machine language program is generated from a high-level language program by a program conversion means, and that the semiconductor device is operated in accordance with the generated machine language program, whereby power consumption of a memory circuit is reduced.

One aspect of the present invention is a semiconductor device provided with an arithmetic processing circuit including an arithmetic circuit and a control circuit; and a memory circuit provided with a ROM (read only memory) and a RAM (random access memory), where the arithmetic processing circuit and the memory circuit are connected to each other through an address bus and a data bus, a machine language program executed using the arithmetic processing circuit is stored in the ROM, the RAM has a plurality of banks, processing data obtained by executing the machine language program is divided into a plurality of stacks to be written to the plurality of banks, and the arithmetic processing circuit is operated in accordance with the machine language program so that, in the plurality of stacks, a stack of which data is not read until the machine language program is terminated is omitted and stacks with contiguous writing are written to the same bank.

In the above structure of the semiconductor device, the machine language program is generated from a high-level language program by the program conversion means and stored. More specifically, the machine language program is obtained in such a manner that a high-level language program is decomposed into a token sequence by a lexical analysis means, the token sequence is analyzed by a syntactic analysis means and a syntax tree is built, the syntax tree is converted into an intermediate language by a semantic analysis means, the intermediate language is converted into an executable code by a code generation means, the executable code is analyzed by a stack analysis means and an analysis result is outputted, and the executable code is converted by an optimization means with the use of the analysis result.

Another aspect of the present invention is a method for operating a semiconductor device, having an arithmetic processing circuit provided with an arithmetic circuit and a control circuit and a memory circuit provided with a ROM and a RAM, where the arithmetic processing circuit and the memory circuit are connected to each other through an address bus and a data bus, a machine language program executed using the arithmetic processing circuit is stored in the ROM, the RAM has a plurality of banks, including the steps of: dividing processing data obtained by executing the machine language program into a plurality of stacks to be written to the plurality of banks; and in the plurality of stacks, a stack of which data is not read until the machine language program is terminated is omitted, and stacks with contiguous writing are written to the same bank.

Another aspect of the present invention is a memory circuit where a high-level language program is decomposed into a token sequence by a lexical analysis means, the token sequence is analyzed by a syntactic analysis means and a syntax tree is built, the syntax tree is converted into an intermediate language by a semantic analysis means, the intermediate language is converted into an executable code by a code generation means, the executable code is analyzed by a stack analysis means and an analysis result is output, the executable code is converted into a machine language program by an optimization means with the use of the analysis result, the machine language program is stored in a ROM, and the machine language program stored in the ROM is operated.

Another aspect of the present invention is a memory circuit having a ROM in which a machine language program is stored, and a RAM provided with a plurality of banks, where processing data obtained by executing the machine language program is divided into a plurality of stacks to be written to a plurality of banks, and the machine language program is operated so that, in the plurality of stacks, a stack of which data is not read until the machine language program is terminated is omitted and stacks with contiguous writing are arranged in the same bank.

In the above structure of the memory circuit, the machine language program is generated from a high-level language program by the program conversion means and stored. More specifically, the machine language program is obtained in such a manner that a high-level language program is decomposed into a token sequence by a lexical analysis means, the token sequence is analyzed by a syntactic analysis means and a syntax tree is built, the syntax tree is converted into an intermediate language by a semantic analysis means, the intermediate language is converted into an executable code by a code generation means, the executable code is analyzed by a stack analysis means and an analysis result is outputted, and the executable code is converted by an optimization means with the use of the analysis result.

Another aspect of the present invention is a method for operating a memory circuit, having a ROM in which a machine language program is stored and a RAM provided with a plurality of banks, including the steps of dividing processing data obtained by executing the machine language program into a plurality of stacks to be written to a plurality of banks, and, in the plurality of stacks, a stack of which data is not read until the machine language program is terminated is omitted, and stacks with contiguous writing are written to the same bank.

According to the present invention, in a semiconductor device including an arithmetic processing circuit and a memory circuit, a machine language program suitable for a memory circuit is executed by a program conversion means, whereby power consumption can be reduced. Accordingly, a high-performance semiconductor device consuming low power can be provided. Further, in the semiconductor device including an arithmetic processing circuit and a memory circuit, even when the specification is changed in accordance with change in method of operation, it is not necessary to remake the semiconductor device again from the stage of mask design. Therefore, manufacturing cost can be reduced and manufacturing time can be shortened. Furthermore, since the mask design is not changed, there is no concern that a semiconductor device formed after changing the mask design will malfunction.

BRIEF DESCRIPTION OF THE DRAWINGS

In the accompanying drawings:

FIGS. 26A and 26B illustrate an example of a semiconductor device of the present invention;

FIGS. 29A to 29D illustrate an example of a method for manufacturing a semiconductor device of the present invention;

FIGS. 32A and 32B illustrate an example of a method for manufacturing a semiconductor device of the present invention.

DETAILED DESCRIPTION OF THE INVENTION

Figure 1:
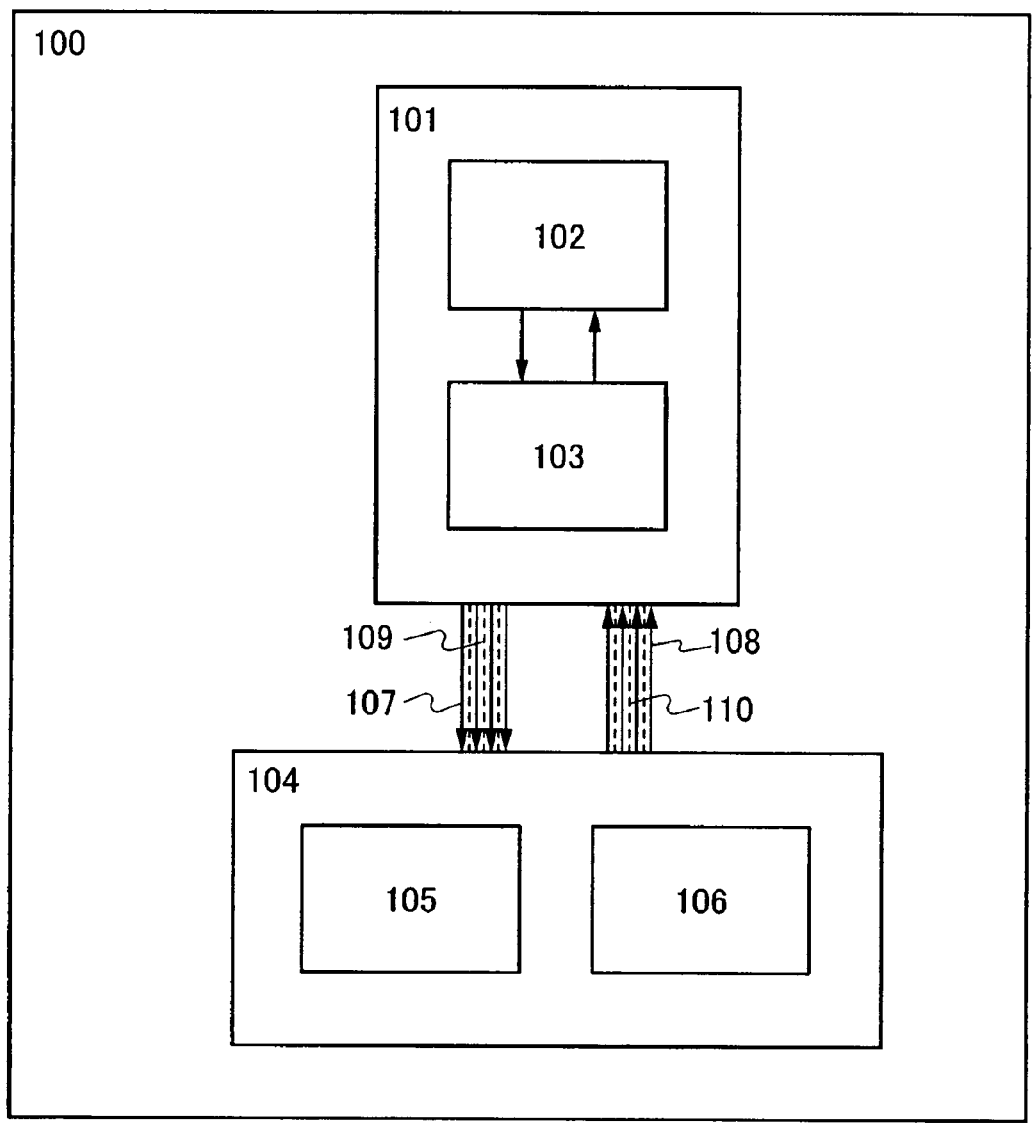
FIG. 1 illustrates an example of a semiconductor device of the present invention.

Embodiment Modes of the present invention will be described below with reference to drawings. However, the present invention is not limited to explanation to be given below, and it is to be easily understood that various changes and modifications in modes and details thereof will be apparent to those skilled in the art without departing from the purpose and the scope of the present invention. Therefore, the present invention should not be interpreted as being limited to the description of the embodiment modes to be given below. It is to be noted that, in embodiment of the present invention which will be described below, reference numerals denoting the same portions are used in common through different drawings in some cases.

Embodiment Mode 1

In this embodiment mode, an example of a semiconductor device and a memory circuit for realizing a function of reducing power consumption in the present invention is described.

FIG. 1 shows a block diagram of a semiconductor device on which a function of reducing power consumption is mounted in the present invention.

In FIG. 1, a semiconductor device 100 has an arithmetic processing circuit 101 and a memory circuit 104. The arithmetic processing circuit 101 has an arithmetic circuit 102 and a control circuit 103. The memory circuit 104 has a ROM 105 and a RAM 106. The arithmetic processing circuit 101 and the memory circuit 104 are connected to each other by an address bus 107 and a data bus 108. An address bus signal 109 flowing in the address bus 107 is a signal which specifies the address in the memory circuit and is sent from the arithmetic processing circuit 101 to the memory circuit 104. A data bus signal 110 flowing in the data bus 108 is a signal for sending data of the address, which is specified by the address bus signal 109, in the memory circuit from the memory circuit 104 to the arithmetic processing circuit 101.

Figure 2:
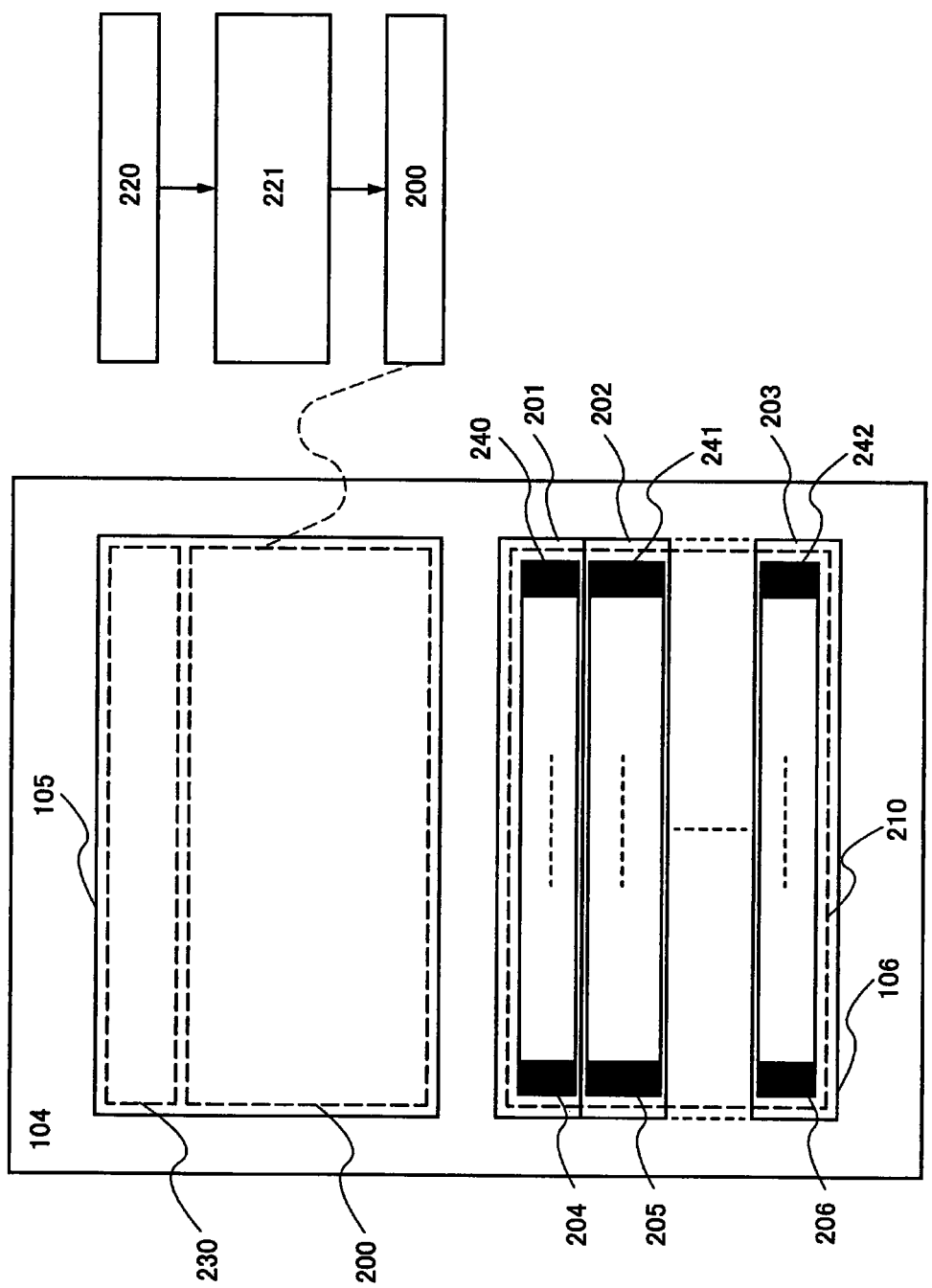
FIG. 2 illustrates an example of a memory circuit in a semiconductor device of the present invention.

In the ROM 105 provided in the memory circuit 104, data of a startup routine 230 and a machine language program 200 (also referred to as a main program) are stored, and in the RAM 106, processing data 210 obtained by executing the machine language program 200 is stored (see FIG. 2). As the ROM 105, a nonvolatile memory such as a mask ROM (Read Only Memory), an organic memory, or an EEPROM can be used, and as the RAM 106, a volatile memory such as a static memory (SRAM: Static Random Access Memory) or a dynamic memory (DRAM: Dynamic Random Access Memory) can be used.

The data of the machine language program 200 stored in the ROM 105 is generated from a high-level language program 220 by a machine language program generation device (also referred to as a program conversion means) 221. The RAM 106 is divided into n banks, and the processing data 210 obtained by executing the machine language program 200 is divided into a plurality of stacks to be stored in the banks of the RAM. Specifically, a first stack 204 of a first bank 201 to an m-th stack 240 of the first bank 201 are stored in the first bank 201, a first stack 205 of a second bank 202 to an m-th stack 241 of the second bank 202 are stored in the second bank 202, and a first stack 206 of an n-th bank 203 to an m-th stack 242 of the n-th bank 203 are stored in the n-th bank 203. The RAM 106 has an address showing a place of data inside. The initial address starts from 0, and the number of the address increases as the size of the RAM 106 increases. The first bank 201 starts from a 0-th address and the n-th bank 203 ends with the last address. Further, the number of the address of the ROM 105 also increases as the size of the ROM 105 increases.

The data of the startup routine 230 is added when the data of the machine language program 200, which is generated from the high-level language program 220 by the machine language program generation device 221, is stored in the ROM 105. In the startup routine 230, an instruction is written, by which a first address (also referred to as a stack pointer) of the RAM 106 is set. The processing data 210 obtained by executing the machine language program 200 stored in the ROM 105 is stored in the RAM 106. The startup routine 230 is executed before the machine language program is operated. For example, when an instruction by which the first stack 204 of the first bank 201 corresponding to a 0-th address of the RAM is set as a stack pointer is written to the startup routine 230, the first stack 204 of the first bank 201 is a first stack pointer. Therefore, when the machine language program 200 is executed, the arithmetic circuit uses subsequent stacks of the first stack 204 of the first bank 201 to store the processing data 210.

Figure 4:
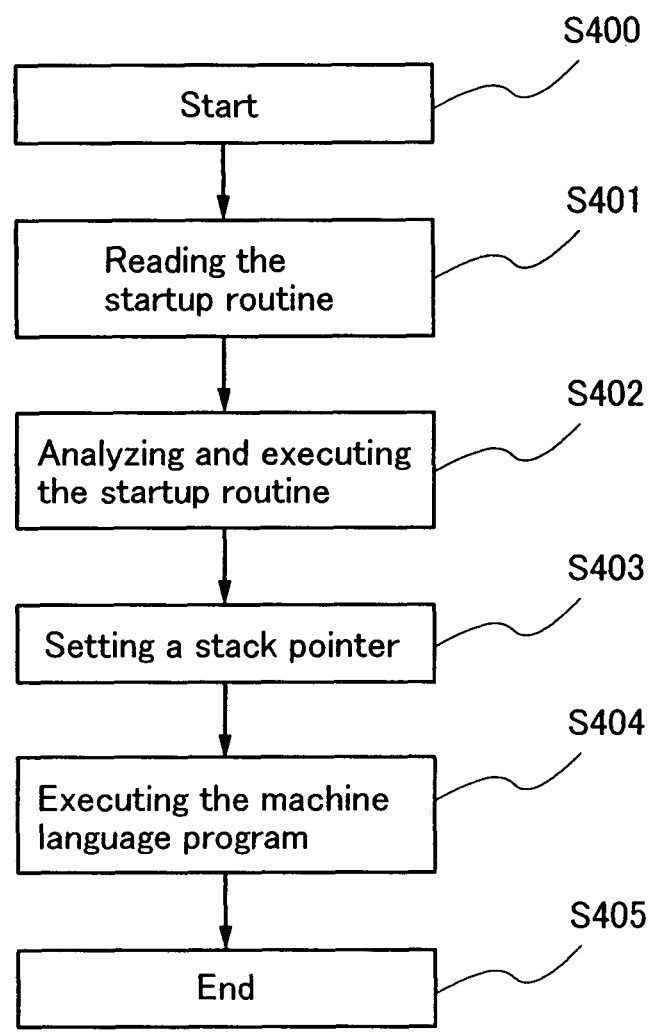
FIG. 4 is a view illustrating generation of a machine language program in a semiconductor device of the present invention.

Next, an example of operation of the semiconductor device 100 in FIG. 1 is described with reference to a flowchart of FIG. 4.

When the arithmetic processing circuit 101 included in the semiconductor device 100 starts operation (S400), the arithmetic processing circuit 101 outputs "0" to the address bus 107 as the address bus signal 109, and reads the startup routine 230 of the ROM 105 starting from an address "0" as the data bus signal 110 through the data bus 108 (S401). The arithmetic circuit 102 in the arithmetic processing circuit analyzes and executes data included in the startup routine 230 (S402). The arithmetic circuit 102 sets a stack pointer in order to store subsequent processing data (S403). Finally, the arithmetic circuit 102 executes the machine language program 200 (S404), and terminates the operation (S405).

In the semiconductor device shown in this embodiment mode, the processing data 210 obtained by executing the machine language program 200 of the ROM 105 is divided into a plurality of stacks to be stored in the RAM 106 provided with a plurality of (here, n) banks. At this time, by the operation of the arithmetic processing circuit 101 in accordance with the machine language program 200, a stack which is not used until the machine language program 200 is terminated, that is, a stack of which data is not read until the machine language program 200 is terminated, is omitted. Further, by the operation of the arithmetic processing circuit 101 in accordance with the machine language program 200, the machine language program is optimized so that stacks with contiguous writing are written to the same bank. As a result, power consumption of the memory circuit and the semiconductor device can be reduced.

Hereinafter, generation of the machine language program 200 using the machine language program generation device 221 is described with reference to drawings.

Figure 3:
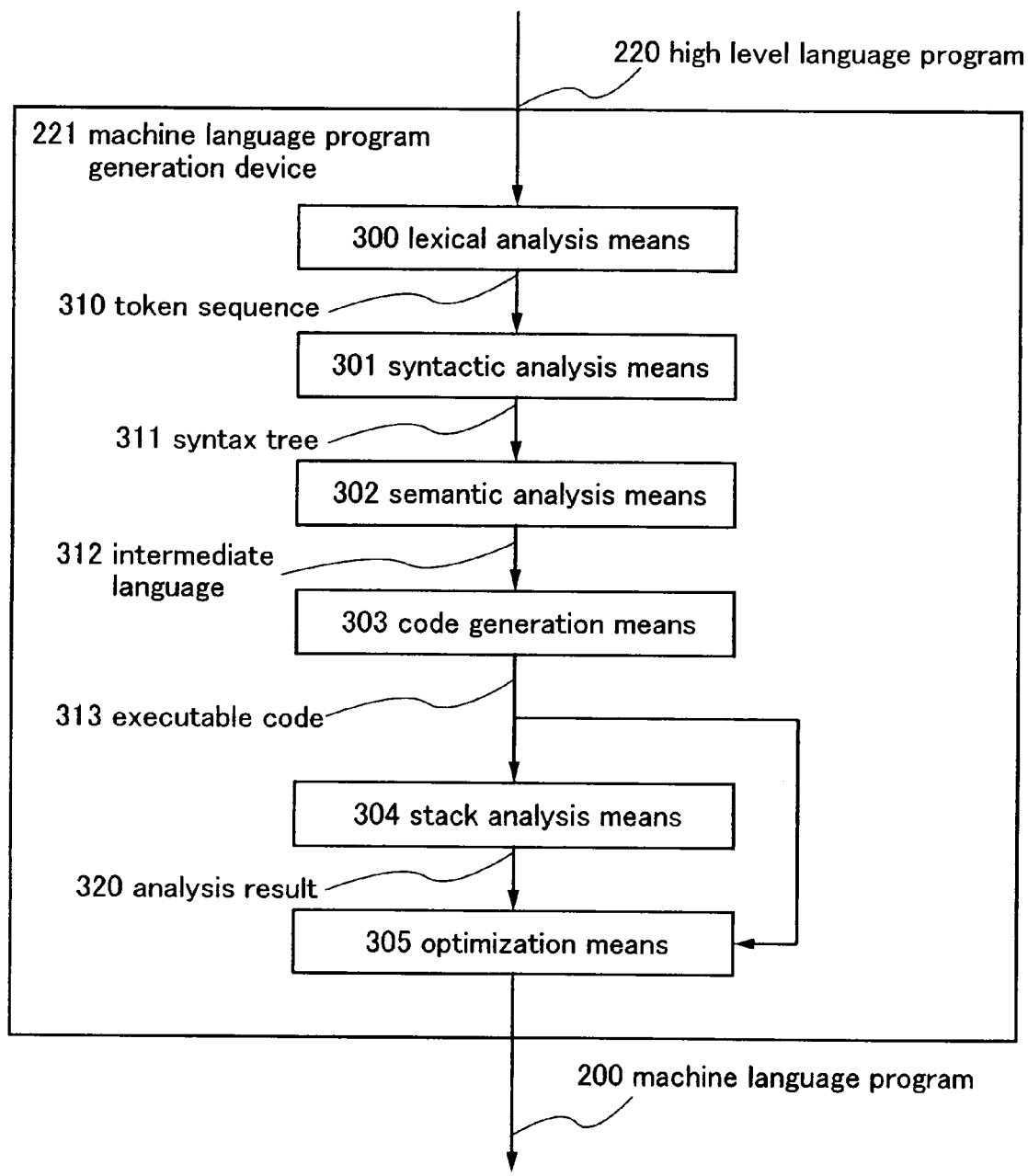
FIG. 3 is a view illustrating generation of a machine language program in a semiconductor device of the present invention.

The machine language program generation device 221 includes a lexical analysis means 300, a syntactic analysis means 301, a semantic analysis means 302, a code generation means 303, a stack analysis means 304, and an optimization means 305 (see FIG. 3). The high-level language program 220 is decomposed into a token sequence 310 (also referred to as an element) by the lexical analysis means 300, relation of tokens in the token sequence 310 is analyzed by the syntactic analysis means 301, and a syntax tree 311 is built. Then, an intermediate language 312 is produced based on the syntax tree 311 by the semantic analysis means 302. The intermediate language 312 is converted into an executable code 313, which can be executed by the arithmetic processing circuit 101, by the code generation means 303. The stack analysis means 304 analyzes the executable code 313 and a status of use of the stack is examined and outputs an analysis result 320. Finally, the optimization means 305 optimizes the executable code 313 in accordance with the analysis result 320, makes the executable code 313 be a machine language program 200, and outputs the machine language program 200.

Hereinafter, a process of generating the machine language program 200 by the machine language program generation device 221 in FIG. 3 is described with reference to FIGS. 5 to 14.

Figure 5:
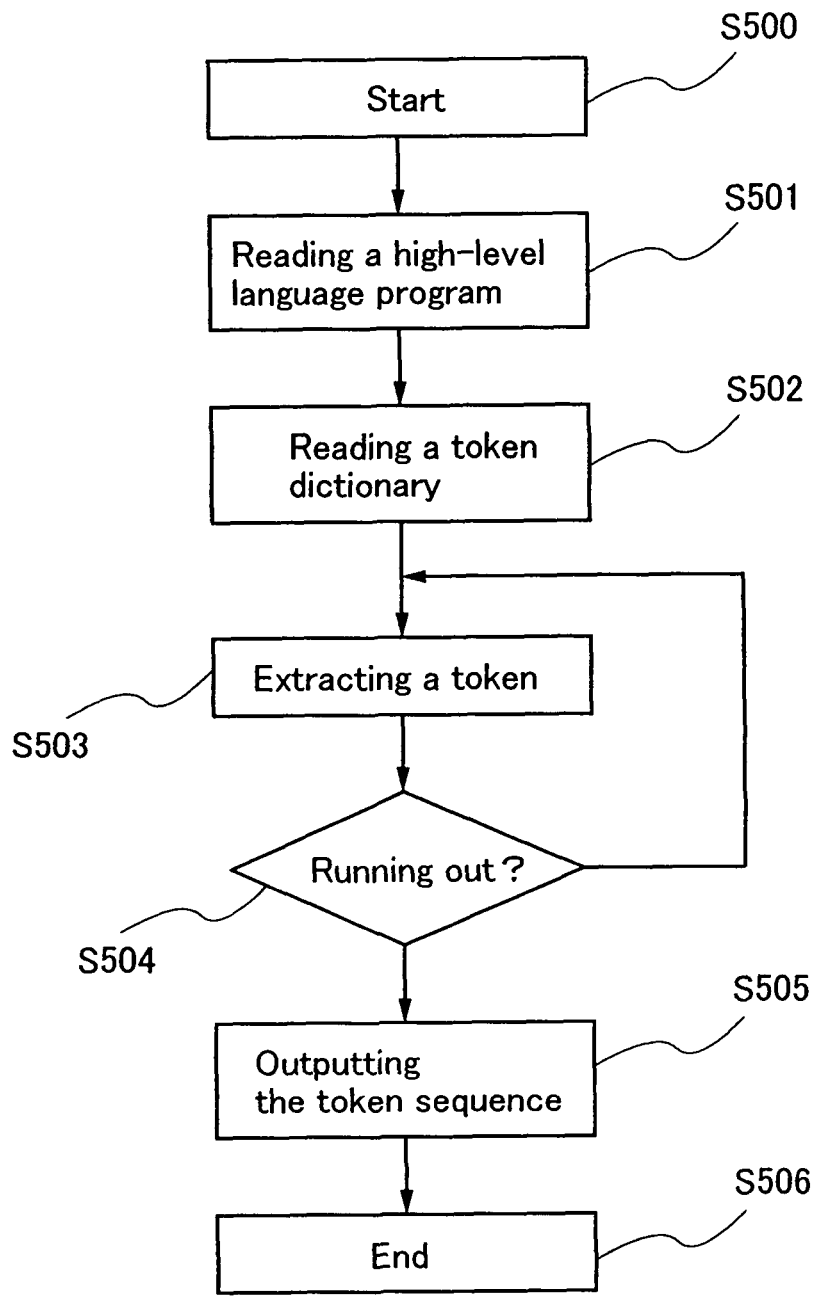
FIG. 5 is a view illustrating generation of a machine language program in a semiconductor device of the present invention.

FIG. 5 shows a flowchart of the lexical analysis means 300. Here, processing is performed, in which the high-level language program 220 is processed to be decomposed into a token sequence 310 including a plurality of tokens. When the lexical analysis means 300 starts operation (S500), the lexical analysis means 300 reads a high-level language program 220 (S501). Then, the lexical analysis means 300 reads a token dictionary compatible with the high-level language program 220 (S502). The lexical analysis means 300 searches in the high-level language program 220 with reference to the token dictionary which has been read, and a portion which matches a reference token in the token dictionary is extracted as a token (S503). When the high-level language program 220 to be processed runs out (S504), the lexical analysis means 300 outputs the token sequence 310 (S505), and terminates the operation (S506).

Figure 6:
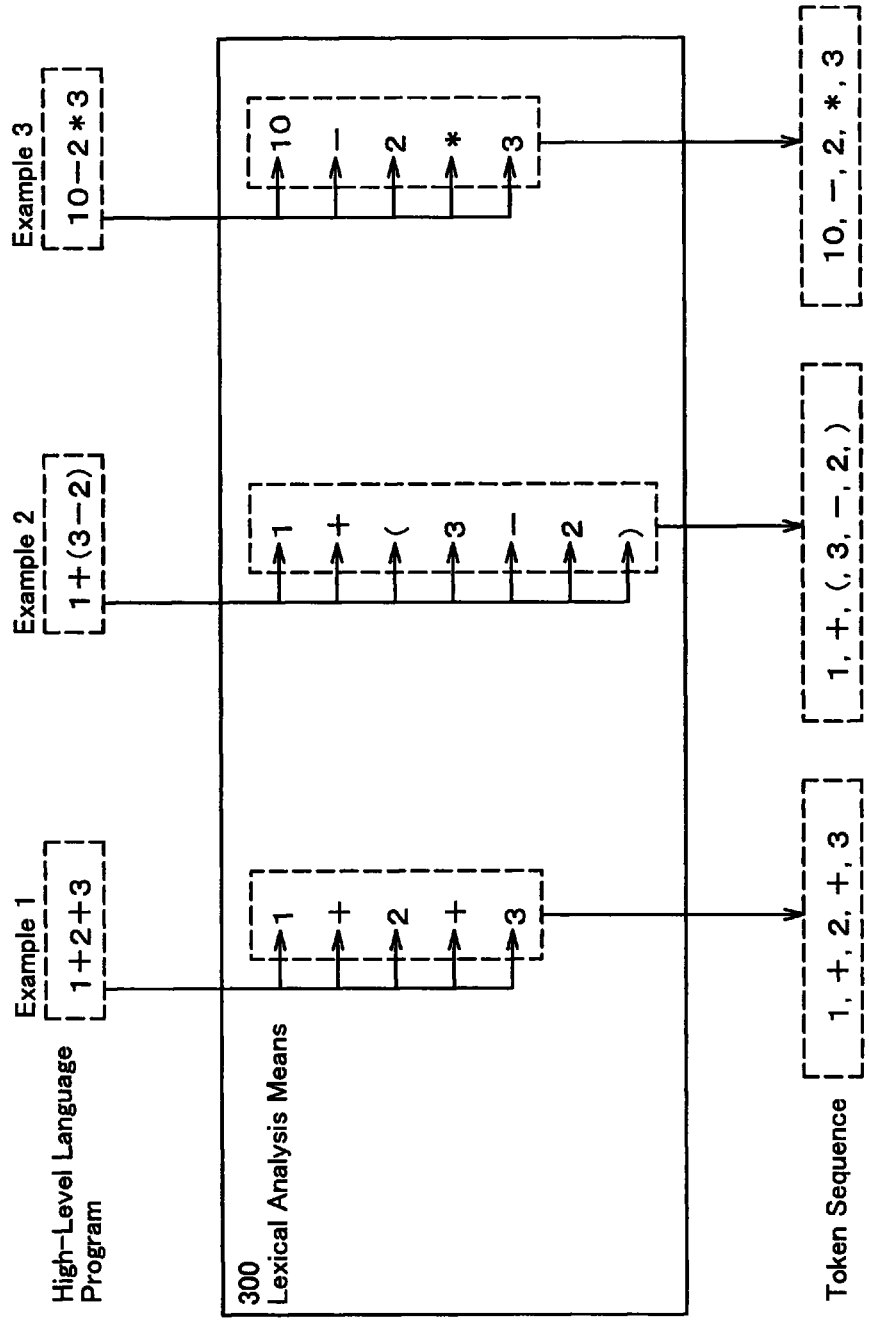
FIG. 6 is a view illustrating generation of a machine language program in a semiconductor device of the present invention.

FIG. 6 specifically shows processing by the lexical analysis means 300. Table 1 shows a high-level language program herein used as an example and a result of the processing. Since there are many kinds of reference tokens, as an example, numeric values, parentheses, and operators (+, −, *) are used as reference tokens here. It is to be noted that the numeric value is expressed by decimal notation, and tokens in a sequence are separated by commas.

TABLE 1

|  | High-level language program | Token sequence |
| --- | --- | --- |
| Example 1 | 1 + 2 + 3 | 1, +, 2, +, 3 |
| Example 2 | 1 + (3 − 2) | 1, +, (, 3, −, 2, ) |
| Example 3 | 10 − 2 * 3 | 10, −, 2, *, 3 |

When a high-level language program "1+2+3" of an example 1 in Table 1 is processed by the lexical analysis means 300, the lexical analysis means 300 reads a token dictionary in S502 of FIG. 5. Subsequently, the lexical analysis means 300 compares a reference token and the high-level language program in S503 of FIG. 5, and a portion of the high-level language program which matches the reference token first is extracted as a token sequence. Here, specifically, the numeric value "1" is extracted as a token. Then, the lexical analysis means 300 checks whether the high-level language program remains or not in S504 of FIG. 5, and if the high-level language program remains, the lexical analysis means 300 compares the reference token and the high-level language program with each other again in S503 of FIG. 5. Here, the high-level language program "+2+3" remains; therefore, the lexical analysis means 300 compares the reference token and the high-level language program with each other again, and the operator "+" is extracted as a token. As the processing from S503 to S504 in FIG. 5 is repeated three times, tokens "2", "+", and "3" are extracted. And then, in S504 in FIG. 5, checking is performed whether the high-level language program remains or not. Here, since the high-level language program does not remain, the lexical analysis means 300 outputs a token sequence "1, +, 2, +, 3", and terminates the processing.

When a high-level language program "1+(3−2)" of an example 2 in Table 1 is processed by the lexical analysis means 300, the lexical analysis means 300 reads a token dictionary in S502 of FIG. 5. Subsequently, the lexical analysis means 300 compares a reference token and the high-level language program in S503 of FIG. 5, and a portion of the high-level language program which matches the reference token first is extracted as a token sequence. Here, specifically, the numeric value "1" is extracted as a token. Then, the lexical analysis means 300 checks whether the high-level language program remains or not in S504 of FIG. 5, and if the high-level language program remains, the lexical analysis means 300 compares the reference token and the high-level language program with each other again in S503 of FIG. 5. Here, the high-level language program "+(3−2)" remains; therefore, the lexical analysis means 300 compares the reference token and the high-level language program with each other again, and the operator "+" is extracted as a token. As the processing from S503 to S504 in FIG. 5 is repeated five times, tokens "(", "3", "−", "2", and ")" are extracted. And then, in S504 in FIG. 5, checking is performed whether the high-level language program remains or not. Here, since the high-level language program does not remain, the lexical analysis means 300 outputs a token sequence "1, +, (, 3, −, 2,)", and terminates the processing.

When a high-level language program "10−2*3" of an example 3 in Table 1 is processed by the lexical analysis means 300, the lexical analysis means 300 reads a token dictionary in S502 of FIG. 5. Subsequently, the lexical analysis means 300 compares a reference token and the high-level language program in S503 of FIG. 5, and a portion of the high-level language program which matches the reference token first is extracted as a token sequence. Here, specifically, the numeric value "10" is extracted as a token. Then, the lexical analysis means 300 checks whether the high-level language program remains or not in S504 of FIG. 5, and if the high-level language program remains, the lexical analysis means 300 compares the reference token and the high-level language program with each other again in S503 of FIG. 5. Here, the high-level language program "−2*3" remains; therefore, the lexical analysis means 300 compares the reference token and the high-level language program with each other again, and the operator "−" is extracted as a token. As the processing from S503 to S504 in FIG. 5 is repeated three times, tokens "2", "*", and "3" are extracted. And then, in S504 in FIG. 5, checking is performed whether the high-level language program remains or not. Here, the high-level language program does not remain, the lexical analysis means 300 outputs a token sequence "10, −, 2, *, 3", and terminates the processing.

Figure 7:
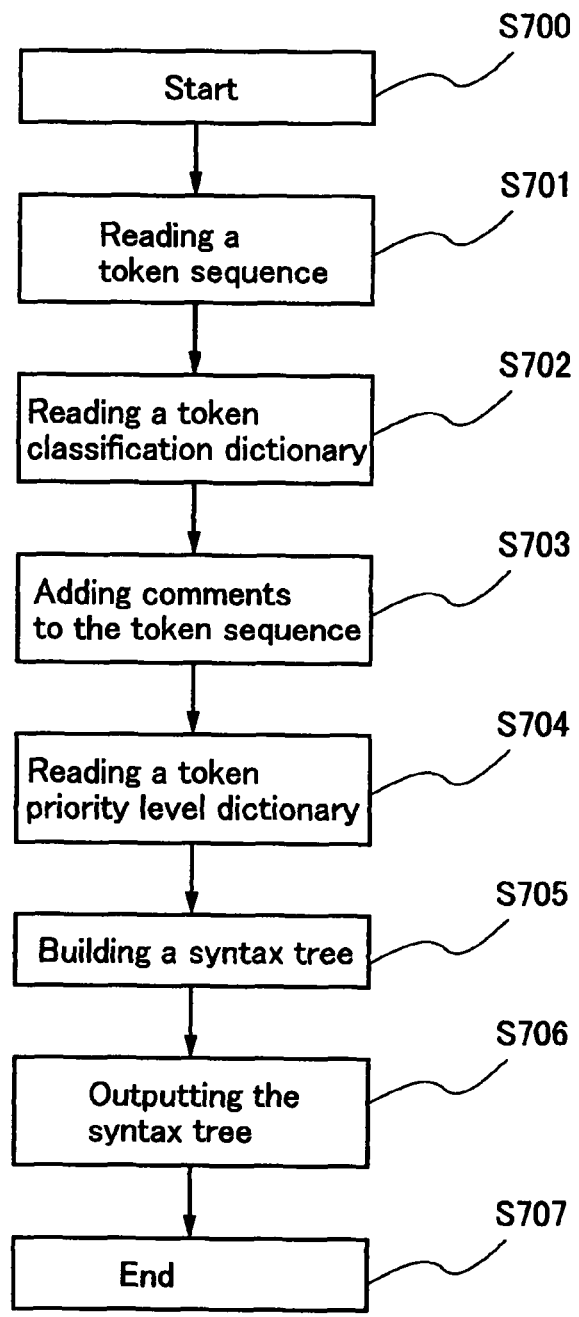
FIG. 7 is a view illustrating generation of a machine language program in a semiconductor device of the present invention.

FIG. 7 shows a flowchart of the syntactic analysis means 301. Here, relation of tokens is analyzed using a structure expressed by a tree (also referred to as a syntax tree). When the syntactic analysis means 301 starts operation (S700), the syntactic analysis means 301 reads a token sequence (S701). Then, the syntactic analysis means 301 reads a token classification dictionary (S702). Then, the syntactic analysis means 301 adds a comment to the token sequence in accordance with the token classification dictionary (S703), and reads a token priority level dictionary (S704). Then, the syntactic analysis means 301 arranges tokens in the token sequence in accordance with the token priority level dictionary to build a syntax tree (S705). Finally, the syntactic analysis means 301 outputs the syntax tree (S706), and terminates the operation (S707). The syntax tree is such that tokens analyzed by the syntactic analysis means 301 are arranged in a tree shape.

Figure 8:
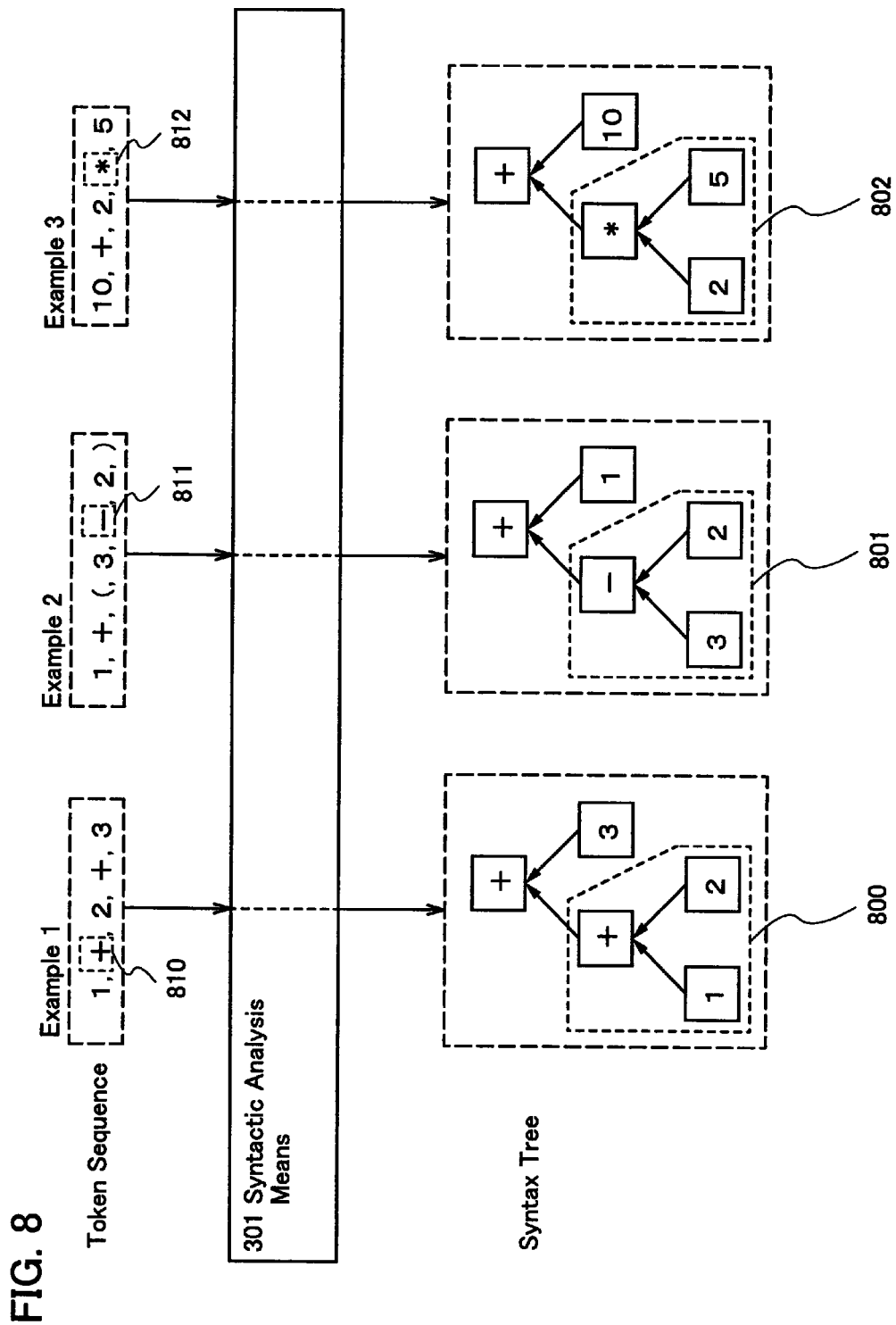
FIG. 8 is a view illustrating generation of a machine language program in a semiconductor device of the present invention.

FIG. 8 specifically shows processing by the syntactic analysis means 301. The priority level of tokens here is priority-ordered in such a way that "a formula", "an operator (*)", "an operator (+, −)", and "a numeric value" in decreasing priority order, as an example. When there are tokens of the same kind, an antecedent token is considered to have a higher priority. It is to be noted that the numeric value is expressed by decimal notation, and tokens in a sequence are separated by commas.

When a token sequence "1, +, 2, +, 3" of an example 1 in FIG. 8 is processed by the syntactic analysis means 301, the syntactic analysis means 301 reads a token classification dictionary in S702 of FIG. 7. The syntactic analysis means 301 adds a comment to a token in the token sequence in accordance with its kind in S703 of FIG. 7. Specifically, the token sequence "1, +, 2, +, 3" becomes "a numeric value 1, an operator +, a numeric value 2, an operator +, a numeric value 3". Then, the syntactic analysis means 301 reads the token priority level dictionary in S704 of FIG. 7. The syntactic analysis means 301 converts the tokens into a syntax tree from the token having a higher priority level, based on the comment added to the token sequence. Specifically, since an operator + 810 has the highest priority level among them, a partial syntax tree 800 in the syntax tree is created first. The similar operation is repeated until the token sequence runs out, and the processing is terminated when the remaining token sequence runs out.

When a token sequence "1, +, (, 3, −, 2,)" of an example 2 in FIG. 8 is processed by the syntactic analysis means 301, the syntactic analysis means 301 reads a token classification dictionary in S702 of FIG. 7. The syntactic analysis means 301 adds a comment to a token in the token sequence in accordance with its kind in S703 of FIG. 7. Specifically, the token sequence "1, +, (, 3, −, 2,)" becomes "a numeric value 1, an operator +, a formula (, a numeric value 3, an operator −, a numeric value 2)". Then, the syntactic analysis means 301 reads the token priority level dictionary in S704 of FIG. 7. The syntactic analysis means 301 changes the tokens into a syntax tree from the token having a higher priority level, based on the comment added to the token sequence. Specifically, since an operator − 811 in the formula (a numeric value 3, an operator −, a numeric value 2) has the highest priority level, a partial syntax tree 801 in the syntax tree is created first. The similar operation is repeated until the token sequence runs out, and the processing is terminated when the remaining token sequence runs out.

When a token sequence "10, +, 2, *, 5" of an example 3 in FIG. 8 is processed by the syntactic analysis means 301, the syntactic analysis means 301 reads a token classification dictionary in S702 of FIG. 7. The syntactic analysis means 301 adds a comment to a token in the token sequence in accordance with its kind in S703 of FIG. 7. Specifically, the token sequence "10, +, 2, *, 5" becomes "a numeric value 10, an operator +, a numeric value 2, an operator *, a numeric value 5". Then, the syntactic analysis means 301 reads the token priority level dictionary in S704 of FIG. 7. The syntactic analysis means 301 converts the tokens into a syntax tree from the token having a higher priority level, based on the comment added to the token sequence. Specifically, since an operator * 812 has the highest priority level among them, a partial syntax tree 802 in the syntax tree is created first. The similar operation is repeated until the token sequence runs out, and the processing is terminated when the remaining token sequence runs out.

Figure 9:
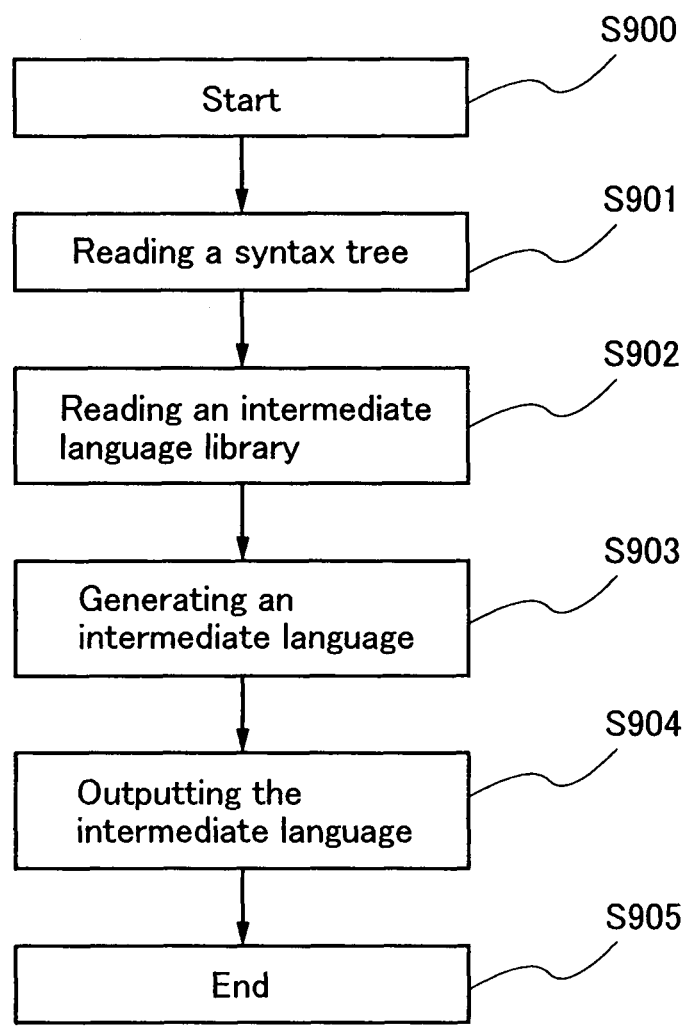
FIG. 9 is a view illustrating generation of a machine language program in a semiconductor device of the present invention.

FIG. 9 shows a flowchart of the semantic analysis means 302. Here, an intermediate language 312 is generated based on a syntax tree 311. When the semantic analysis means 302 starts operation (S900), the semantic analysis means 302 reads a syntax tree (S901). Then, the semantic analysis means 302 reads an intermediate language library (S902). Then, the semantic analysis means 302 generates an intermediate language sequentially from a branch (lower portion) of a syntax tree 311 in accordance with the intermediate language library (S903). Finally, the semantic analysis means 302 outputs an intermediate language 312 (S904), and terminates the operation (S905).

Figure 10:
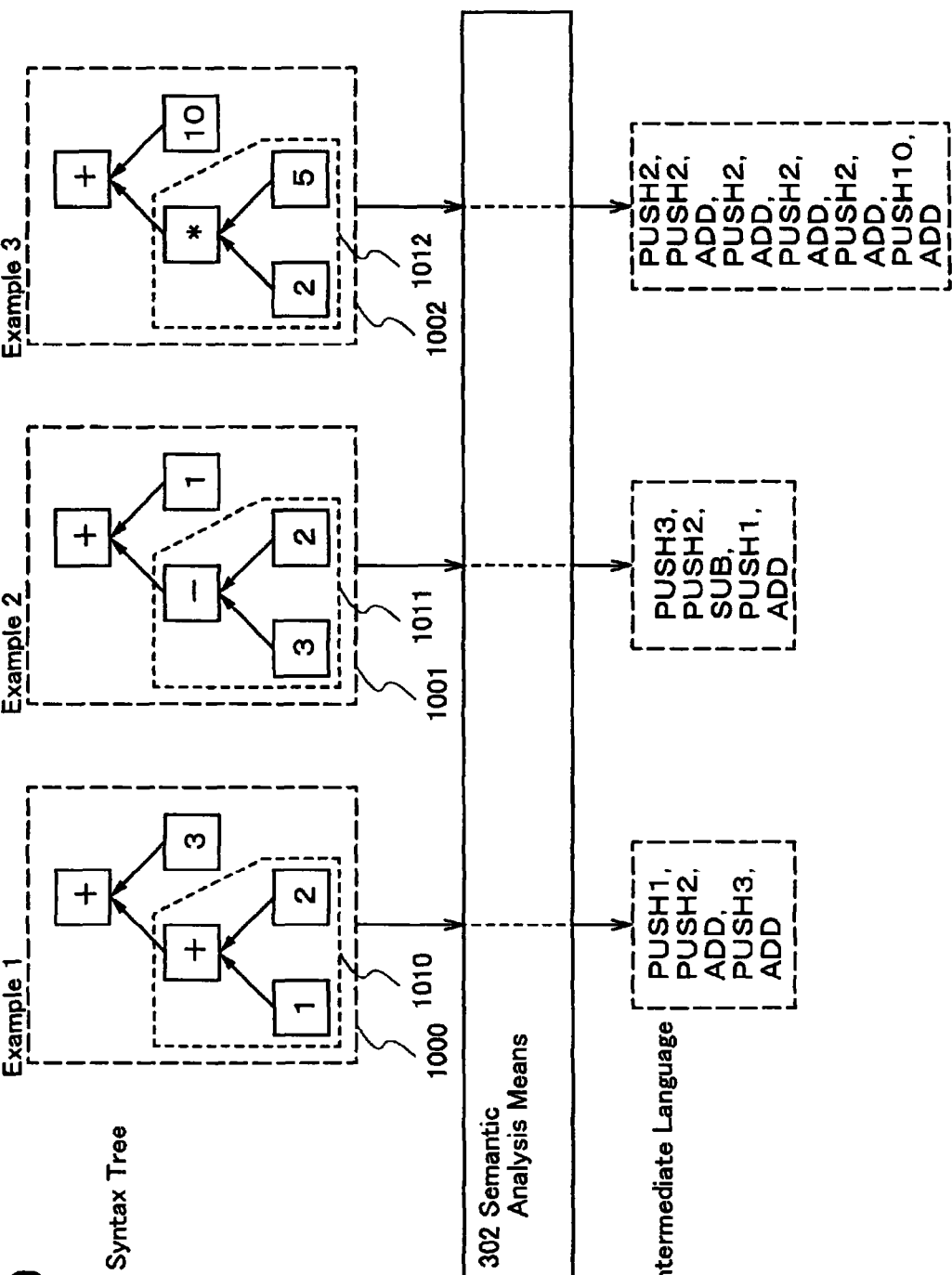
FIG. 10 is a view illustrating generation of a machine language program in a semiconductor device of the present invention.

FIG. 10 specifically shows processing by the semantic analysis means 302. In this embodiment mode, the arithmetic processing circuit 101 applies a stack method to the RAM 106 when the machine language program 200 is executed by the arithmetic processing circuit 101. Therefore, an intermediate language is written using a stack machine type.

When a syntax tree 1000 of an example 1 in FIG. 10 is processed by the semantic analysis means 302, the semantic analysis means 302 reads the intermediate language library in S902 of FIG. 9 and generates an intermediate language (S903). Specifically, the semantic analysis means 302 makes a branchlet 1010 of the syntax tree be an intermediate language first. The intermediate language of the branchlet 1010 of the syntax tree is "PUSH1, PUSH2, ADD", which means that 1 and 2 are put into stacks and addition is performed. Similarly, the semantic analysis means 302 converts the entire syntax tree into an intermediate language, outputs an intermediate language "PUSH1, PUSH2, ADD, PUSH3, ADD" in S904 of FIG. 9, and terminates the operation (S905).

When a syntax tree 1001 of an example 2 in FIG. 10 is processed by the semantic analysis means 302, the semantic analysis means 302 reads the intermediate language library in S902 of FIG. 9 and generates an intermediate language (S903). Specifically, the semantic analysis means 302 makes a branchlet 1011 of the syntax tree be an intermediate language first. The intermediate language of the branchlet 1011 of the syntax tree is "PUSH3, PUSH2, SUB", which means that 3 and 2 are put into stacks and subtraction is performed. Similarly, the semantic analysis means 302 converts the entire syntax tree into an intermediate language, outputs an intermediate language "PUSH3, PUSH2, SUB, PUSH1, ADD" in S904 of FIG. 9, and terminates the operation (S905).

When a syntax tree 1002 of an example 3 in FIG. 10 is processed by the semantic analysis means 302, the semantic analysis means 302 reads the intermediate language library in S902 of FIG. 9 and generates an intermediate language (S903). Specifically, the semantic analysis means 302 makes a branchlet 1012 of the syntax tree be an intermediate language first. The intermediate language of the branchlet 1012 of the syntax tree is "PUSH2, PUSH2, ADD, PUSH2, ADD, PUSH2, ADD, PUSH2, ADD", which means that 2 is put into a stack and addition is performed, and this operation is repeated five times, that is, 2 times 5. Similarly, the semantic analysis means 302 converts the entire syntax tree into an intermediate language, outputs an intermediate language "PUSH2, PUSH2, ADD, PUSH2, ADD, PUSH2, ADD, PUSH2, ADD, PUSH 10, ADD" in S904 of FIG. 9, and terminates the operation (S905).

Figure 11:
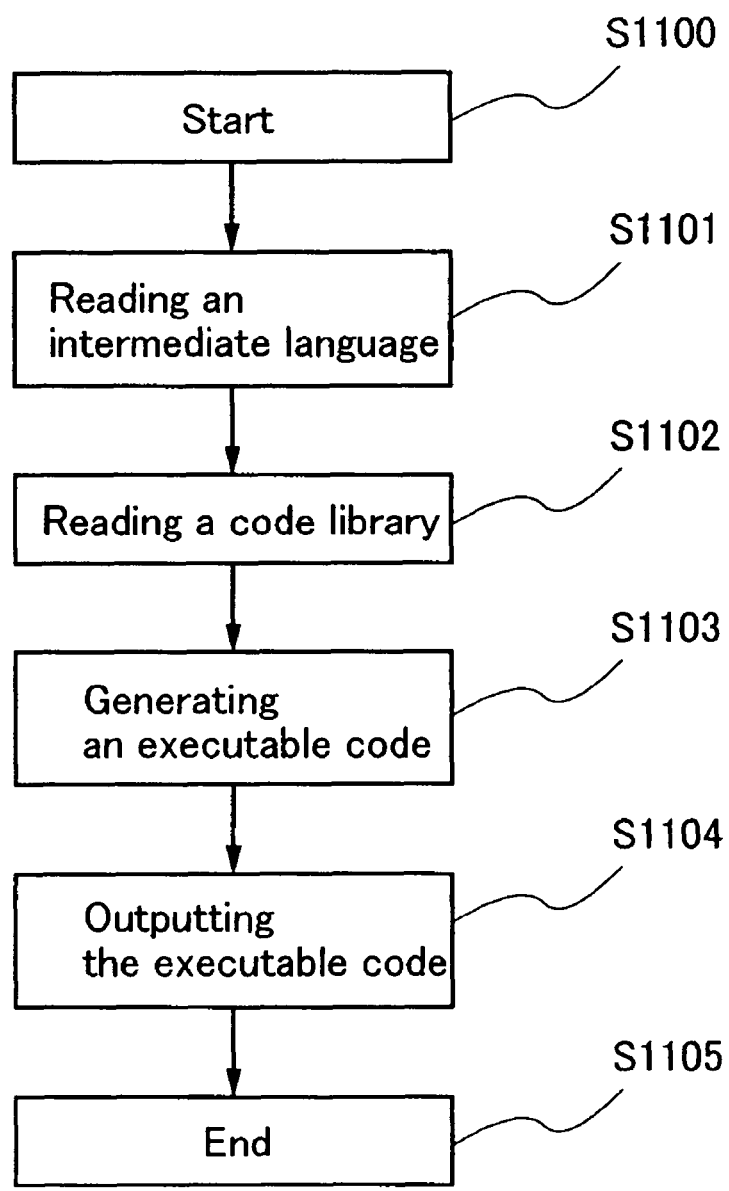
FIG. 11 is a view illustrating generation of a machine language program in a semiconductor device of the present invention.

FIG. 11 shows a flowchart of the code generation means 303. Here, an executable code 313 is generated based on the intermediate language 312. When the code generation means 303 starts operation (S1100), the code generation means 303 reads an intermediate language (S1101). Then, the code generation means 303 reads a code library (S1102). The code generation means 303 generates an executable code in accordance with the code library (S1103). Finally, the code generation means 303 outputs an executable code 313 (S1104), and terminates the operation (S1105).

Table 2 shows a result of processing by the code generation means 303 as an example. Here, an intermediate language is converted into an executable code (also referred to as a native code or an object code) which can be executed by the arithmetic processing circuit. It is to be noted that the executable code is expressed by binary notation, and the numeric value of the intermediate language is expressed by decimal notation.

analysis result in the stack analysis means as an example. Here, execution time of the executable code 313 is on the horizontal axis and a stack pointer is on the vertical axis, and a status of movement of the stack pointer from a program start 1201 to a program termination 1202, that is, a status of use of the stacks, is shown as a graph 1200. Here, as an example, the number of banks n is set to 4, the number of stacks m is set to 4, a stack pointer specified by the startup routine is the first stack of the first bank corresponding to the 0-th address of the RAM, writing to the stack is represented by a black dot, and reading from the stack is represented by a white dot. A bank boundary 1205 is a boundary between a first bank and a second bank, and similarly, a boundary between the second bank and a third bank is referred to as a bank boundary 1206, and a boundary between the third boundary and a fourth boundary is referred to as a bank boundary 1207. Contiguous stacks 1210 are particularly referred to as contiguous stacks which do not cross banks because writing to stacks is consecutively performed four times and the stacks do not cross the bank boundary 1205 or the bank boundary 1206. On the other hand, contiguous stacks 1211 are particularly referred to as contiguous stacks which cross banks, which are distinguished from the contiguous stacks 1210, because writing to a stack is consecutively performed four times and the stacks cross the bank boundary 1207.

Figure 13:
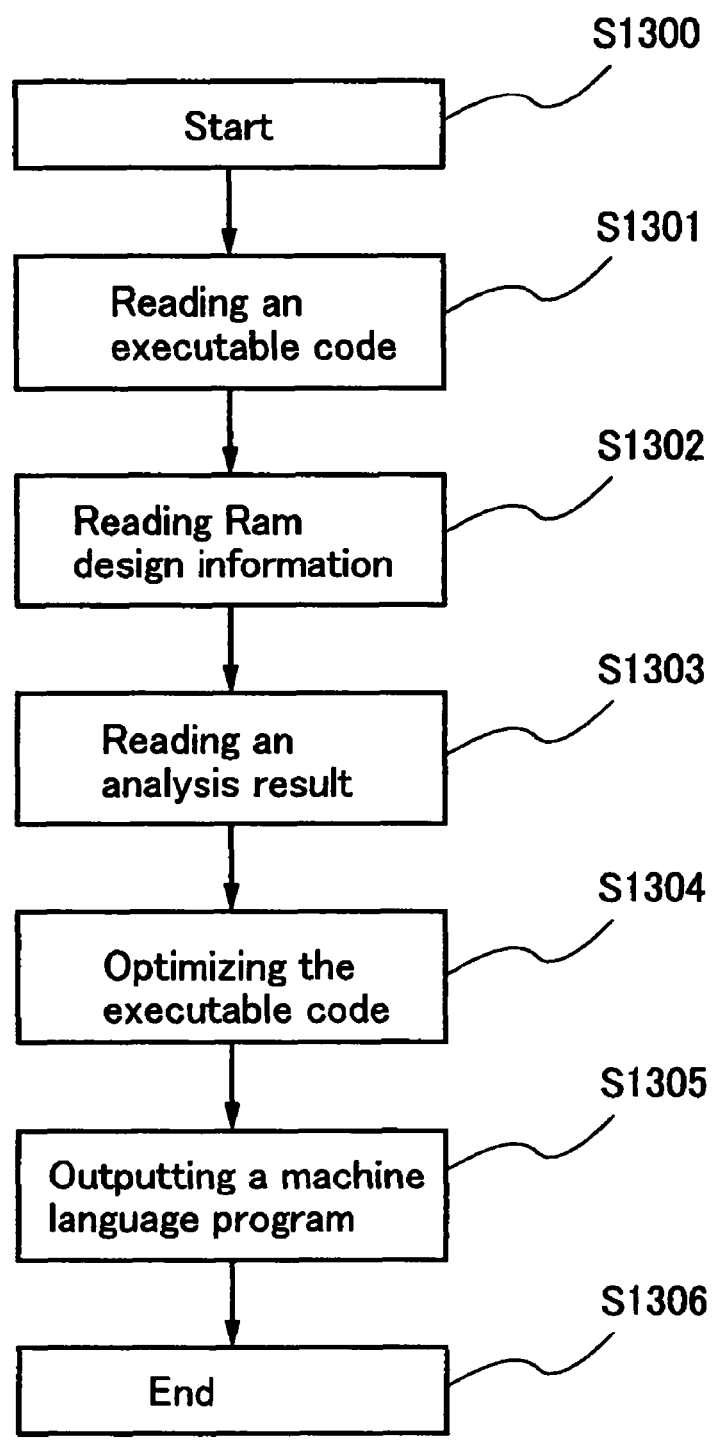
FIG. 13 is a view illustrating generation of a machine language program in a semiconductor device of the present invention.

FIG. 13 shows a flowchart of the optimization means 305. Here, the optimization means 305 optimizes the executable code 313 in accordance with the analysis result 320 obtained by analyzing the executable code 313, makes the executable code 313 be a machine language program 200, and the optimization means 305, and outputs the machine language program 200. When the optimization means 305 starts operation (S1300), the optimization means 305 reads an executable code (S1301). Then, the optimization means 305 reads RAM design information (S1302). RAM design information is, specifically, information on the bank size of a RAM. The optimization means 305 reads the analysis result 320 (S1303), and optimization is performed so that power consumption of the RAM is reduced (S1304). Specifically, stacks of which data are not read until the program is terminated are omitted, and stacks are arranged so that, among stacks of which data are read, stacks with contiguous writing do not cross a boundary between banks. Finally, the optimization means 305 outputs a machine language program 200 (S1305), and terminates the operation (S1306).

Figure 14:
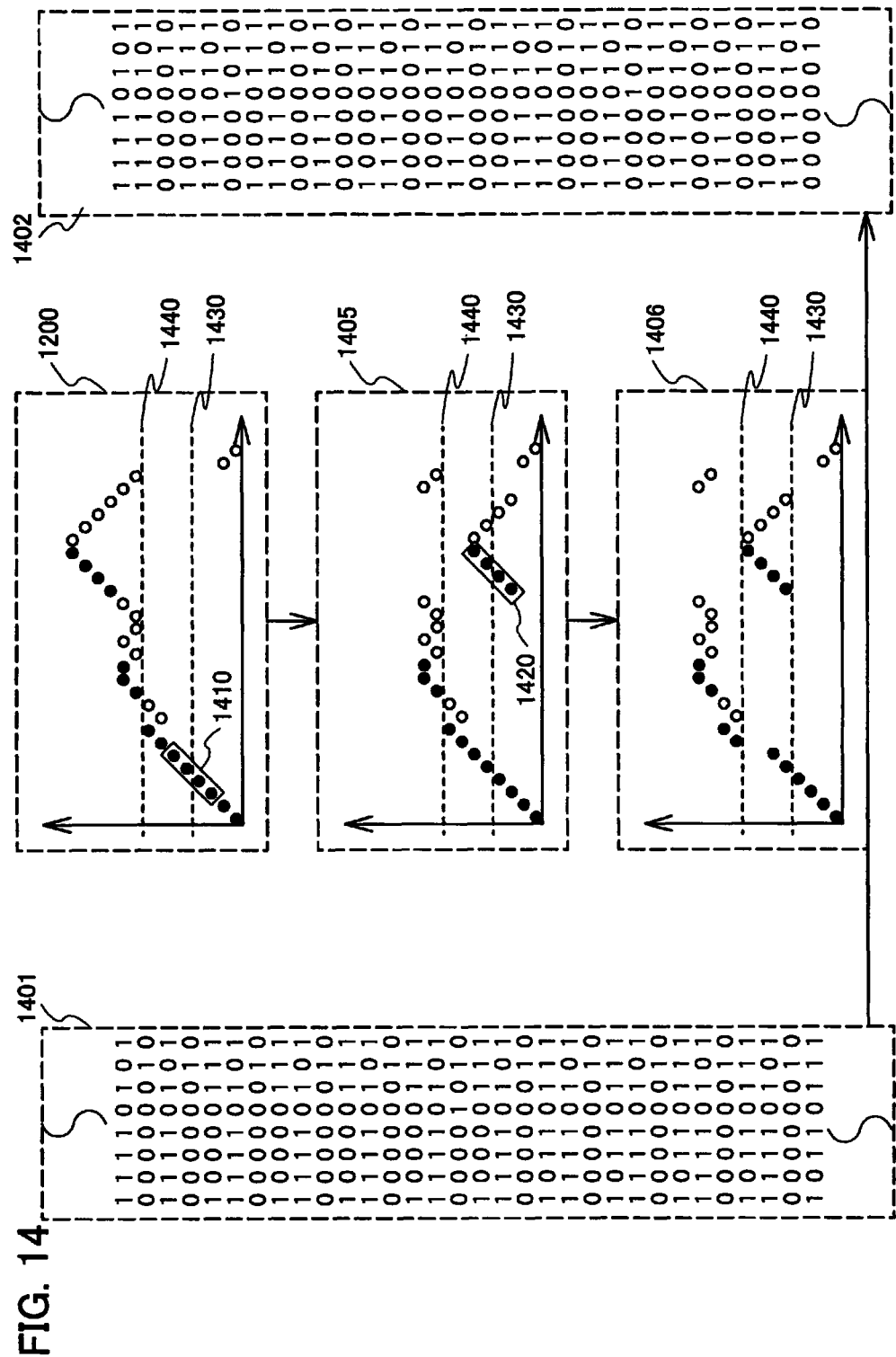
FIG. 14 is a view illustrating generation of a machine language program in a semiconductor device of the present invention.

FIG. 14 specifically shows processing by the optimization means 305. It is to be noted that the executable code is

TABLE 2

| Intermediate Language | Excutable Code |
|---|---|
| PUSH2, | 11110101000000101111010100000010100001111110101 |
| PUSH2, | 00000010100001111111010100000010100001111110101 |
| ADD, | 00000010100001111111010100001010100001111 |
| PUSH2, | |
| ADD, | |
| PUSH2, | |
| ADD, | |
| PUSH2, | |
| ADD, | |
| PUSH10, | |
| ADD | |

Figure 12:
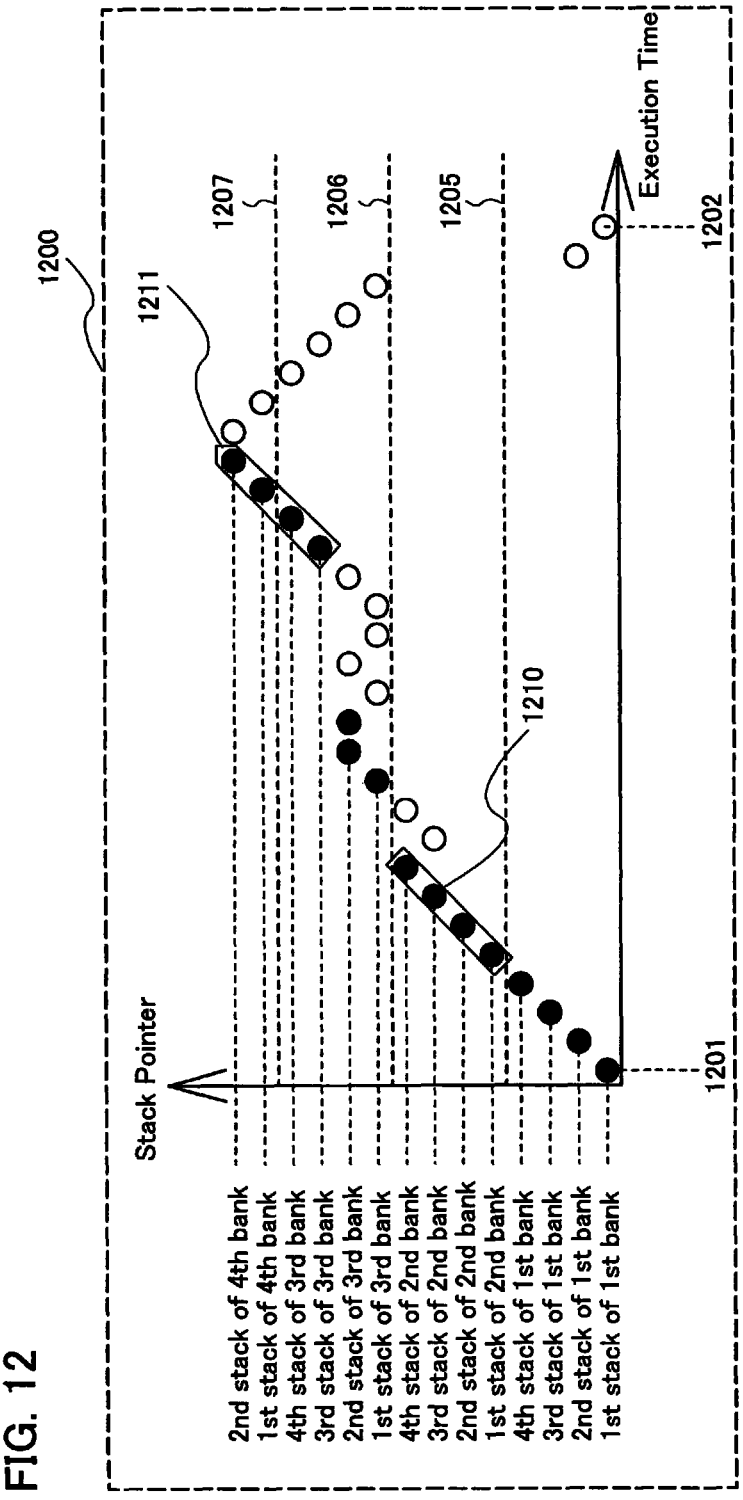
FIG. 12 is a view illustrating generation of a machine language program in a semiconductor device of the present invention.

FIG. 12 specifically shows processing by the stack analysis means 304.

The stack analysis means 304 analyzes the executable code 313 and outputs an analysis result 320. FIG. 12 shows an expressed by binary notation. As an example, description is given under the condition where the number of banks n is set to 4 and the number of stacks m is set to 4, and the graph 1200 shown in FIG. 12 is used as the analysis result.

When an executable code 1401 in FIG. 14 is processed by the optimization means, the optimization means reads the executable code 1401 in S1301 of FIG. 13 and reads the RAM design information in S1302 of FIG. 13. Specifically, since the number of banks n is set to 4 and the number of stacks m is set to 4 in this embodiment mode, the optimization means reads such RAM design information. Then, the optimization means reads the graph 1200 and performs optimization so that power consumption of the RAM is reduced (S1304). Specifically, in the graph 1200, stacks 1410 which are not used until the program is terminated, that is, stacks 1410 of which data are not read until the program is terminated, are omitted (graph 1405), and subsequently, stacks 1420 with contiguous writing are rearranged so as not to cross a first bank boundary 1430 (graph 1406). In the graph 1406, the stacks 1420 with contiguous writing are arranged so that writing is performed between the first bank boundary 1430 (a boundary between a first bank and a second bank) and a second bank boundary 1440 (a boundary between the second bank and a third bank). It is to be noted that, in this specification, the sentence "stacks are omitted" means that stacks in which data is once written are used for performing writing of the data to the stacks. Thus, the number of stacks used for writing of data can be reduced. The optimization means 305 optimizes an executable code in accordance with the graph 1406. Finally, the optimization means 305 outputs a machine language program 1402 in S1305 of FIG. 13, and terminates the operation (S1306).

The machine language program 200 is stored in the ROM 105 and is executed by the arithmetic processing circuit. Power consumption for writing or reading becomes lower as the address of the stack pointer becomes lower. Accordingly, by executing such a machine language program by the arithmetic processing circuit, power consumption can be reduced.

By employing the mode described above, in a semiconductor device including an arithmetic processing circuit and a memory circuit, a machine language program suitable for a memory circuit, which is generated by a machine language program generation device, is executed, whereby power consumption can be reduced. Accordingly, a high-performance semiconductor device consuming low power can be provided. Further, in a semiconductor device including an arithmetic processing circuit and a memory circuit, since optimization of an executable code of a program can be attempted, it is not necessary to remake the semiconductor device again from the stage of mask design due to change in specification in accordance with change in method of operation. Therefore, manufacturing cost can be reduced and manufacturing time can be shortened. Furthermore, since the mask design is not changed, there is no concern that a semiconductor device manufactured after changing the mask design will malfunction.

This embodiment mode can be freely combined with any description of other embodiment modes in this specification.

Embodiment Mode 2

In this embodiment mode, an example of a memory circuit mounted in a semiconductor device of the present invention is described with reference to FIGS. 15 to 18. It is to be noted that a memory in this embodiment mode refers to a RAM in Embodiment Mode 1. Further, one memory block in this embodiment mode is the same as one bank in Embodiment Mode 1.

Figure 15:
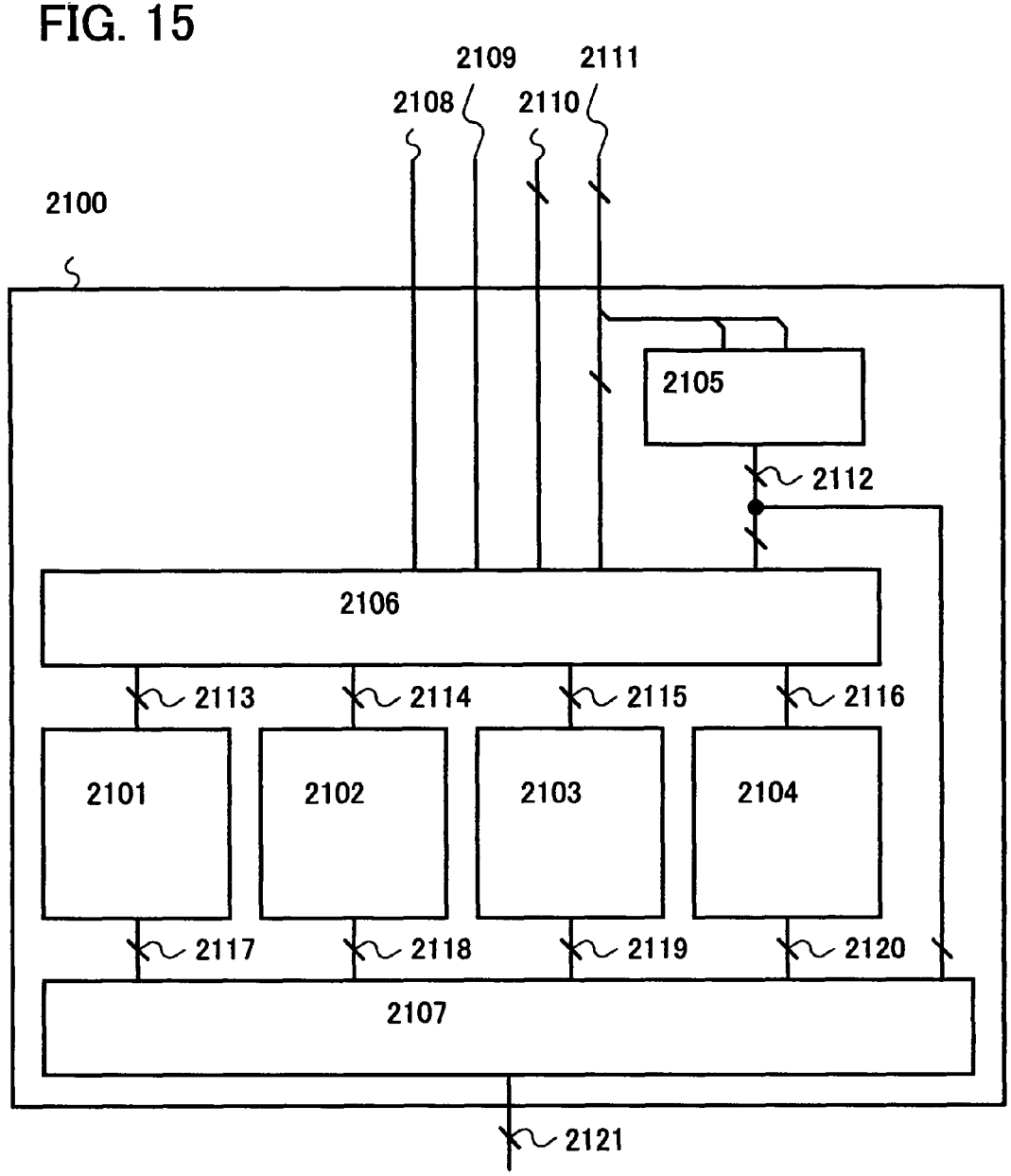
FIG. 15 illustrates an example of a memory circuit of the present invention.
Figure 16:
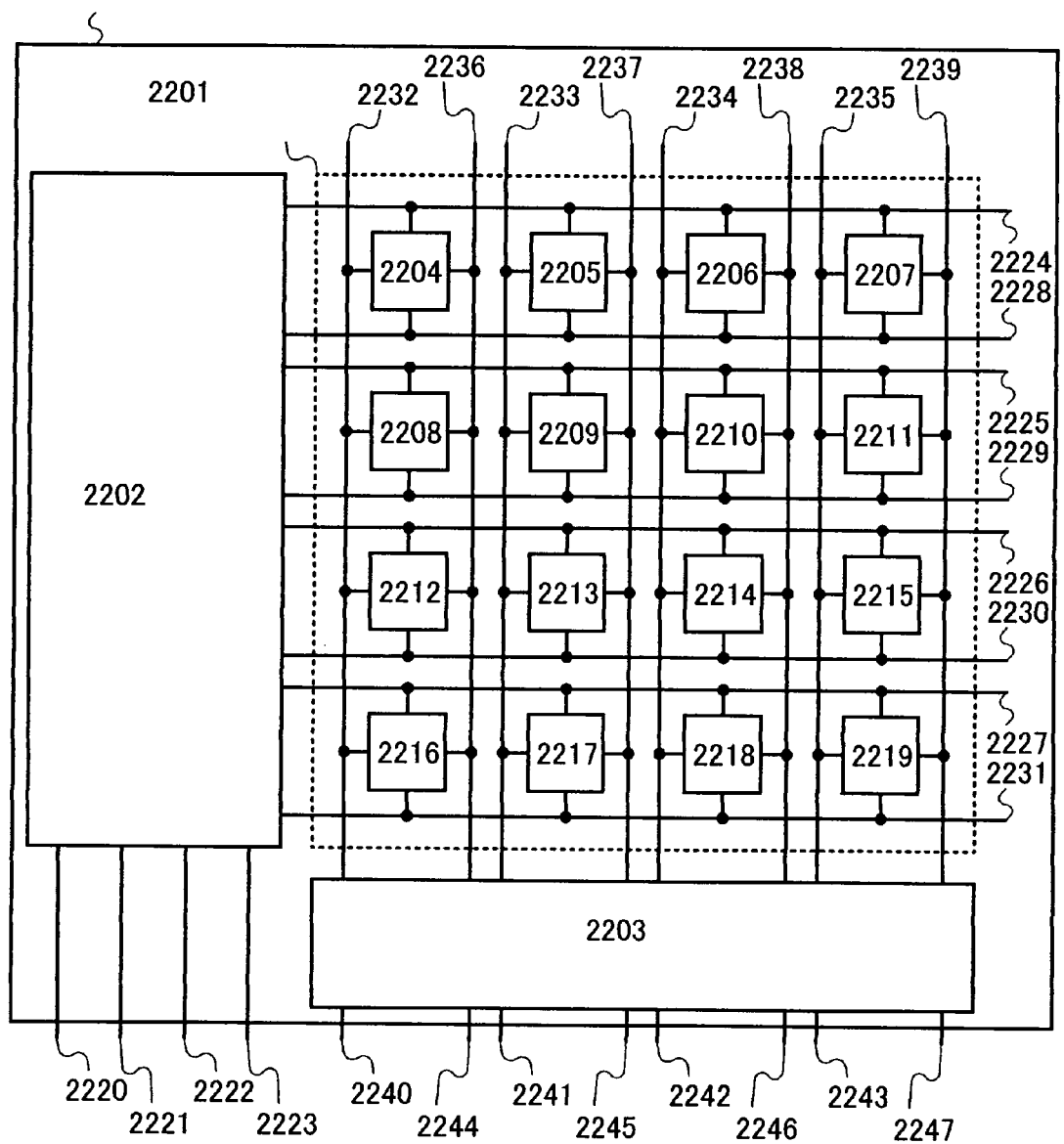
FIG. 16 illustrates an example of a memory circuit of the present invention.
Figure 17:
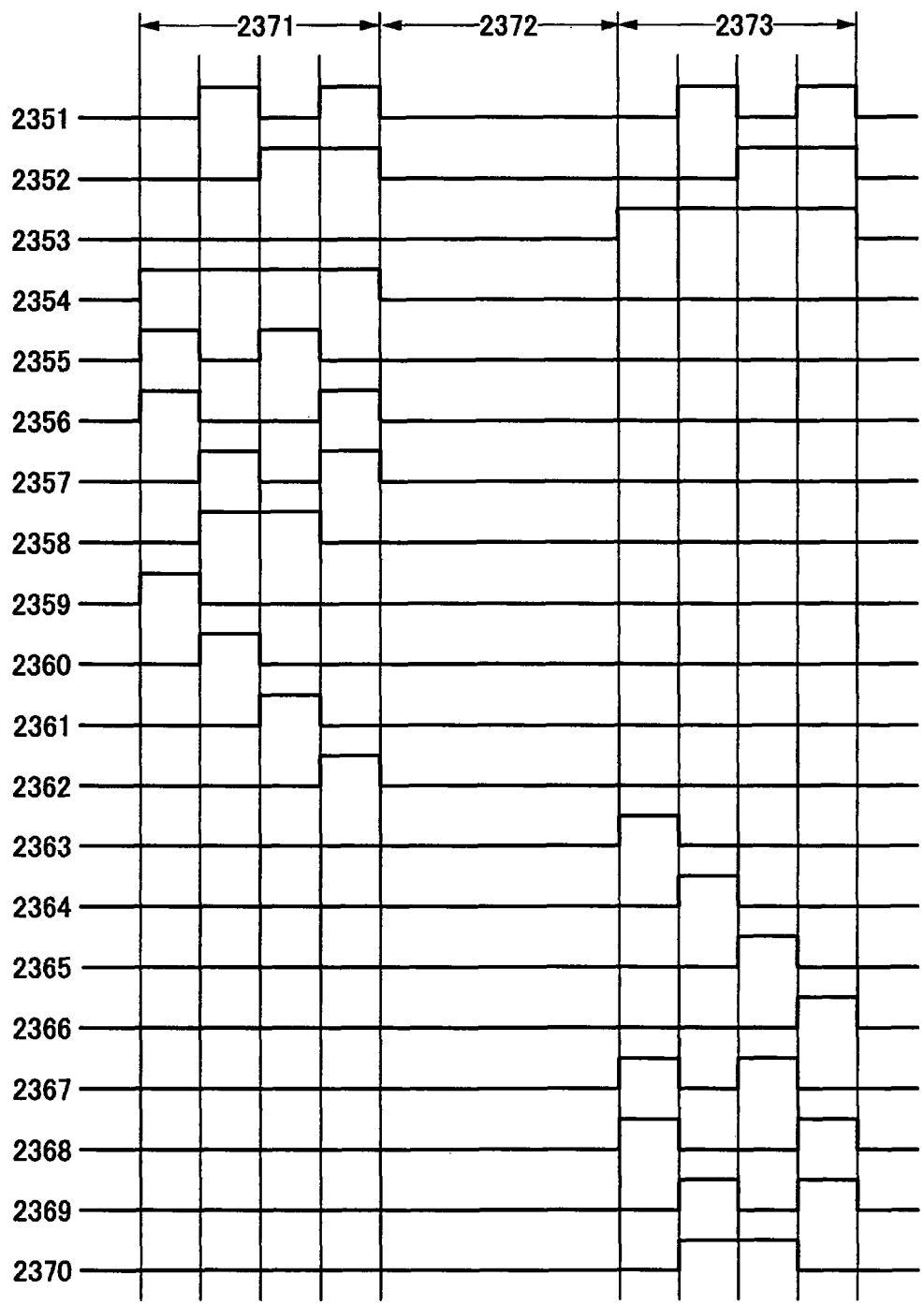
FIG. 17 illustrates an example of a memory circuit of the present invention.
Figure 18:
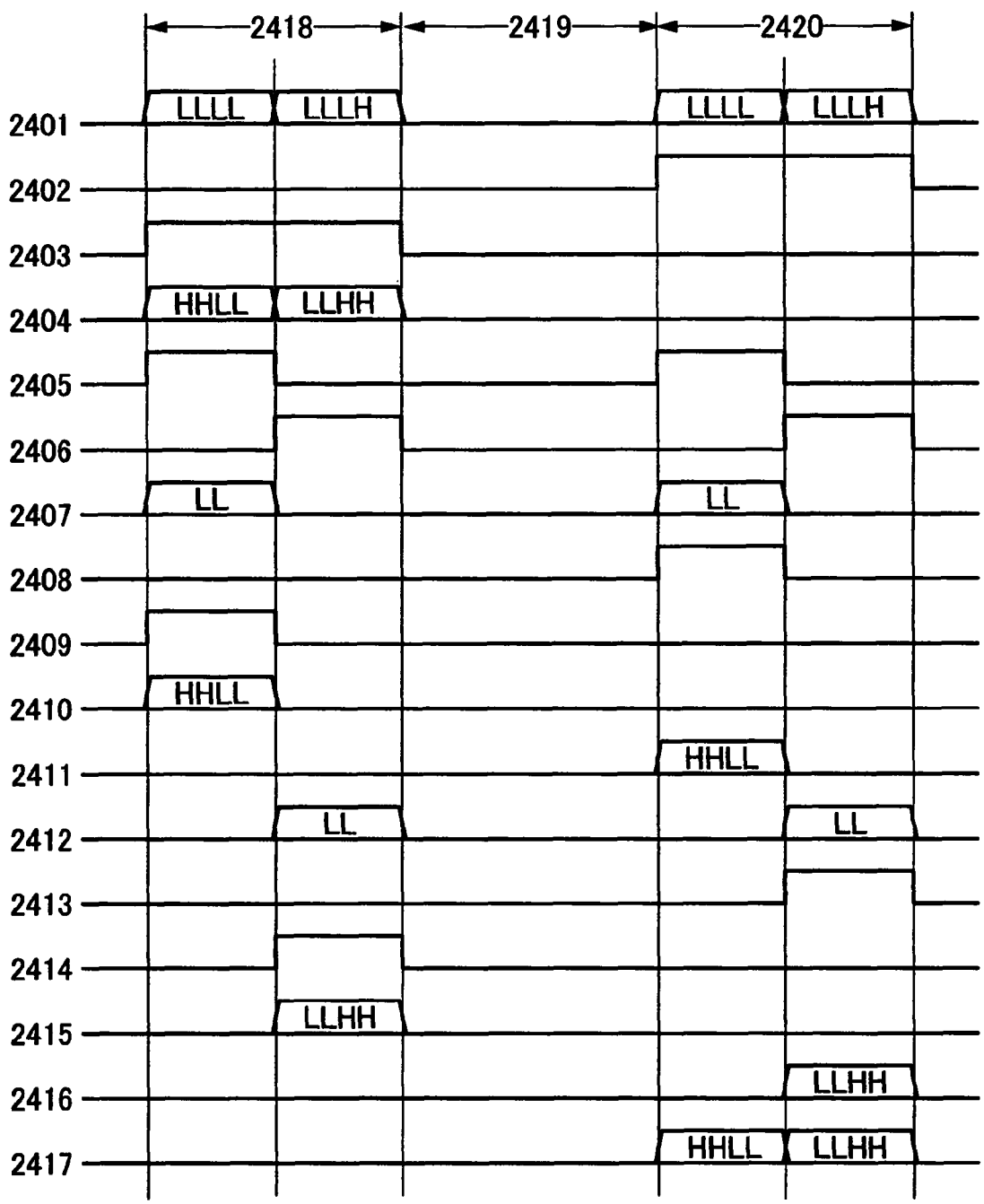
FIG. 18 illustrates an example of a memory circuit of the present invention.

FIG. 15 is a block diagram of a memory of this embodiment mode. FIG. 16 is a block diagram of a memory block included in the memory of this embodiment mode. FIG. 17 is a timing chart of the memory block included in the memory of this embodiment mode. FIG. 18 is a timing chart of the memory of this embodiment mode.

As shown in FIG. 15, a memory 2100 of this embodiment mode includes first to fourth memory blocks 2101 to 2104, an operation control circuit 2105, an input signal control circuit 2106, and an output signal control circuit 2107. Note that each of the first to fourth memory blocks 2101 to 2104 is a memory block 2200 in FIG. 16.

Note that in this embodiment mode, a case of a memory including four memory blocks is described, in which a memory address signal is 4 bits, that is, 16 words, and a memory reading/writing data signal is 4 bits.

In FIG. 16, the memory block 2200 includes a memory array 2201, a row decoder 2202, and an RW circuit 2203.

The memory array 2201 includes first to sixteenth memory cells 2204 to 2219, which are arranged in a four-by-four matrix.

In the memory array 2201, a first reading word signal line 2224 and a first writing word signal line 2228 are each electrically connected to the first to fourth memory cells 2204 to 2207; a second reading word signal line 2225 and a second writing word signal line 2229 are each electrically connected to the fifth to eighth memory cells 2208 to 2211; a third reading word signal line 2226 and a third writing word signal line 2230 are each electrically connected to the ninth to twelfth memory cells 2212 to 2215; and a fourth reading word signal line 2227 and a fourth writing word signal line 2231 are each electrically connected to the thirteenth to sixteenth memory cells 2216 to 2219.

Also, in the memory array 2201, a first reading bit signal line 2232 and a first writing bit signal line 2236 are each electrically connected to the first, fifth, ninth, and thirteenth memory cells 2204, 2208, 2212, and 2216; a second reading bit signal line 2233 and a second writing bit signal line 2237 are each electrically connected to the second, sixth, tenth, and fourteenth memory cells 2205, 2209, 2213, and 2217; a third reading bit signal line 2234 and a third writing bit signal line 2238 are each electrically connected to the third, seventh, eleventh, and fifteenth memory cells 2206, 2210, 2214, and 2218; and a fourth reading bit signal line 2235 and a fourth writing bit signal line 2239 are each electrically connected to the fourth, eighth, twelfth, and sixteenth memory cells 2207, 2211, 2215, and 2219.

Here, for example, when a potential of the first reading word signal line 2224 is "H", the first to fourth reading bit signal lines 2232 to 2235 come to have high potentials or low potentials depending on data stored in the first to fourth memory cells 2204 to 2207. Also, when a potential of the first writing word signal line 2228 is "H", data is stored in the first to fourth memory cells 2204 to 2207, depending on potentials of the first to fourth writing bit signal lines 2236 to 2239.

The row decoder 2202 has a function of generating first to fourth reading word signals supplied to the first to fourth reading word signal lines 2224 to 2227 and first to fourth writing word signals supplied to the first to fourth writing word signal lines 2228 to 2231, in response to first and second memory block address signals, a memory block reading control signal, and a memory block writing control signal supplied from first and second memory block address signal lines 2220 and 2221, a memory block reading control signal line 2222, and a memory block writing control signal line 2223, respectively.

In a case where, for example, the row decoder 2202 has a function of making the first, second, third, and fourth reading word signals be "H", when the memory block reading control signal is "H" and combinations of potentials of the first memory block address signal and the second memory block address signal are "LL", "LH", "HL", and "HH", respectively. For example, in a case where the memory block reading control signal is "H", a potential of the first memory block address signal is "L", and a potential of the second memory block address signal is "H", the second reading word signal is made to be "H".

Also, in a case where, for example, the row decoder 2202 has a function of making the first, second, third, and fourth writing word signals be "H", when the memory block writing control signal is "H" and combinations of potentials of the first memory block address signal and the second memory block address signal are "LL", "LH", "HL", and "HH", respectively. For example, in a case where the memory block writing control signal is "H", a potential of the first memory block address signal is "L", and a potential of the second memory block address signal is "H", the second writing word signal is made to be "H".

Note that in this specification, "H" denotes a high potential and "L" denotes a low potential.

The RW circuit 2203 has a function of generating first to fourth memory block reading data signals, which are to be supplied to the first to fourth memory block reading data signal lines 2240 to 2243, from first to fourth reading bit signals supplied to the first to fourth reading bit signal lines 2232 to 2235, depending on data stored in the memory cells. Also, the RW circuit 2203 has a function of generating first to fourth writing bit signals, which are to be supplied to the first to fourth writing bit signal lines 2236 to 2239, from first to fourth memory block writing data signals supplied from first to fourth memory block writing data signal lines 2244 to 2247.

For example, the RW circuit 2203 quickly detects with a sense amplifier whether the first to fourth reading bit signal lines 2232 to 2235 have high potentials or low potentials, and generates the first to fourth memory block reading data signals to be supplied to the first to fourth memory block reading data signal lines 2240 to 2243, through a latch and a buffer. Further, the RW circuit 2203 generates the first to fourth writing bit signals to be supplied to the first to fourth writing bit signal lines 2236 to 2239, depending on potentials of the first to fourth memory block writing data signal lines 2244 to 2247.

FIG. 17 is a timing chart relating to an input/output signal of the memory block 2200. A timing chart of the first memory block address signal supplied from the first memory block address signal line 2220 in FIG. 16 is shown by a first signal 2351 in FIG. 17. Similarly, a timing chart of the second memory block address signal supplied from the second memory block address signal line 2221 in FIG. 16 is shown by a second signal 2352 in FIG. 17. Also, a timing chart of the memory block reading control signal supplied from the memory block reading control signal line 2222 and a timing chart of the memory block writing control signal supplied from the memory block writing control signal line 2223 in FIG. 16 are shown by a third signal 2353 and a fourth signal 2354 in FIG. 17, respectively. Further, timing charts of the first to fourth memory block writing data signals, which are supplied from the first to fourth memory block writing data signal lines 2244 to 2247 in FIG. 16, respectively, are shown by fifth to eighth signals 2355 to 2358 in FIG. 17, respectively.

Note that the RW circuit 2203 has a function of generating the first to fourth writing bit signals from the first to fourth memory block writing data signals, via a buffer. In this case, timing charts of the first to fourth writing bit signals supplied to the first to fourth writing bit signal lines 2236 to 2239 are similar to the timing charts of the fifth to eighth signals 2355 to 2358 in FIG. 17.

Here, a period in which a memory block writing control signal is "H", that is, a first period 2371 in FIG. 17, is to be a memory block writing period. Also, a period in which the memory block reading control signal is "H", that is, a third period 2373 in FIG. 17, is to be a memory block reading period. Further, a period in which the memory block reading control signal and the memory block writing control signal are both "L", that is, a second period 2372 in FIG. 17, is to be a memory block waiting period.

In the memory block writing period 2371, in a case where the memory block writing control signal supplied from the memory block writing control signal line 2223 in FIG. 16 is "H" and combinations of potentials of the first memory block address signal and the second memory block address signal, which are supplied from the first memory block address signal line 2220 and the second memory block address signal line 2221, respectively, are "LL", "LH", "HL", and "HH", respectively, the first, second, third, and fourth writing word signals become "H". Note that the first, second, third, and fourth writing word signals refer to signals supplied from the first, second, third, and fourth writing word signal lines 2228, 2229, 2230, and 2231, respectively. Accordingly, timing charts of the first to fourth writing word signals become like those of ninth to twelfth signals 2359 to 2362 in FIG. 17.

Further, in a period in which the first writing word signal is "H", potentials of the first to fourth writing bit signal lines 2236 to 2239, that is, potentials of the first to fourth memory block writing data signals, are stored in the first to fourth memory cells 2204 to 2207. In other words, "H", "H", "L", and "L" are stored in the first to fourth memory cells 2204 to 2207 in FIG. 16, respectively. In a similar manner, "L", "L", "H", and "H" are stored in the fifth to eighth memory cells 2208 to 2211, respectively, in a period in which the second writing word signal is "H"; "H", "L", "L", and "H" are stored in the ninth to twelfth memory cells 2212 to 2215, respectively, in a period in which the third writing word signal is "H"; and "L", "H", "H", and "L" are stored in the thirteenth to sixteenth memory cells 2216 to 2219, respectively, in a period in which the fourth writing word signal is "H".

In a memory block reading period 2373, in a case where the memory block reading control signal supplied from the memory block reading control signal line 2222 in FIG. 16 is "H", the first, second, third, and fourth reading word signals become "H" when the first memory block address signal and the second memory block address signal, which are supplied from the first memory block address signal line 2220 and the second memory block address signal line 2221, respectively, are "LL", "LH", "HL", and "HH", respectively. Note that the first, second, third, and fourth reading word signals refer to signals supplied from the first, second, third, and fourth reading word signal lines 2224, 2225, 2226, and 2227, respectively. Accordingly, timing charts of the first to fourth reading word signals become like those of thirteenth to sixteenth signals 2363 to 2366 in FIG. 17.

In a period in which the first reading word signal is "H", the first to fourth reading bit signals are supplied to the first to fourth reading bit signal lines 2232 to 2235, depending on potentials stored in the first to fourth memory cells 2204 to 2207 in FIG. 16. Here, by a potential stored in the memory block writing period 2371, the first to fourth reading bit signals become "H", "H", "L", and "L".

Similarly, in a period in which the second reading word signal is "H", the first to fourth reading bit signals are supplied to the first to fourth reading bit signal lines 2232 to 2235, depending on potentials stored in the fifth to eighth memory cells 2208 to 2211 in FIG. 16. Here, by a potential stored in the memory block writing period 2371, the first to fourth reading bit signals become "L", "L", "H", and "H".

Further, in a period in which the third reading word signal is "H", the first to fourth reading bit signals are supplied to the first to fourth reading bit signal lines 2232 to 2235, depending on potentials stored in the ninth to twelfth memory cells 2212 to 2215 in FIG. 16. Here, by a potential stored in the memory block writing period 2371, the first to fourth reading bit signals become "H", "L", "L", and "H".

Furthermore, in a period in which the fourth reading word signal is "H", the first to fourth reading bit signals are supplied to the first to fourth reading bit signal lines 2232 to 2235, depending on potentials stored in the thirteenth to sixteenth memory cells 2216 to 2219 in FIG. 16. Here, by a potential stored in the memory block writing period 2371, the first to fourth reading bit signals become "L", "H", "H", and "L".

In other words, timing charts of the first to fourth reading bit signals are seventeenth to twentieth signals 2367 to 2370 in FIG. 17.

Note that the RW circuit 2203 has a function of generating the first to fourth memory block reading data signals from the first to fourth reading bit signals, via a buffer. In this case, timing charts of the first to fourth memory block reading data signals supplied to the first to fourth memory block reading data signal lines 2240 to 2243 are also similar to timing charts of the seventeenth to twentieth signals 2367 to 2370 in FIG. 17.

As shown in FIG. 17, in the memory block waiting period 2372, memory block input signals, that is, the first and second memory block address signals, the memory block reading control signal, the memory block writing control signal, and the memory block writing data signal, have a constant value. In this case, since operation of the memory block is stopped, power consumption can be significantly reduced.

Here, each of the first to fourth memory blocks 2101 to 2104 in FIG. 15 is the memory block 2200 in FIG. 16. Note that input signal lines of the first memory block 2101 are first memory block input signal lines 113 in FIG. 15, which are the first and second memory block address signal lines 2220 and 2221, the memory block reading control signal line 2222, the memory block writing control signal line 2223, and the first to fourth memory block writing data signal lines 2244 and 2247 in FIG. 16. Also, output signal lines of the first memory block 2101 are first memory block output signal lines 2117 in FIG. 15, which are the first to fourth memory block reading data signal lines 2240 to 2243 in FIG. 16.

Similarly, input signal lines of the second to fourth memory blocks 2102 to 2104 are second to fourth memory block input signal lines 2114 to 2116 in FIG. 15, which are each the first and second memory block address signal lines 2220 and 2221, the memory block reading control signal line 2222, the memory block writing control signal line 2223, and the first to fourth memory block writing data signal lines 2244 and 2247 in FIG. 16. Also, output signal lines from the second to fourth memory blocks 2102 to 2104 are second to fourth memory block output signal lines 2118 to 2120 in FIG. 15, which are each the first to fourth memory block reading data signal lines 2240 to 2243 in FIG. 16.

The operation control circuit 2105 has a function of generating first to fourth memory block operation control signals from the third and the fourth memory address signals among first to fourth memory address signals supplied from a memory address bus signal line 2111 including the first to fourth memory address signal lines. According to a potential of each of the foregoing first to fourth memory block operation control signals, operation of each of the first to fourth memory blocks 2101 to 2104 is controlled. Note that the first to fourth memory block operation control signals are supplied to a memory block operation control bus signal line 112 including first to fourth memory block operation control signal lines.

For example, in a case where the third memory address signal and the fourth memory address signal are each "LL", a memory cell to be read from or written to is included in the first memory block 2101. Also, in a similar manner, in a case where the third memory address signal and the fourth memory address signal are "LH", "HU", and "HH", respectively, a memory cell to be read from or written to is included in the second memory block 2102, the third memory block 2103, and the fourth memory block 2104, respectively. That is, in a case where the third memory address signal is "L" and the fourth memory address signal is "H", the memory cell to be read from or written to is in the second memory block 2102.

Here, in a case where a combination of the third memory address signal and the fourth memory address signal is "LL", the first memory block operation control signal is "H", and each of the second, third, and fourth memory block operation control signals is "L". Also, in a similar manner, in cases where combinations of the third memory address signal and the fourth memory address signal are "LH", "HL", and "HH", respectively, the second, third, and fourth memory block operation control signals are each "H", while other memory block operation control signals are "L". For example, in a case where the third memory address signal is "L" and the fourth memory address signal is "L", the first memory block operation control signal is "H", and the rest thereof, that is, the second to fourth memory block operation control signals are each "L".

The input signal control circuit 2106 has a function of generating first to fourth memory block input signals, from a memory reading control signal; a memory writing control signal; first to fourth memory writing data signals; the first and second memory address signals; and the first to fourth memory block operation control signals, supplied from a memory reading control signal line 2108; a memory writing control signal line 2109; a memory writing data bus signal line 2110 including the first to fourth memory writing data signal lines; the memory address bus signal line 2111, and the memory block operation control bus signal line 2112; respectively. The first to fourth memory block input signals are supplied to the first to fourth memory block input signal lines 2113 to 2116, respectively.

For example, in a case where the first memory block operation control signal is "H", that is, in a case where a memory cell to be read from or written to is included in the first memory block 2101, potentials corresponding to the memory reading control signal, the memory writing control signal, the first to fourth memory writing data signals, and the first and second memory address signals become the first memory block input signal. Meanwhile, the second, third, and fourth memory block input signals are to have a constant value independent of values of the memory reading control signal, the memory writing control signal, the memory writing data signals, and the memory address signals. Also in a similar manner, for example, the potentials corresponding to the memory reading control signal, the memory writing control signal, the first to fourth memory writing data signal, and the first and second memory address signals are the second memory block input signal when the second memory block operation control signal is "H", the third memory block input signal when the third memory block operation control signal is "H", and the fourth memory block input signal when the fourth memory block operation control signal is "H". Meanwhile, other memory block input signals are to have a constant value independent of values of the memory reading control signal, the memory writing control signal, the memory writing data signal, and the memory address signal.

The output signal control circuit 2107 has a function of generating first to fourth memory reading data signals to be supplied to a memory reading data bus signal line 2121 including first to fourth memory reading data signal lines, from first to fourth memory block output signals supplied from the first to fourth memory block output signal lines 2117 to 2120 and first to fourth memory block operation control signals supplied from the memory block operation control bus signal line 2112.

For example, any one of the first to fourth memory block output signals is selected depending on the first to fourth memory block operation control signals, and via a buffer, the memory block output signal is supplied to the memory reading data bus signal line 2121 as a memory reading data signal.

FIG. 18 is a timing chart relating to an input/output signal of a memory in this embodiment mode. The timing charts of the first to fourth memory address signals; the memory reading control signal; the memory writing control signal; and the first to fourth memory writing data signals supplied from the memory address bus signal line 2111; the memory reading control signal line 2108; the memory writing control signal line 2109; and the memory writing data bus signal line 2110 in FIG. 15, respectively, are first to fourth signals 2401 to 2404 in FIG. 18, respectively. Note that potentials of the first to fourth memory address signals are sequentially marked to represent the first signal 2401. Similarly, potentials of the first to fourth memory writing data signals are sequentially marked to represent the fourth signal 2404.

Here, a period in which a memory writing control signal is "H", that is, a first period 2418 in FIG. 18, is to be a memory writing period. Also, a period in which the memory reading control signal is "H", that is, a third period 2420 in FIG. 18, is to be a memory reading period. Further, a period in which the memory reading control signal and the memory writing control signal are both "L", that is, a second period 2419 in FIG. 18, is to be a memory waiting period.

In a case where a combination of potentials of the third memory address signal and the fourth memory address signal is "LL", the first memory block operation control signal becomes "H", and each of the second, third, and fourth memory block operation control signals becomes "L". In a similar manner, the second memory block operation control signal becomes "H" in a case where a combination of potentials of the third memory address signal and the fourth memory address signal is "LH", while each of the first, third, and fourth memory block operation control signals becomes "L". Further, the third memory block operation control signal becomes "H" in a case where a combination of potentials of the third memory address signal and the fourth memory address signal is "HL", while each of the first, second, and fourth memory block operation control signals becomes "L". Furthermore, the fourth memory block operation control signal becomes "H" in a case where a combination of potentials of the third memory address signal and the fourth memory address signal is "HH", while each of the first, second, and third memory block operation control signals becomes "L". Accordingly, timing charts of the first and second memory block operation control signals become like those of fifth and sixth signals 405 and 406 in FIG. 18. Note that although timing charts of the third and fourth memory block operation control signals are not shown in FIG. 18, they are constantly "L".

Here, the input signal control circuit 2106 in FIG. 15 generates the first to fourth memory block input signals by carrying out a logical AND operation with respect to the memory reading control signal, the memory writing control signal, the first to fourth memory writing data signals, and the first and second memory address signals, with the first, second, third, and fourth memory block operation control signals, respectively. That is, in a period in which the first memory block operation control signal is "H", the memory reading control signal, the memory writing control signal, the first to fourth memory writing data signals, and the first and second memory address signals become the first memory block input signal, and all of the second to fourth memory block input signals become "L".

Accordingly, timing charts of the first and second memory block address signals in the first memory block 2101 are a seventh signal 2407 in FIG. 18, a timing chart of the memory block reading control signal is an eighth signal 2408 in FIG. 18, a timing chart of the memory block writing control signal is a ninth signal 2409 in FIG. 18, and timing charts of the first to fourth memory block writing data signals are a tenth signal 2410 in FIG. 18.

Note that potentials of the first and second memory block address signals are sequentially marked to represent the seventh signal 2407. In a similar manner, potentials of the first to fourth block writing data signals are sequentially marked to represent the tenth signal 2410. Data stored in the first memory block 2101 during a memory writing period is read during a memory reading period. Accordingly, a timing chart of the first memory block reading data signal is an eleventh signal 2411 in FIG. 18.

Similarly, timing charts of the first and second memory block address signals in the second memory block 2102 are a twelfth signal 2412 in FIG. 18, a timing chart of the memory block reading control signal is a thirteenth signal 2413 in FIG. 18, a timing chart of the memory block writing control signal is a fourteenth signal 2414 in FIG. 18, and timing chart of the first to fourth memory block writing data signals are a fifteenth signal 2415 in FIG. 18.

Note that potentials of the first and second memory block address signals are sequentially marked to represent the twelfth signal 2412. In a similar manner, potentials of the first to fourth memory block writing data signals are sequentially marked to represent the fifteenth signal 2415. Note that data stored in the second memory block 2102 during a memory writing period is read during a memory reading period. Accordingly, a timing chart of the second memory block reading data signal is a sixteenth signal 2416 in FIG. 18.

Here, the output signal control circuit 2107 in FIG. 15 selects the first memory block output signal when the first memory block operation control signal is "H"; the second memory block output signal when the second memory block operation control signal is "H"; the third memory block output signal when the third memory block operation control signal is "H"; and the fourth memory block output signal when the fourth memory block operation control signal is "H"; and makes the selected signals the first to fourth memory reading data signals, respectively. In this case, timing charts of the first to fourth memory reading data signals are a seventeenth signal 2417 in FIG. 18.

Note that in a period in which the first memory block operation control signal is "H", all of the second to fourth memory block input signals are to be "L". Accordingly, potentials of memory block input signals in the second to fourth memory blocks 2102 to 2104 are equivalent to a potential of the memory block waiting period 2372 in FIG. 17. That is, power consumption in the second to fourth memory blocks 2102 to 2104 is equal to power consumption in a waiting period. Similarly, in a period in which the second memory block operation control signal is "H", the first, third, and fourth memory block input signals are all "L". Accordingly, potentials of input signals in the first, third, and fourth memory blocks 2101, 2103, and 2104 are equivalent to a potential of the memory block waiting period 2172 in FIG. 17. That is, power consumption in the first, third, and fourth memory blocks 2101, 2103, and 2104 are equal to power consumption in a waiting period. Consequently, at least three-fourths of the entire memory is constantly in a waiting state, and power consumption of the entire memory can be reduced significantly.

By having a structure as the above, only an input signal of a memory block including a memory cell from/to which data is to be read or written is changed, and input signals of other memory blocks are not changed. That is, power consumption in the memory blocks other than the memory block including the memory cell is the power consumption in a waiting period; thus, power consumption of the entire memory circuit is reduced. Accordingly, a high-performance semiconductor device consuming low power can be provided.

This embodiment mode can be freely combined with any description of other embodiment modes in this specification.

Embodiment Mode 3

In this embodiment mode, an example of forming a static RAM (SRAM), which is one component included in a semiconductor device of the present invention, is described with reference to FIGS. 19A to 21B.

Figure 19A:
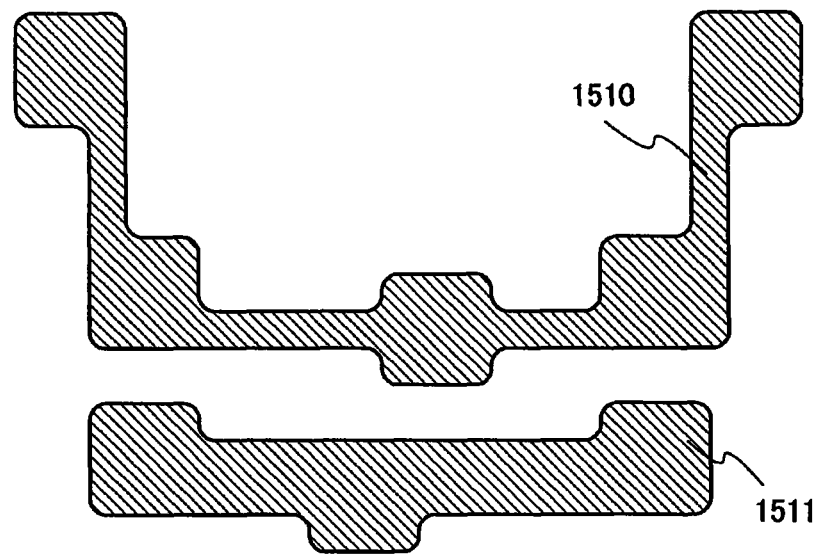
FIGS. 19A and 19B illustrate an example of a method for manufacturing a semiconductor device of the present invention.

Semiconductor layers 1510 and 1511 shown in FIG. 19A are preferably formed using silicon or a crystalline semiconductor including silicon as a component. For example, polycrystalline silicon obtained by crystallizing a silicon film by laser annealing, monocrystalline silicon, or the like is applied. Alternatively, a metal oxide semiconductor, amorphous silicon, or an organic semiconductor exhibiting a semiconductor characteristic can be applied.

In any case, a semiconductor layer formed first is formed over an entire surface of a substrate having an insulating surface or a portion thereof (a region having a larger area than a region that is set as a semiconductor region of a transistor). Then, a mask pattern is formed over the semiconductor layer by a photolithography technique. By subjecting the semiconductor layer to an etching treatment utilizing the mask pattern, the semiconductor layers 1510 and 1511 that are island-shaped, each including a source region, a drain region, and a channel formation region of a TFT, are formed. Shapes of the semiconductor layers 1510 and 1511 are decided in consideration of the appropriateness of a layout.

Figure 19B:
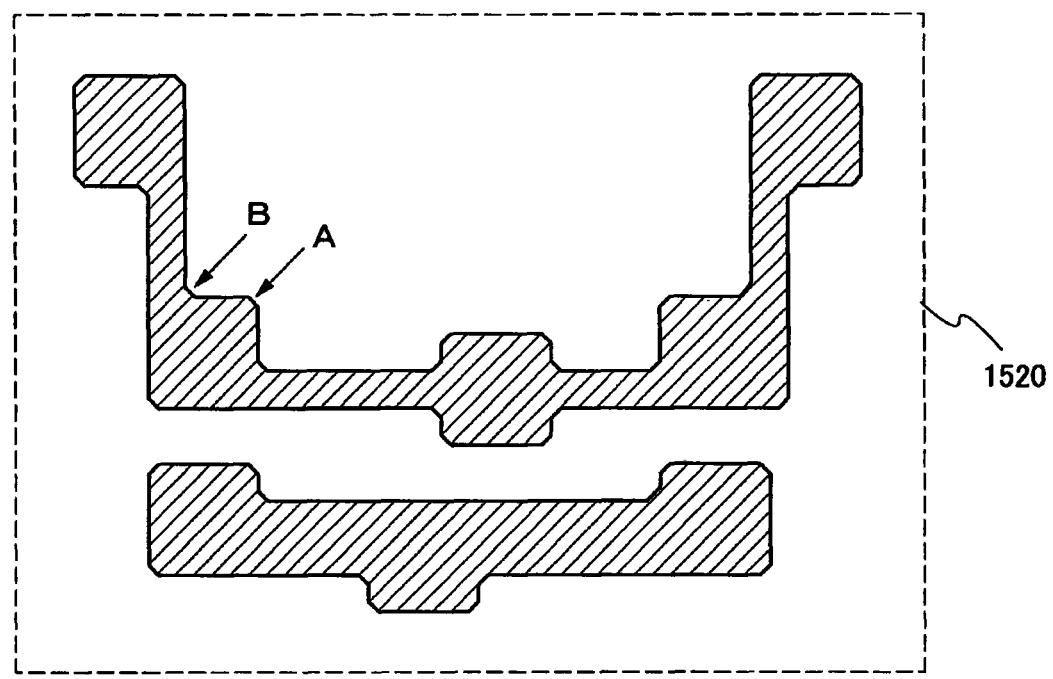

A photomask for forming the semiconductor layers 1510 and 1511 shown in FIG. 19A has a mask pattern 1520 shown in FIG. 19B. This mask pattern 1520 differs depending on whether a resist used in a photolithography step is a positive-type or a negative-type. In a case where a positive-type resist is used, the mask pattern 1520 shown in FIG. 19B is formed as a light-shielding portion. The mask pattern 1520 has a polygonal shape where an apex A is removed. Also, a bend portion B has a bent shape so that a corner portion thereof does not have a right angle. In this photomask pattern, for example, a right triangle with a side of 10 μm or less in a corner portion of the pattern is removed.

A shape of the mask pattern 1520 shown in FIG. 19B is reflected on the semiconductor layers 1510 and 1511 shown in FIG. 19A. In that case, a shape similar to that of the mask pattern 1520 may be transferred, but the transferred shape may be a shape which has a rounder corner portion than that of the mask pattern 1520. In other words, the shape may be a smoother pattern shape than the shape of the mask pattern 1520, with a rounded portion.

Figure 20A:
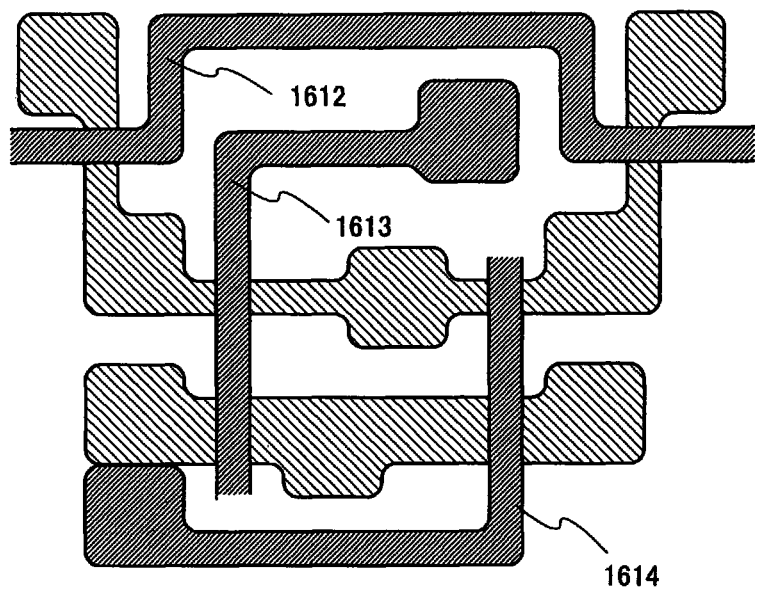
FIGS. 20A and 20B illustrate an example of a method for manufacturing a semiconductor device of the present invention.

Over the semiconductor layers 1510 and 1511, an insulating layer at least partially including silicon oxide or silicon nitride is formed. One object for forming this insulating layer is to form a gate insulating layer. Then, as shown in FIG. 20A, gate wirings 1612, 1613, and 1614 are formed so as to partially overlap with the semiconductor layers. The gate wiring 1612 is formed to correspond to the semiconductor layer 1510, the gate wiring 1613 is formed to correspond to the semiconductor layers 1510 and 1511, and the gate wiring 1614 is formed to correspond to the semiconductor layers 1510 and 1511. The gate wirings are formed by forming a metal layer or a semiconductor layer with high conductivity and then shaping it over an insulating layer by a photolithography technique.

Figure 20B:
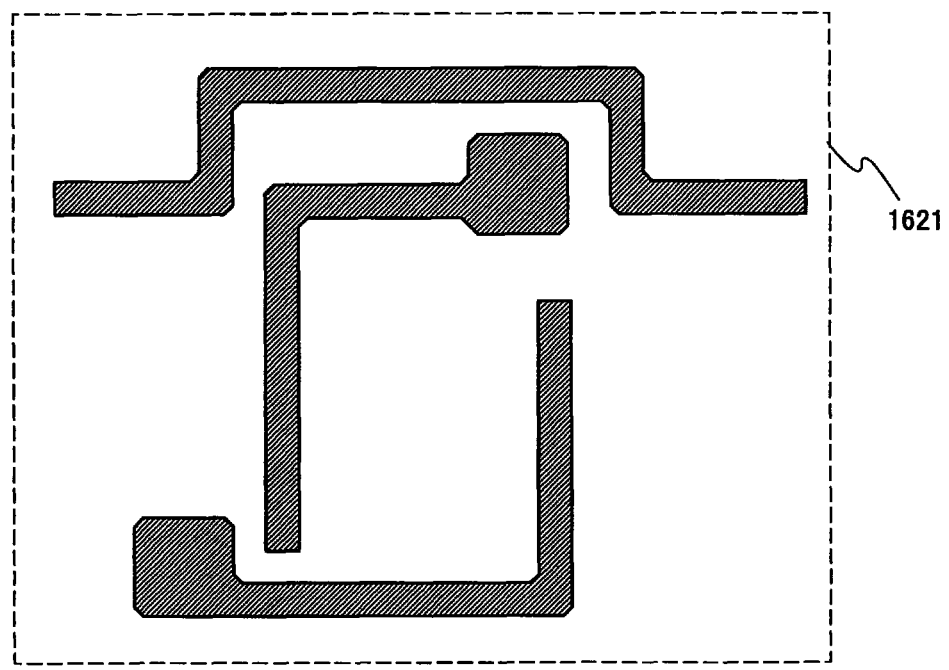

A photomask for forming this gate wiring has a mask pattern 1621 shown in FIG. 20B. A right triangle with a side of 10 μm or less or a triangle with a side having a length that is greater than or equal to ⅕ and less than or equal to ½ of a wiring width is removed from a corner portion of this mask pattern 1621. A shape of the mask pattern 1621 shown in FIG. 20B is reflected on the gate wirings 1612, 1613, and 1614 shown in FIG. 20A. In that case, a shape similar to that of the mask pattern 1621 may be transferred, but the transferred shape may be a shape which has a rounder corner portion than that of the mask pattern 1621. In other words, the shape of the gate wirings may be a smoother pattern shape than the shape of the mask pattern 1621, with a rounded portion. That is, a corner portion of each of the gate wirings 1612, 1613, and 1614 is rounded off so that ⅕ to ½ of a wiring width is removed. Accordingly, tremendous improvement in yield can be realized as a result of a convex portion suppressing generation of fine powder due to abnormal electrical discharge when performing dry etching with plasma, and a concave portion washing away the fine powder easily collected at a corner when washing is performed, even if such fine powder is generated.

An interlayer insulating layer is a layer formed after the gate wirings 1612, 1613, and 1614. The interlayer insulating layer is formed using an inorganic insulating material such as silicon oxide, or an organic insulating material that uses polyimide, an acrylic resin, or the like. Between this interlayer insulating layer and the gate wirings 1612, 1613, and 1614, an insulating layer of silicon nitride, silicon nitride oxide, or the like may be provided. Also, an insulating layer of silicon nitride, silicon nitride oxide, or the like may also be provided over the interlayer insulating layer. This insulating layer can prevent contamination of the semiconductor layers or the gate insulating layer by an impurity such as an exogenous metal ion or moisture, which is not good for a TFT.

Figure 21A:
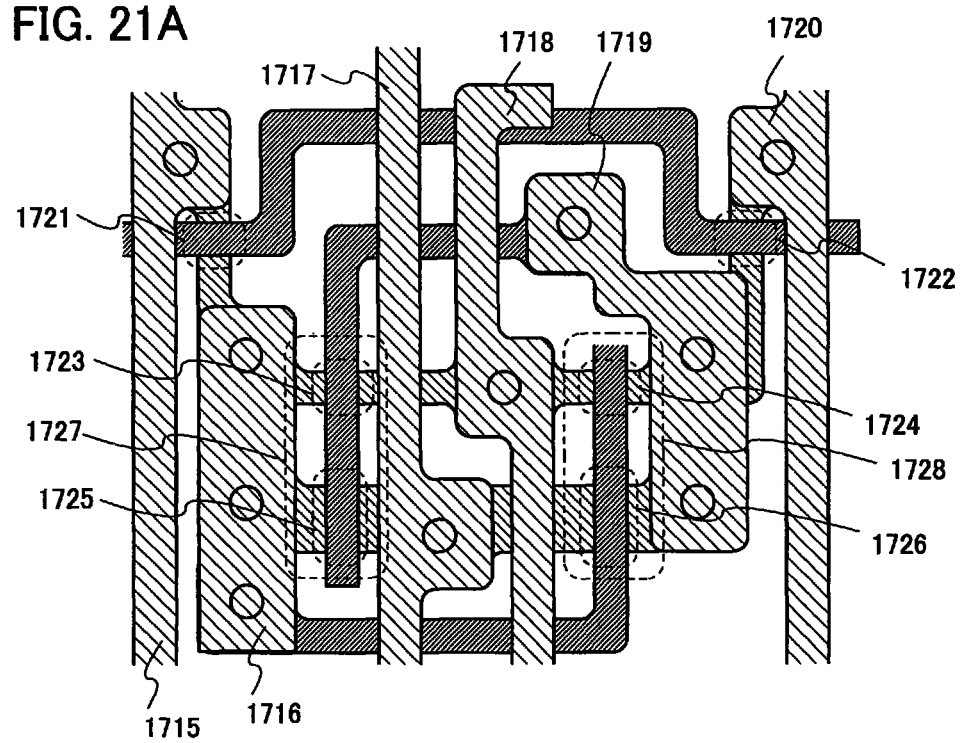
FIGS. 21A and 21B illustrate an example of a method for manufacturing a semiconductor device of the present invention.

In the interlayer insulating layer, an open portion is formed in a predetermined position. For example, the open portion is provided to correspond to the gate wiring or semiconductor layer that is in a lower layer. A wiring layer, which is formed of a single layer of a metal or a metal compound, or a plurality of layers thereof, is formed to have a prescribed pattern by an etching process using a mask pattern formed by a photolithography technique. Then, as shown in FIG. 21A, wirings 1715 to 1720 are formed so as to partially overlap with the semiconductor layers. The wirings link specific elements. The wirings do not link the specific elements in a straight line, and there is a bend portion because of a limitation in terms of layout. Also, a wiring width changes in a contact portion or in another region. In the contact region, in a case where a contact hole is as large as the wiring width or larger, the wiring width changes so as to be wider in the contact portion.

Figure 21B:
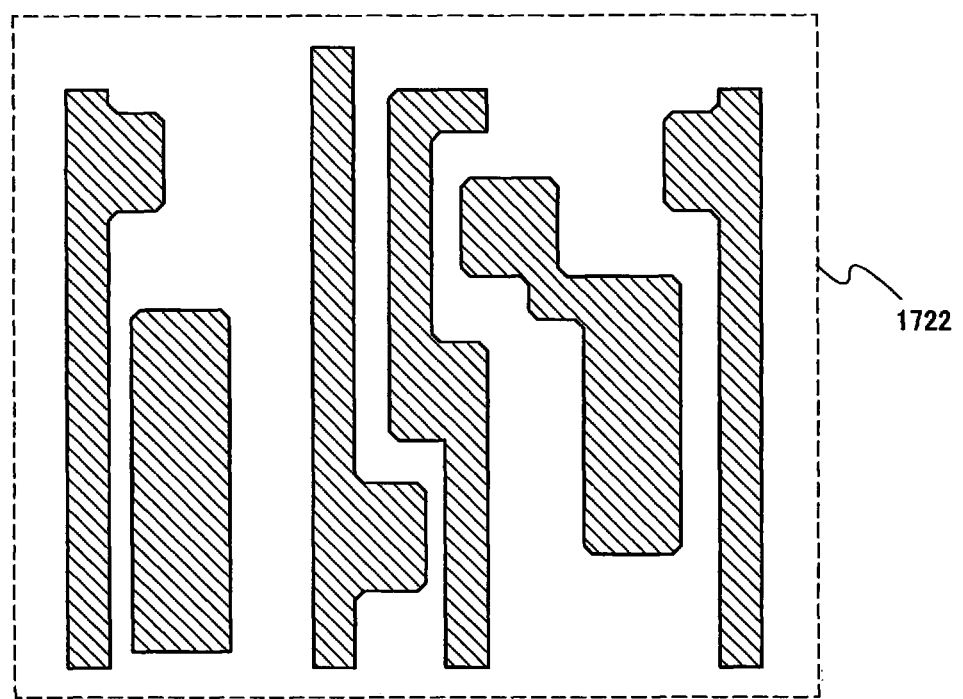

A photomask for forming these wirings 1715 to 1720 has a mask pattern 1722 shown in FIG. 21B. In this case also, a right triangle with a side of 10 μm or less or a triangle with a side having a length that is greater than or equal to ⅕ and less than or equal to ½ of a wiring width is removed from a corner portion of each of the wirings so that the corner portion has a rounded pattern. The corner portion is rounded off so that ⅕ to ½ of a wiring width is removed. With such wirings, tremendous improvement in yield can be realized as a result of a convex portion suppressing generation of fine powder due to abnormal electrical discharge when performing dry etching with plasma, and a concave portion washing away the fine powder easily collected at a corner when washing is performed, even if such fine powder is generated. By the corner portions of the wirings being rounded, they can conduct electricity more easily. Further, with a plurality of parallel wirings, it is very convenient in washing away dust.

In FIG. 21A, n-channel thin film transistors 1721 to 1724 and p-channel thin film transistors 1725 and 1726 are formed. The n-channel thin film transistor 1723 and the p-channel thin film transistor 1725 form an inverter 1727, and the n-channel thin film transistor 1724 and the p-channel thin film transistor 1726 form an inverter 1728. A circuit including these six thin film transistors forms an SRAM. In a layer above these thin film transistors, an insulating layer of silicon nitride, silicon oxide, or the like may be formed.

With such a structure as the above, a high-performance semiconductor element consuming low power can be provided to be lighter in weight and lower in cost.

This embodiment mode can be freely combined with any description of other embodiment modes in this specification.

Embodiment Mode 4

In this embodiment mode, a transistor forming a semiconductor device of the present invention is described with reference to FIG. 22 and FIGS. 23A to 23E.

Figure 22:
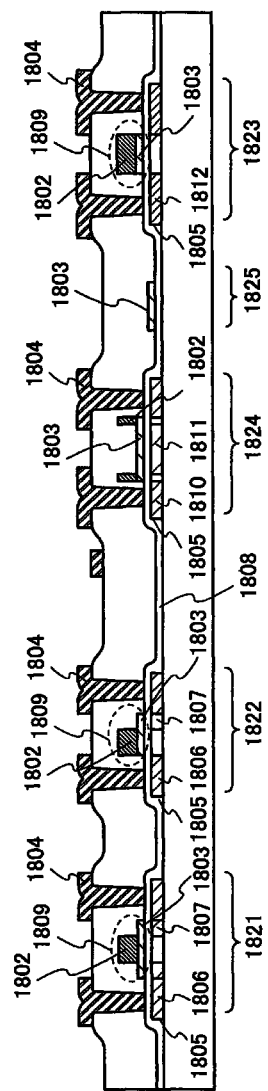
FIG. 22 illustrates an example of a semiconductor device of the present invention.

The transistor forming the semiconductor device of the present invention can include a thin film transistor (TFT) instead of a MOS transistor formed over a single crystalline substrate. FIG. 22 is a view showing a cross-sectional structure of a thin film transistor forming such circuits. In FIG. 22, an n-channel thin film transistor 1821, an n-channel thin film transistor 1822, a capacitor element 1824, a resistance element 1825, and a p-channel thin film transistor 1823 are shown. Each thin film transistor includes a semiconductor layer 1805, an insulating layer 1808, and a gate electrode 1809. The gate electrode 1809 is formed of a stacked structure of a first conductive layer 1803 and a second conductive layer 1802. Also, FIGS. 23A to 23E are top views of the n-channel thin film transistor 1821, the n-channel thin film transistor 1822, the capacitor element 1824, the resistance element 1825, and the p-channel thin film transistor 1823 shown in FIG. 22, respectively, which can also be referred to.

In the n-channel thin film transistor 1821 in FIG. 22, an impurity region 1807 is formed on both sides of a gate electrode in the semiconductor layer 1805. The impurity region 1807 is also called a low-concentration drain (LDD) and is doped at a lower concentration than an impurity concentration of an impurity region 1806 formed as a source region or drain region which forms a contact with a wiring 1804. In a case of the n-channel thin film transistor 1821, phosphorus or the like is added to the impurity region 1806 and the impurity region 1807 as an impurity imparting n-type conductivity. The LDD is formed as a means to suppress hot electron degradation or a short-channel effect.

Figure 23A:
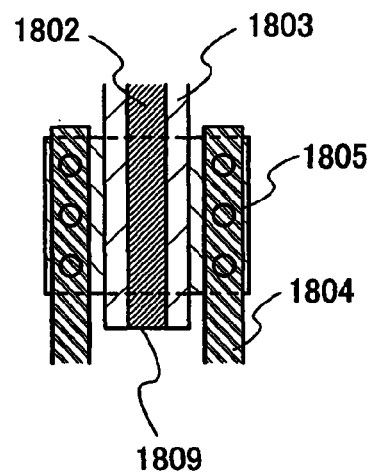
FIGS. 23A to 23E each illustrate an example of a semiconductor device of the present invention.

As shown in FIG. 23A, in the gate electrode 1809 of the n-channel thin film transistor 1821, the first conductive layer 1803 is formed to expand past both sides of the second conductive layer 1802. In this case, a film thickness of the first conductive layer 1803 is thinner than a film thickness of the second conductive layer. The thickness of the first conductive layer 1803 is a thickness through which ion species that has accelerated in an electric field of 10 to 100 kV can pass through. The impurity region 1807 is formed to overlap with the first conductive layer 1803 of the gate electrode 1809. In other words, an LDD region that overlaps with the gate electrode 1809 is formed. In this structure, the impurity region 1807 is formed in a self-aligned manner by adding an impurity imparting one conductivity type through the first conductive layer 1803 with the second conductive layer 1802 used as a mask. That is, the LDD overlapping with the gate electrode is formed in a self-aligned manner.

A thin film transistor having an LDD on each side is applied to a rectifying TFT for a power source circuit or a thin film transistor forming a transmission gate (also called an analog switch) used for a logic circuit. An LDD is preferably provided on each side of a gate electrode for such TFTs, since both positive and negative voltages are applied to a source electrode or drain electrode.

Also, in a case of forming a gate wiring using the second conductive layer 1802, the first conductive layer 1803 may be patterned so that one side of the first conductive layer 1803 is aligned with one side of the second conductive layer 1802, and the other side of the first conductive layer 1803 is aligned with the other side of the second conductive layer 1802. As a result, a fine gate wiring can be formed. Also, it is not necessary that the LDD overlapping with the gate electrode be formed in a self-aligned manner.

Figure 23B:
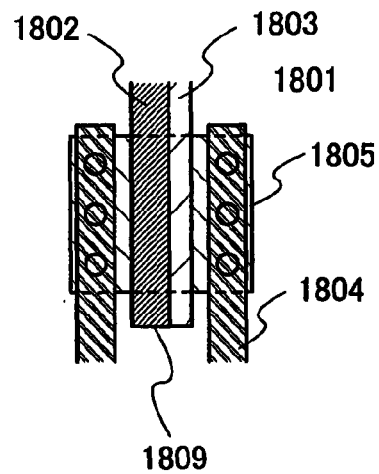

In the n-channel thin film transistor 1822 of FIG. 22, the impurity region 1807 doped at a lower concentration than an impurity concentration of the impurity region 1806 is formed on one side of the gate electrode in the semiconductor layer 1805. As shown in FIG. 23B, in the gate electrode 1809 of the n-channel thin film transistor 1822, the first conductive layer 1803 is formed to expand past one side of the second conductive layer 1802. Similarly, also in this case, the LDD can be formed in a self-aligned manner by adding an impurity imparting one conductivity type through the first conductive layer 1803 with the second conductive layer 1802 used as a mask.

A thin film transistor having an LDD on one side may be applied to a thin film transistor in which only a positive voltage or negative voltage is applied between a source electrode and a drain electrode. Specifically, it may be applied to a thin film transistor forming a logic gate such as an inverter circuit, a NAND circuit, a NOR circuit, or a latch circuit; or a thin film transistor forming an analog circuit such as a sense amplifier, a constant-voltage generating circuit, or a VCO.

Figure 23C:
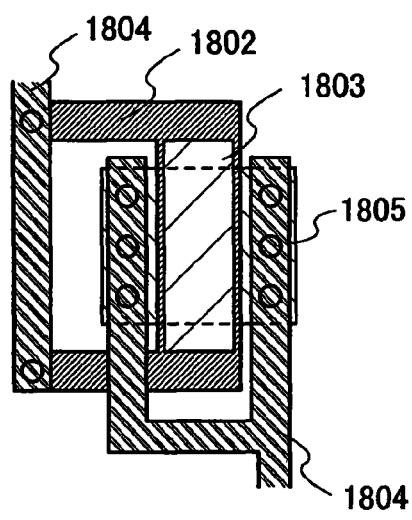

In FIG. 22, the capacitor element 1824 is formed by interposing the insulating layer 1808 between the first conductive layer 1803 and the semiconductor layer 1805. The semiconductor layer 1805 for forming the capacitor element 1824 includes impurity regions 1810 and 1811. The impurity region 1811 is formed in the semiconductor layer 1805 in a position overlapping with the first conductive layer 1803. The impurity region 1810 forms a contact with the wiring 1804. The impurity region 1811 can be formed by adding an impurity imparting one conductivity type through the first conductive layer 1803; therefore, impurity concentrations of the impurity regions 1810 and 1811 can be made to be either the same or different. In either case, since the semiconductor layer 1805 in the capacitor element 1824 functions as an electrode, the resistance of the semiconductor layer 1805 is preferably lowered by adding an impurity imparting one conductivity type. Further, the first conductive layer 1803 can fully function as an electrode by utilizing the second conductive layer 1802 as an auxiliary electrode as shown in FIG. 23C. In this manner, by forming a composite electrode structure where the first conductive layer 1803 and the second conductive layer 1802 are combined, the capacitor element 1824 can be formed in a self-aligned manner.

The capacitor element is used as a storage capacitor included in a power source circuit of a wireless chip or a resonant capacitor included in a resonance circuit. In particular, a resonant capacitor needs to function as a capacitor regardless of whether a voltage between two terminals of the capacitor is positive or negative, since both positive and negative voltages are applied between the two terminals.

Figure 23D:
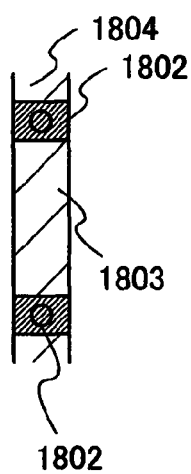

In FIG. 23D, the resistance element 1825 is formed of the first conductive layer 1803. Since the first conductive layer 1803 is formed with a thickness of about 30 to 150 nm, the resistance element can be formed by appropriately setting width and length of the first conductive layer 1803.

The resistance element is used for a resistance load included in a modulation/demodulation circuit of a wireless chip. Also, the resistance element may also be used as a load in a case where current is controlled by a VCO or the like. The resistance element may be formed of semiconductor layer containing an impurity element at high concentration or a thin metal layer. The metal layer is preferable because variation in resistance elements can be small, since resistance is determined by few parameters such as film thickness and film quality, as opposed to the semiconductor layer resistance of which is dependent on film thickness, film quality, impurity concentration, activation rate, and the like.

Figure 23E:
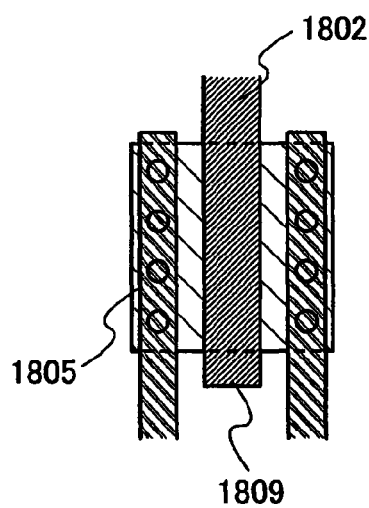

In FIGS. 22 and 23E, the p-channel thin film transistor 1823 includes an impurity region 1812 in the semiconductor layer 1805. This impurity region 1812 forms a source region or drain region which forms a contact with the wiring 1804. A structure of the gate electrode 1809 is such that the first conductive layer 1803 and the second conductive layer 1802 overlap with each other. The p-channel thin film transistor 1823 has a single drain structure in which an LDD is not provided. When forming the p-channel thin film transistor 1823, boron or the like is added to the impurity region 1812 as an impurity imparting p-type conductivity. Alternatively, by adding phosphorus to the impurity region 1812, an n-channel thin film transistor with a single drain structure is formed.

One or both of the semiconductor layer 1805 and the insulating layer 1808 that functions as a gate insulating layer may be oxidized or nitrided by high-density plasma treatment with the conditions of microwave excitation, an electron temperature of less than or equal to 2 eV, an ion energy of less than or equal to 5 eV, and an electron density of approximately $10^{11}$ to $10^{13}/cm^3$. At this time, by treating the layer in an oxygen atmosphere (e.g., $O_2$, $N_2O$, or the like) or a nitrogen atmosphere (e.g., $N_2$, $NH_3$, or the like) with the substrate temperature being set at 300 to 450° C., a defect level of an interface between the semiconductor layer 1805 and the insulating layer 1808 that functions as a gate insulating layer can be lowered. By performing such treatment to the insulating layer 1808 that functions as a gate insulating layer, the insulating layer 1808 that functions as a gate insulating layer can be made to be dense. That is, generation of defective charges can be suppressed, and thus fluctuations of the threshold voltage of the transistor can be suppressed. In addition, in the case of driving the transistor with a voltage of less than or equal to 3 V, an insulating layer oxidized or nitrided by the aforementioned plasma treatment can be used as the insulating layer 1808 that functions as a gate insulating layer. Meanwhile, in the case of driving the transistor with a voltage of greater than or equal to 3 V, the insulating layer 1808 that functions as a gate insulating layer can be formed by combining an insulating layer formed over the surface of the semiconductor layer 1805 by the aforementioned plasma treatment with an insulating layer deposited by a CVD method (a plasma CVD method or a thermal CVD method). Similarly, such an insulating layer can be utilized as a dielectric layer of the capacitor element 1824 as well. In this case, the insulating layer formed by the plasma treatment is a dense film with a thickness of 1 to 10 nm; therefore, a capacitor element with a high capacity can be formed.

As described with reference to FIG. 22 and FIGS. 23A to 23E, elements with various structures can be formed by combining conductive layers with various thicknesses. A region where only the first conductive layer is formed and a region where both the first conductive layer and the second conductive layer are formed can be formed by using a photomask or a reticle having a diffraction grating pattern or an auxiliary pattern which is formed of a semi-transmissive film and has a function of reducing the light intensity. That is, the thickness of the resist mask to be developed is varied by controlling the quantity of light that the photomask can transmit, at the time of exposing the photoresist to light in the photolithography step. In this case, a resist with the aforementioned complex shape may be formed by providing the photomask or the reticle with slits with a resolution limit or narrower than that. Further, the mask pattern formed of the photoresist material may be transformed by baking at approximately 200° C. after development.

By using a photomask or a reticle having a diffraction grating pattern or an auxiliary pattern which is formed of a semi-transmissive film and has a function of reducing the light intensity, the region where only the first conductive layer is formed and the region where the first conductive layer and the second conductive layer are stacked can be continuously formed. As shown in FIG. 23A, the region where only the first conductive layer is formed can be selectively formed over the semiconductor layer. Whereas such a region is effective over the semiconductor layer, it is not required in other regions (wiring regions which are connected to a gate electrode). With such a photomask or reticle, the region where only the first conductive layer is formed is not formed in the wiring portion; therefore, the density of the wiring can be increased.

In FIG. 22 and FIGS. 23A to 23E, the first conductive layer is formed with a thickness of 30 to 50 nm, using high-melting-point metals such as tungsten, chromium, tantalum, tantalum nitride, or molybdenum, or alloys or compounds containing such metals as a main component, while the second conductive layer is formed with a thickness of 300 to 600 nm, using high-melting-point metals such as tungsten, chromium, tantalum, tantalum nitride, or molybdenum, or alloys or compounds containing such metals as a main component. For example, the first conductive layer and the second conductive layer are formed with different conductive materials, so that the etching rate of each conductive layer can be varied in the etching step to be performed later. For example, tantalum nitride can be used for the first conductive layer, while a tungsten film can be used for the second conductive layer.

This embodiment mode shows that transistors, a capacitor element, and a resistance element each having a different electrode structure can be formed through the same patterning step, using a photomask or a reticle having a diffraction grating pattern or an auxiliary pattern which is formed of a semi-transmissive film and has a function of reducing the light intensity. Accordingly, elements with different modes can be formed and integrated in accordance with the characteristics required of a circuit, without increasing the number of manufacturing steps.

By forming a semiconductor device with such a thin film transistor as the foregoing, a high-performance wireless chip consuming low power can be provided to be lighter in weight and lower in cost.

This embodiment mode can be freely combined with any description of other embodiment modes in this specification.

Embodiment Mode 5

In recent years, a compact semiconductor device (hereinafter referred to as a wireless chip) that is a combination of an ultra compact IC chip and an antenna for wireless communication has received a lot of attention. Data can be written to or read from the wireless chip by transferring and receiving a communication signal (operation magnetic field) using a wireless communication device (hereinafter referred to as a reader/writer). The wireless chip is also referred to as an RFID (Radio Frequency Identification) tag, an ID tag, an IC tag, an IC chip, an RF tag, a wireless tag, or an electronic tag.

Figure 24A:
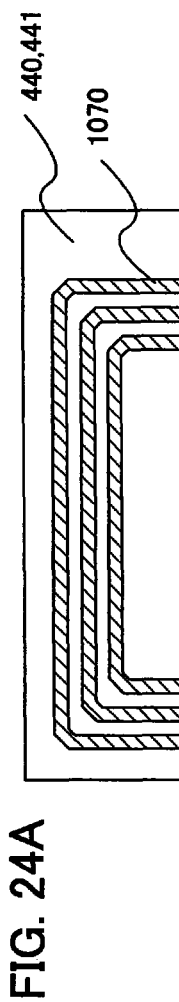
FIGS. 24A and 24B illustrate an example of a semiconductor device of the present invention.

As an application field of the wireless chip, merchandise management in the distribution industry is given as an example. Although merchandise management utilizing a barcode is widely used in general, since data of a barcode is read optically, data cannot be read when there is an interrupting object. Meanwhile, since the wireless chip reads data wirelessly, the data can be read even if there is an interruption object. Consequently, an improvement in efficiency of merchandise management and reduction in cost can be realized. In addition, the wireless chip can be widely applied to, for example, train tickets, airplane tickets, and automatic resets. Hereinafter, a semiconductor device capable of transmitting and receiving data wirelessly is described with reference to drawings. FIG. 24A shows a top view of a semiconductor device of this embodiment mode, and FIG. 24B shows a cross-sectional view taken along a line X-Y of FIG. 24A.

As shown in FIG. 24A, in the semiconductor device of this embodiment mode, an integrated circuit 1302 and an antenna 1070 are interposed between substrates 440 and 441.

Figure 24B:
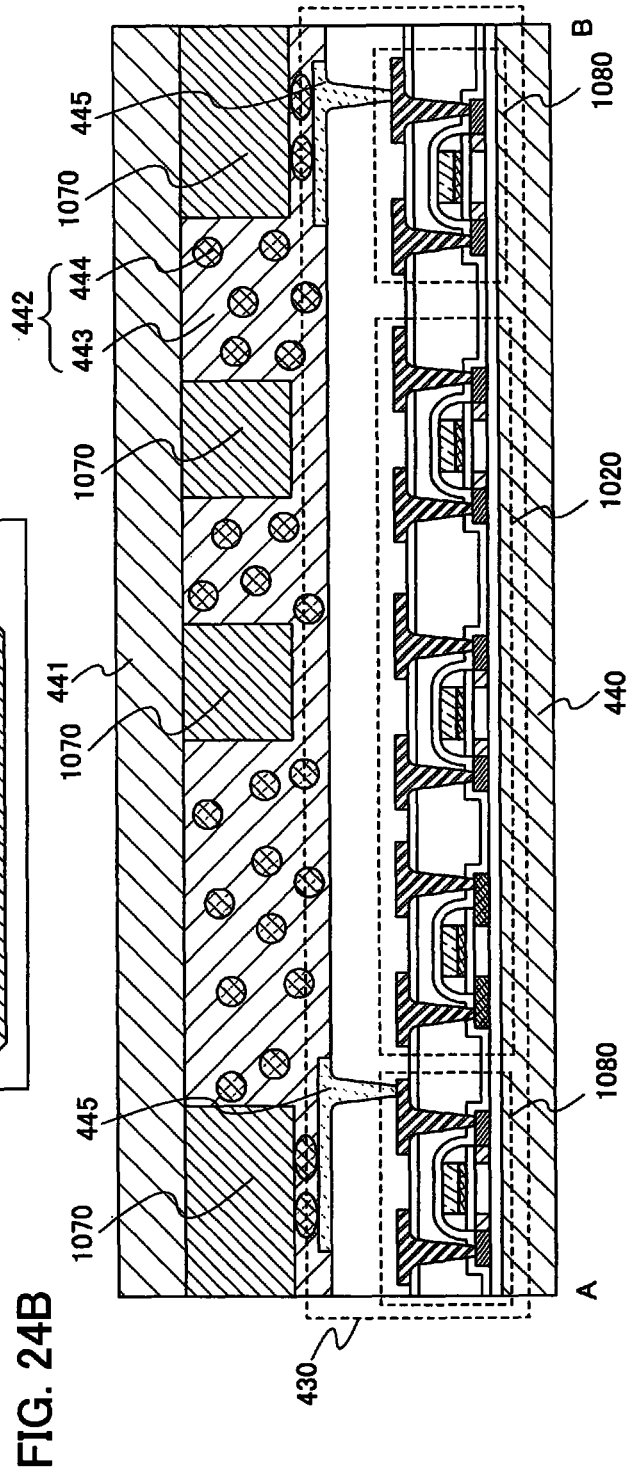

As shown in FIG. 24B, in the semiconductor device, the antenna 1070 provided over the substrate 441 and an element formation layer 430 provided over the substrate 440 are firmly attached to each other by an anisotropic conductive adhesive 442. Further, the anisotropic conductive adhesive 442 includes an organic resin 443 and conductive particles 444. A connecting terminal 445 of the element formation layer 430 is electrically connected to the antenna 1070 by the conductive particles 444.

Note that there is no particular limitation on the connection between the connecting terminal 445 and the antenna 1070. For example, the antenna 1070 and the connecting terminal 445 may be connected to each other using a wire bonding connection or a bump connection. Further, an ACF (anisotropic conductive film) can be used to attach the connecting terminal 445 and the antenna 1070 to each other.

The element formation layer 430 can serve as part of an analog portion, excluding the antenna, and a digital portion of the semiconductor device shown in FIG. 1. Here, as the element formation layer 430, a thin film transistor that forms a resonant circuit 1080 is shown as a representative example of the analog portion, and a thin film transistor that forms a CPU 1020 is shown as a representative example of the digital portion.

Note that here, thin film transistors are used in the resonant circuit 1080 and the digital portion; however, each circuit may also include a resistance element, a capacitor element, a rectifying element, and the like.

Further, a MOS transistor formed on a Si wafer may be used for the element formation layer 430.

Figure 25A:
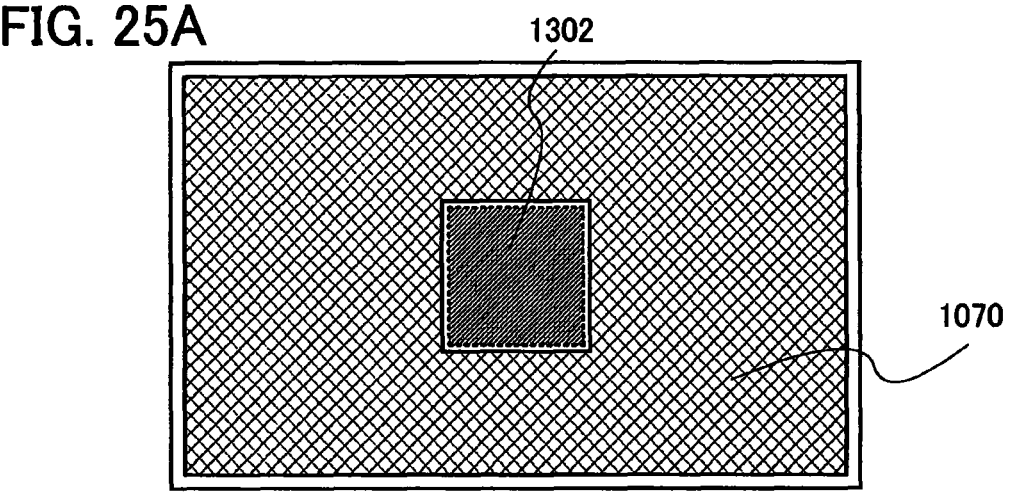
FIGS. 25A to 25D each illustrate an example of a semiconductor device of the present invention.
Figure 25B:
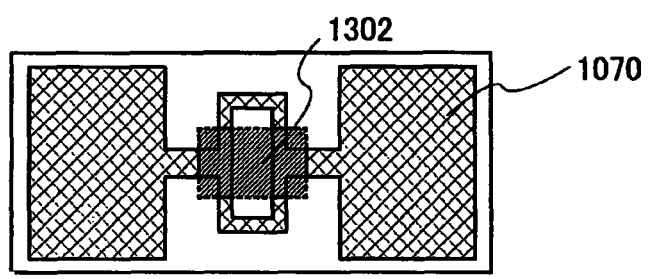
Figure 25C:
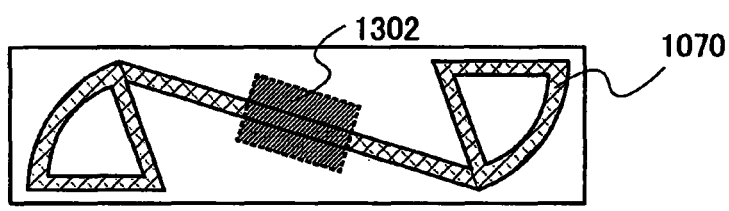
Figure 25D:
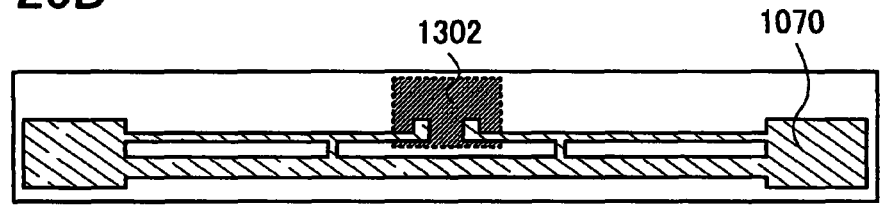

The shapes of an antenna which can be used in a semiconductor device of the present invention are described below. As an antenna shape which can be used in the semiconductor device, a coiled antenna such as the one shown in FIG. 24A can be used. Further, a structure may be used in which an antenna 1070 is disposed all around the integrated circuit 1302 which is over the substrate, as shown in FIG. 25A. Further, as shown in FIG. 25B, an antenna 1070 for receiving high frequency electromagnetic waves may be provided with respect to the integrated circuit 1302 which is over the substrate. Alternatively, as shown in FIG. 25C, an antenna 1070 which is 180 degree non-directional (so that it can receive signals equally from any direction) may be provided with respect to the integrated circuit 1302 which is over the substrate. Further alternatively, as shown in FIG. 25D, an antenna 1070 having a long rod-shape may be provided with respect to the integrated circuit 1302 which is over the substrate. Further, a patch antenna or a ceramic antenna may also be used. Further, the shape of the conductive layer which functions as an antenna is not limited to a linear shape. Taking a wavelength of an electromagnetic wave into consideration, the shape of the conductive layer may be curved, meandering, or a combination of these.

Here, an example is shown in FIG. 24B in which the element formation layer 430 and the antenna are provided on different substrates to each other and are electrically connected to each other by an anisotropic conductive material. However, the present invention is not limited to this. The antenna 1070 may be provided in the element formation layer 430.

Further, the appropriate length for the antenna differs according to the frequency used for reception.

A frequency of a signal transmitted or received between the antenna 1070 and the reader/writer is 125 kHz, 13.56 MHz, 915 MHz, 2.45 GHz, or the like. Each of these frequencies is set by ISO standards or the like. Of course, the frequency of the signal transmitted or received between the antenna 1070 and the reader/writer is not limited to this, and for example, any of the following frequencies can also be used: 300 GHz to 3 THz, which is a submillimeter wave, 30 GHz to 300 GHz, which is a millimeter wave, 3 GHz to 30 GHz, which is a microwave, 300 MHz to 3 GHz, which is an ultrahigh frequency wave, 30 MHz to 300 MHz, which is a very high frequency wave, 3 MHz to 30 MHz, which is a high frequency wave, 300 kHz to 3 MHz, which is a medium frequency wave, 30 kHz to 300 kHz, which is a low frequency wave, or 3 kHz to 30 kHz, which is a very low frequency wave. Further, a signal transmitted or received between the antenna 1070 and the reader/writer is a signal in which a carrier wave is modulated. As a method for modulating the carrier wave, analog modulation or digital modulation may be used. Amplitude modulation, phase modulation, frequency modulation, or spread spectrum may also be used. Preferably, amplitude modulation or frequency modulation is used.

As a method for transmitting a signal to the above-described semiconductor device which is capable of inputting and outputting data contactlessly, an electromagnetic coupling method, an electromagnetic induction method, a microwave method, or the like can be used. Preferably, the transmission method may be selected as appropriate taking an intended use of the device into account, and an antenna which is suitable for the transmission method is provided.

This embodiment mode can be freely combined with any description of other embodiment modes in this specification.

Embodiment Mode 6

In this embodiment mode, a structure including a booster antenna circuit (hereinafter referred to as a booster antenna) in a semiconductor device described in Embodiment Mode 5 is described with reference to drawings.

Note that the booster antenna described in this embodiment mode refers to an antenna (hereinafter referred to as a booster antenna) having a size larger than that of an antenna (hereinafter referred to as a chip antenna or an antenna circuit) which receives a signal from the reader/writer included in the semiconductor device and outputs the signal to an integrated circuit. The booster antenna refers to an antenna that can efficiently transmit a signal that oscillated from a reader/writer or a charger to a targeted semiconductor device, by resonating the signal at a frequency band which is used and coupling the chip antenna with the booster antenna itself through a magnetic field. Since the booster antenna is coupled with the coil antenna through a magnetic field, it is not necessary to directly connect the booster antenna to the chip antenna and the integrated circuit, which is preferable. Further, a capacitor element may be provided in the booster antenna to control capacitance.

There is no particular limitation on the shape of the antennas of the chip antenna and the booster antenna. For example, an antenna with the shape shown in FIG. 25A, described in Embodiment Mode 5, can be employed. However, taking the function of the booster antenna into consideration, an antenna with a shape larger than that of the antenna circuit which is coupled with the booster antenna through a magnetic field is preferably employed as the booster antenna.

Further, in this embodiment mode, signals received by a chip antenna 1090 and a booster antenna 1450 are preferably exchanged by an electromagnetic induction method. Therefore, a structure including the coiled chip antenna 1090 and the coiled booster antenna 1450 is preferable. FIGS. 26A and 26B show a structure in which the coiled chip antenna 1090, the coiled booster antenna 1450, and an integrated circuit 1302 are provided over one surface of a substrate 1600.

As shown in FIG. 26A, the semiconductor device includes, over the substrate 1600, a region 1601 where the integrated circuit 1302 and the chip antenna are formed, and the booster antenna 1450. Note that concerning the region 1601 where the integrated circuit 1302 and the chip antenna 1090 are formed, as shown in FIG. 26B, the integrated circuit 1302 and the chip antenna 1090 are formed, and a connecting terminal 1605a and a connecting terminal 1605b of the chip antenna 1090 are each connected to the integrated circuit 1302.

The shapes of the booster antenna 1450 and the chip antenna 1090 are not limited to those shown in the drawings. Various shapes can be used, as long as the transmitting and receiving frequencies tune in with each other. Preferably, the booster antenna 1450 takes the shape of a loop antenna, while the chip antenna takes the form of a miniaturized loop antenna. Note that the arrangement and structure of the semiconductor device are not limited to this, and the area ratio between the chip antenna 1090 and the booster antenna 1450 can be selected as appropriate. In FIGS. 26A and 26B, the integrated circuit 1302 and the booster antenna 1450 are disposed over the substrate 1600. However, the booster antenna 1450 may be provided over the back surface of the substrate 1600, for example.

The semiconductor device of this embodiment mode has the booster antenna in addition to the structure described in Embodiment Mode 5. Therefore, the semiconductor device of this embodiment mode has the advantage that data can be transmitted and received between an RFID and a reader/writer more reliably.

This embodiment mode can be freely combined with any description of other embodiment modes in this specification.

Embodiment Mode 7

In this embodiment mode, a manufacturing method of a wireless chip is described. Circuits included in a wireless chip according to the present invention can each be manufactured with a thin film transistor. In this embodiment mode, a method for manufacturing a flexible wireless chip is shown, in which a circuit included in a wireless chip is formed of a thin film transistor, and the circuit is transferred to a flexible substrate from a substrate used in manufacturing the thin film transistor.

In this embodiment mode, as a circuit included in a wireless chip, a p-channel TFT (also referred to as pch-TFT) included in an inverter or the like, an n-channel TFT (also referred to as nch-TFT), a capacitor, and an n-channel TFT of a high withstand voltage type provided for a power source circuit or the like are representatively described. Hereinafter, a manufacturing method of a wireless chip is described with reference to FIGS. 28A to 33.

Figure 28A:
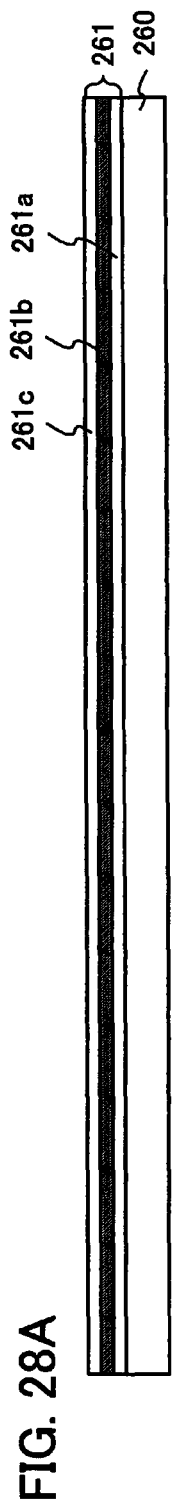
FIGS. 28A to 28D illustrate an example of a method for manufacturing a semiconductor device of the present invention.

A glass substrate is used for a substrate 260. As shown in FIG. 28A, a peeling layer 261 including three layers 261a to 261c is formed over the substrate 260. The first layer 261a is formed of a silicon oxynitride film ($SiO_xN_y$, x>y) with a thickness of 100 nm by a parallel plate type plasma CVD apparatus using $SiH_4$ and $N_2O$ as a source gas. The second layer 261b is formed of a tungsten film with a thickness of 30 nm using a sputtering apparatus. The third layer 261c is formed of a silicon oxide film with a thickness of 200 nm using a sputtering apparatus.

By the formation of the third layer 261c (silicon oxide), a surface of the second layer 261b (tungsten) is oxidized to form tungsten oxide at the interface. By the formation of the tungsten oxide, the substrate 260 can be easily separated when an element formation layer is transferred to another substrate later. The first layer 261a is a layer for keeping close contact with the second layer 261b during the manufacturing of the element formation layer.

The second layer 261b is preferably formed of a film including metal such as tungsten, molybdenum, titanium, tantalum, niobium, nickel, cobalt, zirconium, zinc, ruthenium, rhodium, palladium, osmium, or iridium, or a film including a compound of such metal. The second layer 261b can have a thickness of greater than or equal to 20 nm and less than or equal to 40 nm.

Figure 28B:
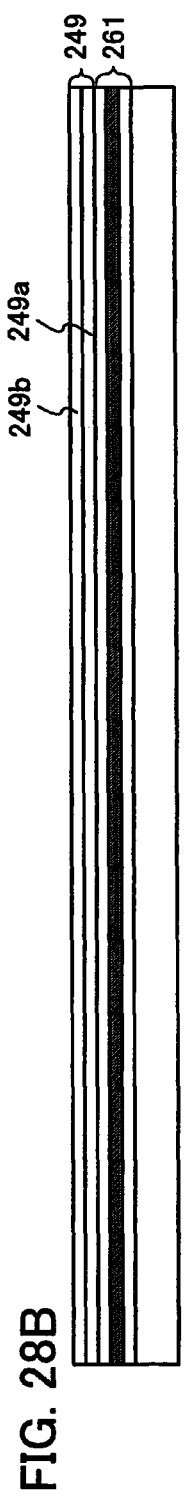

As shown in FIG. 28B, a base insulating layer 249 having a two-layer structure is formed over the peeling layer 261. A first layer 249a is formed of silicon oxynitride ($SiO_xN_y$, x<y) with a thickness of 50 nm by a plasma CVD apparatus using $SiH_4$, $N_2O$, $NH_3$, and $H_2$ as a source gas. The barrier property is increased by setting the composition ratio of nitrogen of the first layer 249a to be greater than or equal to and less than or equal to 40%. The second layer 249b is formed of silicon oxynitride ($SiO_xN_y$, x>y) with a thickness of 100 nm by a plasma CVD apparatus using $SiH_4$ and $N_2O$ as a material gas. The composition ratio of nitrogen of the second layer 249b is set to be less than or equal to 0.5%.

Figure 28C:
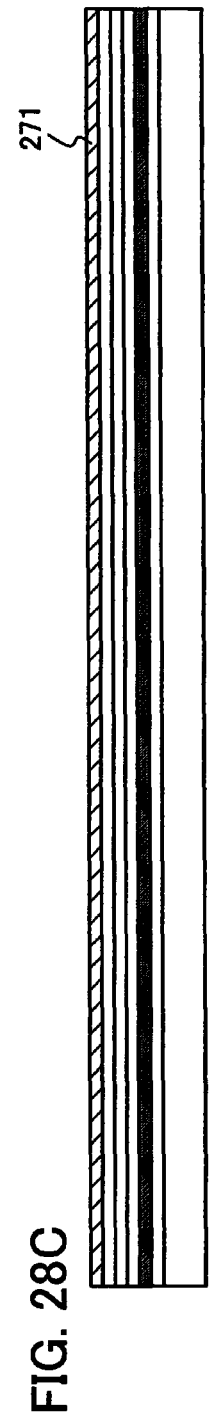

Subsequently, as shown in FIG. 28C, a crystalline silicon film 271 is formed over the base insulating layer 249. The crystalline silicon film 271 is manufactured by the following method. An amorphous silicon film is formed with a thickness of 66 nm by a plasma CVD apparatus using $SiH_4$ and $H_2$ as a source gas. The amorphous silicon film is irradiated with a laser so as to be crystallized; thus, the crystalline silicon film 271 is obtained. An example of a laser irradiation method is shown. A second harmonic (wavelength: 532 nm) of an LD-pumped $YVO_4$ laser is used for the irradiation. It is not necessary to limit to the second harmonic in particular, but the second harmonic is superior to third or higher-order harmonics in point of energy efficiency. An optical system is adjusted so that the beam on the irradiation surface has a linear shape with a length of about 500 μm and a width of about 20 μm and an intensity of 10 to 20 W. The beam is moved relative to the substrate at a speed of 10 to 50 cm/sec.

After forming the crystalline silicon film 271, a p-type impurity is added to the crystalline silicon film 271. Here, diborane ($B_2H_6$) diluted with hydrogen is used as a doping gas in an ion doping apparatus, so that boron is added to the entire crystalline silicon film 271. The crystalline silicon obtained by crystallizing amorphous silicon has a dangling bond; therefore, it is not intrinsic silicon but has a low n-type conductivity. Accordingly, addition of a minute amount of p-type impurities provides an effect of making the amorphous silicon film 271 into intrinsic silicon. This step may be conducted as necessary.

Figure 28D:
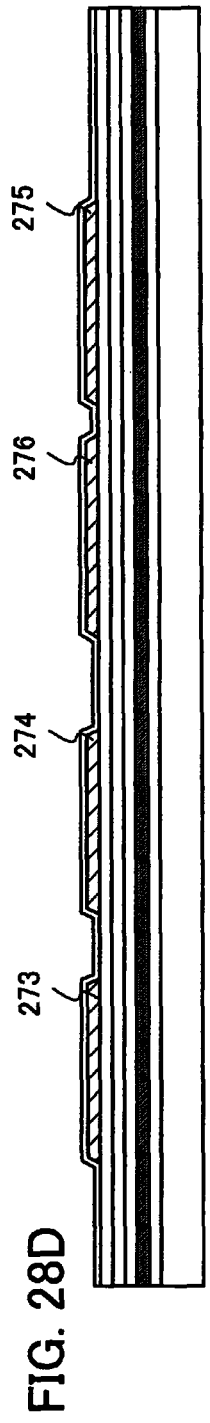

Next, as shown in FIG. 28D, the crystalline silicon film 271 is divided for each element to form semiconductor layers 273 to 276. With the use of the semiconductor layers 273 to 275, channel formation regions, source regions, and drain regions of TFTs are formed. The semiconductor layer 276 forms an electrode of an MIS capacitor. An example of a method for processing the crystalline silicon film 271 is shown. A resist is formed over the crystalline silicon film 271 by a photolithography step, and the crystalline silicon film 271 is etched by using the resist as a mask and using $SF_6$ and $O_2$ as an etchant by a dry etching apparatus; thus, the semiconductor layers 273 to 276 are formed in predetermined shapes.

As shown in FIG. 29A, a resist R31 is formed by a photolithography step and a minute amount of p-type impurities are added to the semiconductor layers 274 and 275 of the n-channel TFTs. Here, diborane ($B_2H_6$) diluted with hydrogen is used as a doping gas so that the semiconductor layers 274 and 275 are doped with boron by an ion doping apparatus. The resist R31 is removed after completion of the doping.

The step of FIG. 29A is performed for a purpose of avoiding the threshold voltage of the n-channel TFT becoming negative. Boron may be added to the semiconductor layers 274 and 275 of the n-channel TFTs at a concentration of greater than or equal to $5 \times 10^{15}$ atoms/cm$^3$ and less than or equal to $1 \times 10^{17}$ atoms/cm$^3$. The step of FIG. 29A may be conducted as necessary.

Next, as shown in FIG. 29B, an insulating film 277 is formed over an entire surface of the substrate 260. The insulating film 277 functions as a gate insulating film for the TFs and a dielectric for the capacitor. Here, the insulating film 277 is formed of a silicon oxynitride film ($SiO_xN_y$, x>y) with a thickness of 20 nm to 40 nm by a plasma CVD apparatus using $SiH_4$ and $N_2O$ as a source gas.

As shown in FIG. 29C, a resist R32 is formed by a photolithography step, and an n-type impurity is added to the semiconductor layer 276 of the capacitor. With the use of phosphine ($PH_3$) diluted with hydrogen as a doping gas, the semiconductor layer 276 is doped with phosphorus by using an ion doping apparatus, and an n-type impurity region 279 is formed over the entire semiconductor layer 276. The resist R32 is removed after completion of the doping step.

As shown in FIG. 29D, a conductive film 281 is formed over the insulating film 277. The conductive film 281 forms a gate electrode of the TFT, and the like. Here, the conductive film 281 has a multilayer structure of two layers. A first layer thereof is formed of tantalum nitride with a thickness of 30 nm and a second layer thereof is formed of tungsten with a thickness of 370 nm. The tantalum nitride and the tungsten are formed by a sputtering apparatus.

Figures 30A, 30B, 30C, 30D:
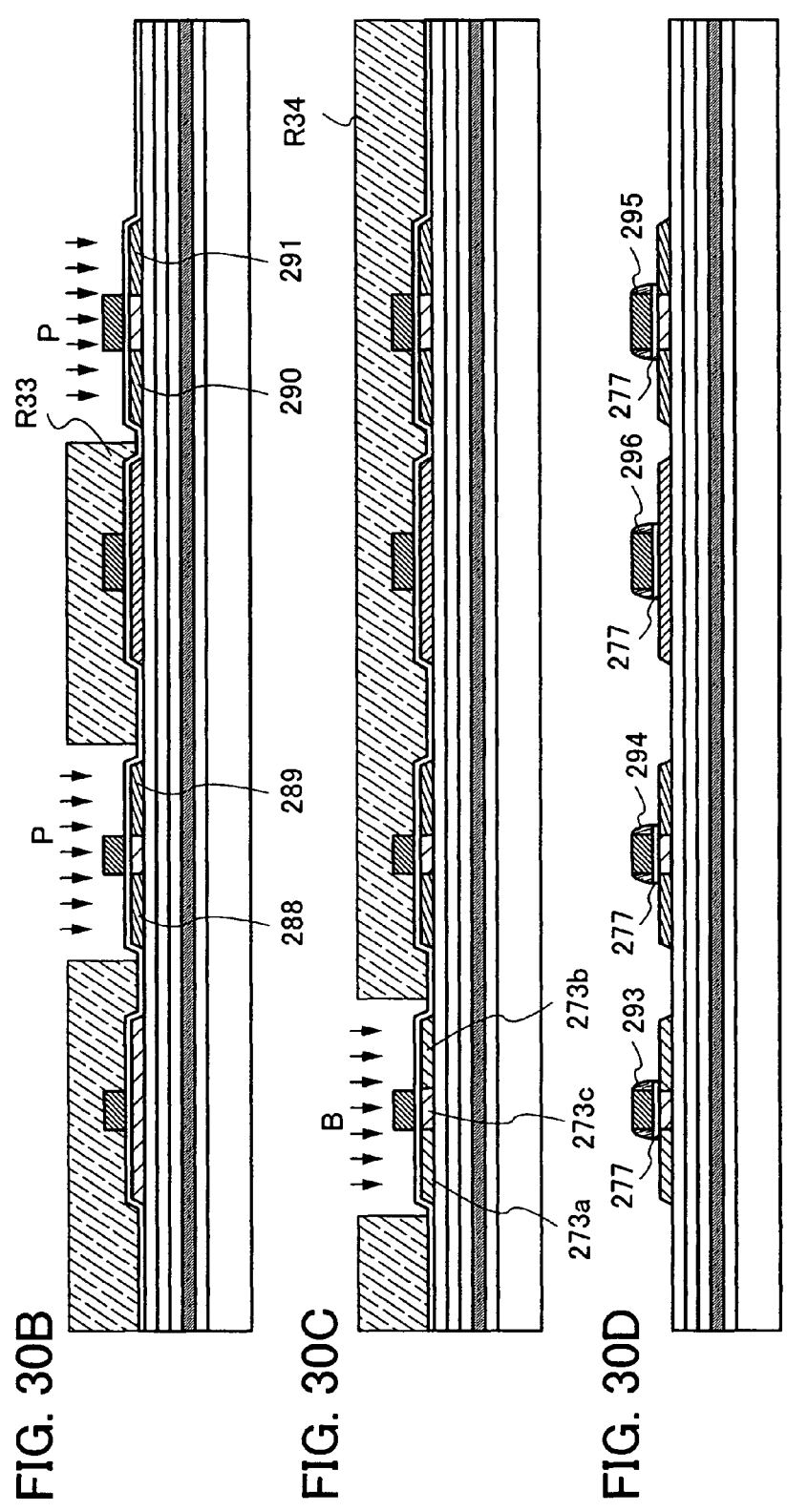
FIGS. 30A to 30D illustrate an example of a method for manufacturing a semiconductor device of the present invention.

Subsequently, a resist is formed over the conductive film 281 by a photolithography step, and the conductive film 281 is etched by an etching apparatus. Thus, first conductive films 283 to 286 are formed over the semiconductor layers 273 to 276 as shown in FIG. 30A. The first conductive films 283 to 285 serve as gate electrodes or gate wirings of the TFTs. In the n-channel TFT of a high withstand voltage type, the conductive film 285 is formed so that the gate width (channel length) is larger than that in the other TFTs. The first conductive film 286 forms one electrode of the capacitor.

The conductive film 281 is etched by a dry etching method. As an etching apparatus, an ICP (Inductively Coupled Plasma) etching apparatus is used. As an etchant, a mixed gas of $Cl_2$, $SF_6$, and $O_2$ is used first in order to etch the tungsten, and then the etchant to be introduced in a process chamber is changed to only a $Cl_2$ gas to etch the tantalum nitride.

As shown in FIG. 30B, a resist R33 is formed by a photolithography step. An n-type impurity is added to the semiconductor layers 274 and 275 of the n-channel TFT. N-type low-concentration impurity regions 288 and 289 are formed in a self-aligning manner in the semiconductor layer 274 by using the first conductive film 284 as a mask, and n-type low-concentration impurity regions 290 and 291 are formed in a self-aligning manner in the semiconductor layer 275 by using the first conductive film 285 as a mask. Phosphine ($PH_3$) diluted with hydrogen is used as a doping gas, and phosphorus is added to the semiconductor layers 274 and 275 by an ion doping apparatus. The step of FIG. 30B is a step for forming an LDD region in the n-channel TFT. The n-type impurity is included in the n-type low-concentration impurity regions 288 and 289 at a concentration of greater than or equal to $1 \times 10^{16}$ atoms/cm$^3$ and less than or equal to $5 \times 10^{18}$ atoms/cm$^3$.

As shown in FIG. 30C, a resist R34 is formed by a photolithography step, and a p-type impurity is added to the semiconductor layer 273 of the p-channel TFT. Since a portion of the semiconductor layer which remains as an n-type impurity region is covered with the resist R34, the exposed semiconductor layer 273 becomes a p-type impurity region. P-type high-concentration impurity regions 273a and 273b are formed in a self-aligning manner in the semiconductor layer 273 by using the first conductive film 283 as a mask. A region 273c covered with the first conductive film 283 is formed in a self-aligning manner as the channel formation region. Doping of the p-type impurity region uses diborane ($B_2H_6$) diluted with hydrogen as a doping gas. The resist R34 is removed after completion of the doping.

As shown in FIG. 30D, insulating layers 293 to 296 are formed on the side surfaces of the first conductive films 283 to 286. The insulating layers 293 to 296 are called sidewalls or side walls. First, a silicon oxynitride film ($SiO_xN_y$, x>y) is formed with a thickness of 100 nm by a plasma CVD apparatus using $SiH_4$ and $N_2O$ as a source gas. Subsequently, a silicon oxide film is formed to have a thickness of 200 nm by an LPCVD apparatus using $SiH_4$ and $N_2O$ as a source gas. A resist is formed by a photolithography step. First, using this resist, the silicon oxide film of an upper layer is subjected to a wet etching treatment with buffered hydrochloric acid. Next, the resist is removed, and by subjecting the silicon nitride oxide film of a lower layer to a dry etching treatment, the insulating layers 293 to 296 are formed. In accordance with a sequence of these steps, the insulating film 277 formed of silicon oxynitride is also etched and the insulating film 277 is left only under the first conductive films 283 to 286 and the insulating layers 293 to 296.

Figure 31A:
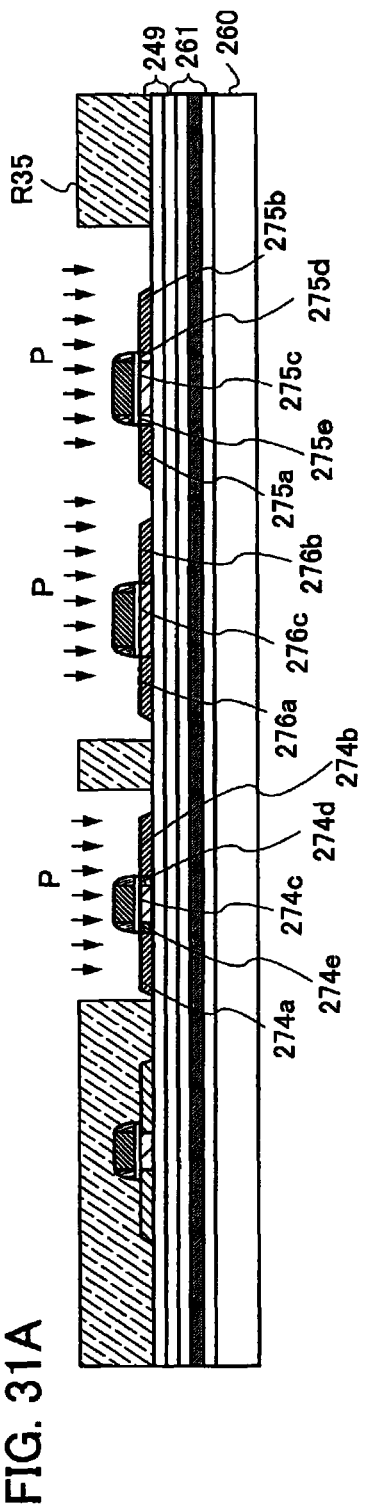
FIGS. 31A to 31C illustrate an example of a method for manufacturing a semiconductor device of the present invention.

As shown in FIG. 31A, a resist R35 is formed by a photolithography step. An n-type impurity is added to the semiconductor layers 274 and 275 of the n-channel TFTs and the semiconductor layer of the capacitor, thereby forming n-type high-concentration impurity regions. In the semiconductor layer 274, the n-type impurity is further added to the n-type low-concentration impurity regions 288 and 289 by using the first conductive film 284 and the insulating layer 294 as masks, thereby forming n-type high-concentration impurity regions 274a and 274b in a self-aligning manner. A region 274c overlapping with the first conductive film 284 is determined as a channel formation region in a self-aligning manner. In addition, regions 274e and 274d of the n-type low-concentration impurity regions 288 and 289 that overlap with the insulating layer 294 remain as n-type low-concentration impurity regions. Similarly to the semiconductor layer 274, n-type high-concentration impurity regions 275a and 275b, a channel formation region 275c, and n-type low-concentration impurity regions 275e and 275d are formed in the semiconductor film 275. Also, an n-type impurity is further added to the n-type impurity region 276 by using the first conductive film 286 and the insulating layer 296 as masks, thereby forming n-type high-concentration impurity regions 276a and 276b in a self-aligning manner. A region of the semiconductor layer 276 that overlaps with the first conductive film 286 and the insulating layer 296 is determined as an n-type impurity region 276c.

In the step of adding the n-type impurity, as aforementioned, an ion doping apparatus may be used and phosphine ($PH_3$) diluted with hydrogen may be used as a doping gas. The n-type high-concentration impurity regions 274a, 274b, 275a, and 275b of the n-channel TFTs are doped with phosphorus so that the concentration of phosphorus is in the range of greater than or equal to $1 \times 10^{20}$ atoms/cm$^3$ and less than or equal to $2 \times 10^{21}$ atoms/cm$^3$.

Figure 31B:
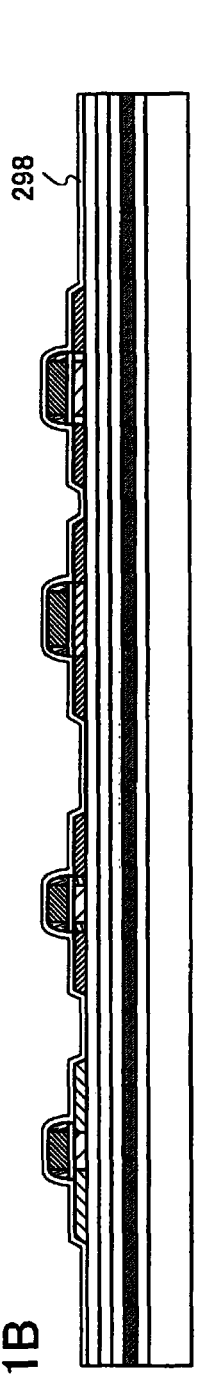

The resist R35 is removed to form a cap insulating film 298 as shown in FIG. 31B. The cap insulating film 298 is formed of a silicon oxynitride film ($SiO_xN_y$, x>y) with a thickness of 50 nm by a plasma CVD apparatus. $SiH_4$ and $N_2O$ are used as a source gas to form the silicon oxynitride film. After forming the cap insulating film 298, heat treatment is performed in a nitrogen atmosphere of 550° C. to activate the n-type impurity and the p-type impurity added to the semiconductor layers 273 to 276.

Figure 31C:
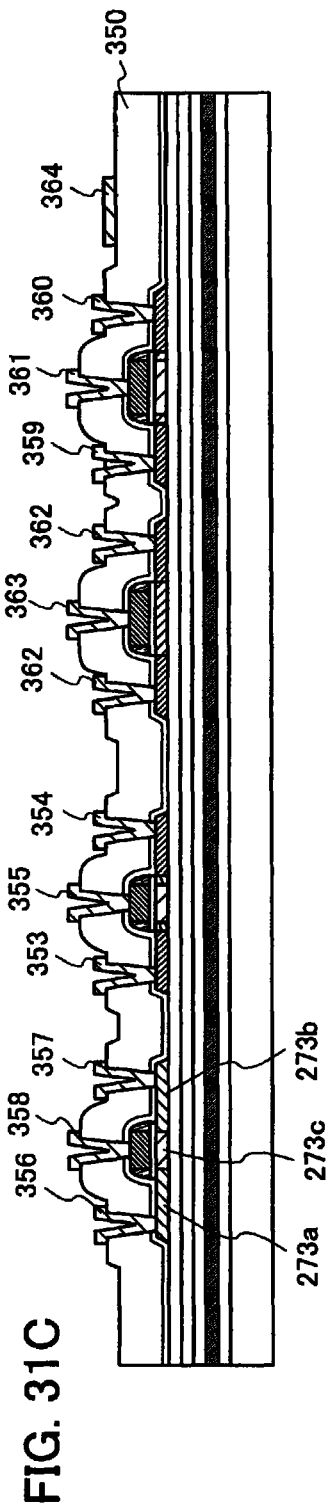

As shown in FIG. 31C, a first interlayer insulating film 350 is formed. In this embodiment mode, the first interlayer insulating film 350 has a two-layer structure. An insulating film of a first layer is formed of silicon oxynitride ($SiO_xN_y$, x<y) with a thickness of 100 nm by a plasma CVD apparatus using $SiH_4$ and $N_2O$ as a source gas. An insulating film of a second layer is formed of silicon oxynitride ($SiO_xN_y$, x>y) with a thickness of 600 nm by using $SiH_4$, $N_2O$, $NH_3$, and $H_2$ as a source gas by a plasma CVD apparatus.

The first interlayer insulating film 350 and the cap insulating film 298 are partially removed by a photolithography step and a dry etching step, thereby forming contact holes. A conductive film is formed over the first interlayer insulating film 350. Here, the conductive film is formed to have a four-layer structure in which titanium, titanium nitride, pure aluminum, and titanium nitride with a thickness of 60 nm, 40 nm, 500 nm, and 100 nm, respectively, are stacked in order from the bottom. These layers are formed by a sputtering apparatus. The conductive film is processed into a predetermined shape by a photolithography step and a dry etching step, thereby forming second conductive films 353 to 364.

Although the second conductive films and the first conductive films are connected to each other over the semiconductor layer in the drawing in order to explain the connection between the second conductive films and the first conductive films, in practice, the contact portion between the second conductive films and the first conductive films is formed so as to avoid a position over the semiconductor layer.

The n-type high-concentration impurity regions 276a and 276b are connected to each other by the second conductive film 362. Accordingly, an MIS capacitor of a stacked-layer structure including the n-type impurity region 276c, the insulating film 277, and the first conductive film 286 is formed. The second conductive film 364 forms a terminal of an antenna circuit, to which an antenna 372 is connected in a later step.

As shown in FIG. 32A, a second interlayer insulating film 366 is formed. In the second interlayer insulating film 366, contact holes reaching the second conductive film 364 are formed. An example of forming the second interlayer insulating film 366 using photosensitive polyimide is shown. Polyimide is applied to have a thickness of 1.5 μm by using a spinner. The polyimide is light-exposed by a photolithography step and developed, thereby forming polyimide having the contact holes therein. After the development, the polyimide is baked.

Further, a conductive film is formed over the second interlayer insulating film 366. This conductive film is processed into a predetermined shape by a photolithography step and an etching step, thereby forming a third conductive film 370. The conductive film that forms the third conductive film 370 is formed of Ti with a thickness of 100 nm by a sputtering apparatus. The third conductive film 370 serves as a bump of the antenna for connecting the antenna 372 with the terminal (second conductive film 364) of the antenna circuit.

As shown in FIG. 32B, a third interlayer insulating film 371 having an opening portion is formed. Here, the third interlayer insulating film 371 is formed of photosensitive polyimide by a similar method to the method for forming the second interlayer insulating film 366. The opening portion is formed in a region where the antenna 372 is formed.

As shown in FIG. 32B, the antenna 372 is formed. The antenna 372 with a predetermined shape is formed in the opening portion by evaporating aluminum using a metal mask with the use of an evaporation apparatus.

Figure 33:
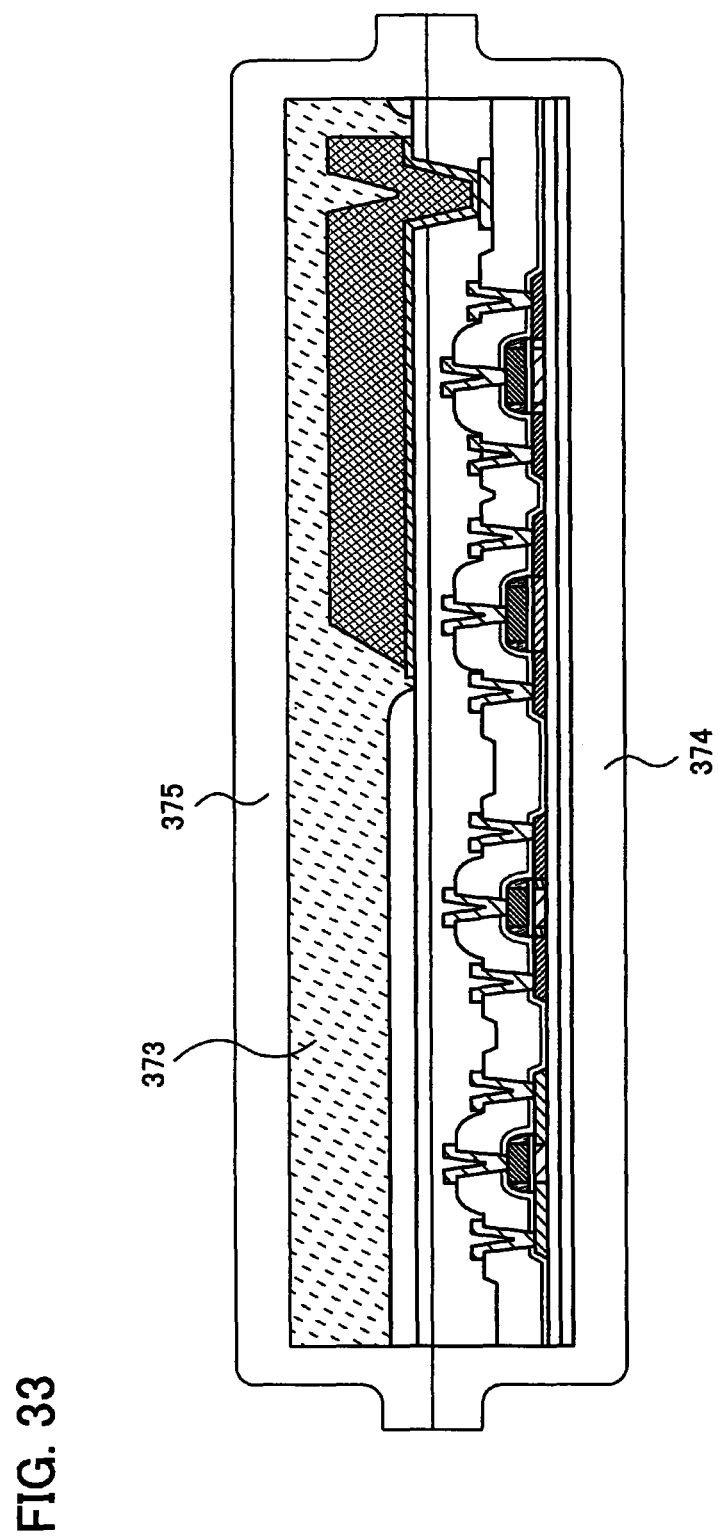
FIG. 33 illustrates an example of a method for manufacturing a semiconductor device of the present invention.

Through the steps shown in FIGS. 28A to 32B, a circuit forming a wireless chip is formed over the substrate 260. Next, a step in which the wireless chip is sealed in between the substrate 260 and a flexible substrate as shown in FIG. 33 is described.

A protective insulating layer 373 for protecting the antenna 372 is formed. Then, a photolithography step and an etching step are performed or laser light irradiation is performed, whereby the insulating films stacked over the substrate 260 is removed together with the protective insulating layer 373, and an opening portion that reaches the peeling layer 261 is formed. A plurality of circuits forming a plurality of the same wireless chips is formed over the substrate 260. The circuits are formed so that the circuits are separated from each other for every wireless chip.

Subsequently, after temporarily fixing the substrate for transfer onto the protective insulating layer 373, the substrate 260 is peeled off. Since the bond of the second layer 261b and the third layer 261c of the peeling layer 261 at the interface therebetween is weak, the peeling proceeds from the end of the opening portion by applying physical force, whereby the substrate 260 can be peeled from the element formation layer 250. The base insulating layer 249 from which the substrate 260 has been peeled is fixed to a flexible substrate 374 with an adhesive. Then, the substrate for the transfer is detached. Another flexible substrate 375 is fixed to the protective insulating layer 373 with the adhesive. Then, by performing heat treatment while applying pressure from the outside of the flexible substrates 374 and 375, a circuit forming a wireless chip is sealed by the flexible substrate 374 and the flexible substrate 375.

Although an example of forming the antenna 372 with a thin film transistor is described in this embodiment mode, an external antenna can also be used.

Also, although an example of peeling the substrate 260 used during manufacturing is described in this embodiment mode, the substrate used during manufacturing can be left. In this case, the substrate may be thinned by polishing or grinding so that substrate bends.

According to this embodiment mode, a thin and lightweight wireless chip that can be bent can be manufactured. Note that, the peeling method of a substrate described in this embodiment mode is not limited to a manufacturing method of a wireless chip, and by applying it to another semiconductor device, a semiconductor device that can be bent can be formed.

This embodiment mode can be freely combined with any description of other embodiment modes in this specification.
Embodiment Mode 8

In this embodiment mode, an application of a semiconductor device that exchanges data by wireless communication is described. A semiconductor device of the present invention can be used as a so-called ID label, ID tag, or ID card, which is provided in, for example, bills, coins, securities, bearer bonds, documents (such as driver's licenses or resident's cards), packaging containers (such as wrapping paper or bottles), storage media (such as DVD software or video tapes), vehicles (such as bicycles), personal belongings (such as bags or glasses), foods, plants, animals, human bodies, clothing, everyday articles, tags on goods such as an electronic appliance or on packs. An electronic appliance refers to a liquid crystal display device, an EL display device, a television set (also called simply a TV set, a TV receiver, or a television receiver), a mobile phone, or the like.

In this embodiment mode, applications of the present invention and an example of a product which includes the application of the present invention are described with reference to FIGS. 27A to 27E.

Figure 27A:
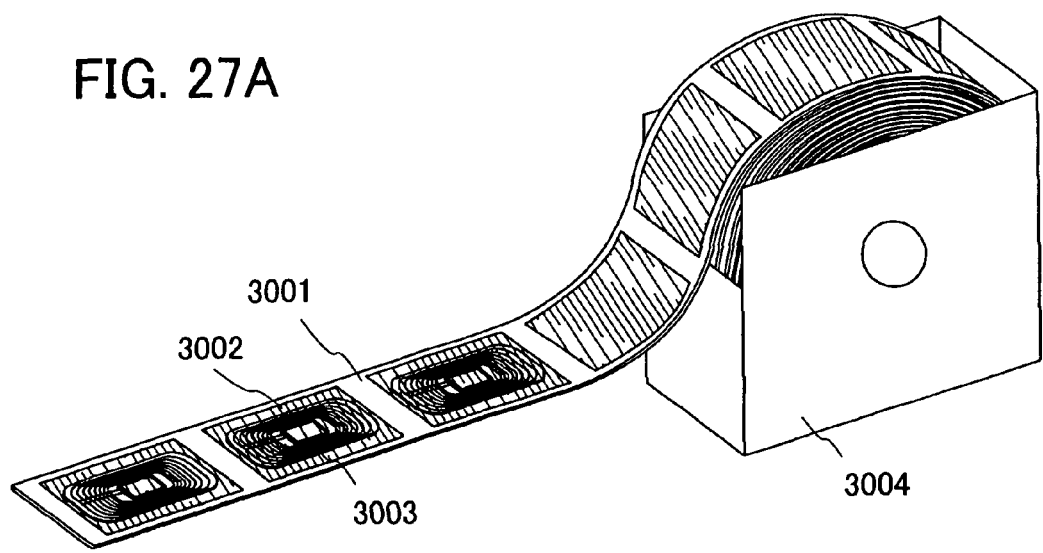
FIGS. 27A to 27E each illustrate an example of a usage pattern of a semiconductor device of the present invention.

FIG. 27A shows an example of completed products including semiconductor devices of the present invention. A plurality of ID labels 3003 each including an RFID 3002 are formed on a label board (separate paper) 3001. The ID labels 3003 are stored in a box 3004. In addition, on the ID label 3003, information about a product or service (a name of the product, a brand, a trademark, a trademark owner, a seller, a manufacturer, or the like) is written, while an ID number that is unique to the product (or the type of the product) is assigned to the included semiconductor device to make it possible to easily detect forgery, infringement of intellectual property rights such as trademark rights and patent rights, and illegality such as unfair competition. In addition, a large amount of information that cannot be clearly written on a container of the product or the label (for example, the production area, selling area, quality, raw material, efficacy, use, quantity, shape, price, production method, usage, time of the production, time of use, expiration date, instructions for the product, information about the intellectual property of the product, or the like) can be input to the semiconductor device so that a client or a consumer can access the information by using a simple reader. Further, the semiconductor device is structured such that the producer of a product can easily rewrite or erase information, for example, but a client or a consumer cannot.

Figure 27B:
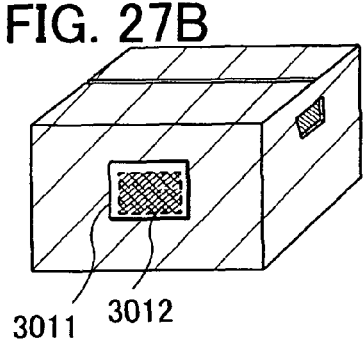

FIG. 27B shows a label-shaped ID tag 3011 including a semiconductor device 3012. By providing a product with the ID tag 3011, management of the product can be simplified. For example, in a case where a product is stolen, the product can be traced, so the culprit can be identified quickly. Thus, by providing the ID tag, products that are superior in so-called traceability can be distributed.

Figure 27C:
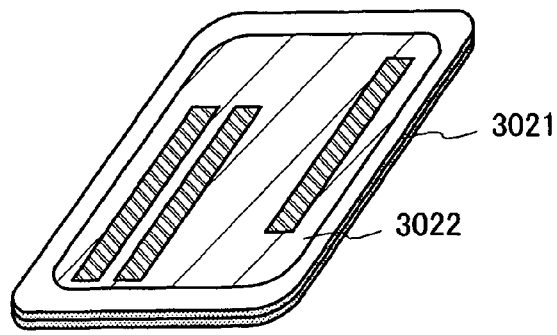

FIG. 27C shows an example of a completed ID card 3021 including a semiconductor device 3022 of the present invention. The ID card 3021 may be any kind of card, including a cash card, a credit card, a prepaid card, an electronic ticket, electronic money, a telephone card, a membership card, or the like.

Figure 27D:
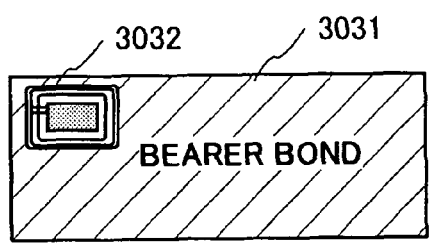

FIG. 27D shows an example of a completed bearer bond 3031. A semiconductor device 3032 is embedded in the bearer bond 3031 and is protected by a resin which forms the periphery of the semiconductor device. Here, the resin is filled with a filler. The bearer bond 3031 can be formed in the same manner as an ID label, an ID tag, or an ID card of the present invention. Note that the aforementioned bearer bond may be a stamp, a ticket, an admission ticket, a merchandise coupon, a book coupon, a stationery coupon, a beer coupon, a rice coupon, various types of gift coupon, various types of service coupon, or the like. Needless to say, the bearer bond is not limited thereto. In addition, when the semiconductor device 3032 of the present invention is provided in bills, coins, securities, bearer bonds, documents, or the like, an authentication function can be provided. Therefore, by using the authentication function, forgery can be prevented.

Figure 27E:
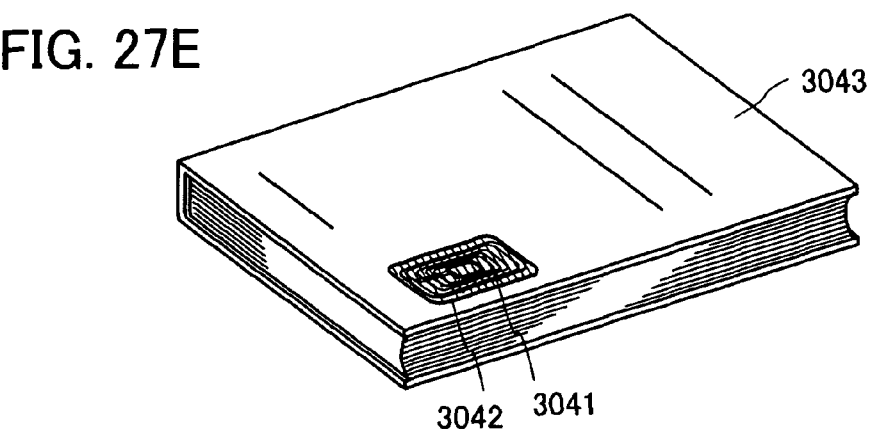

FIG. 27E shows a book 3043 to which an ID label 3041 including a semiconductor device 3042 of the present invention is attached. The semiconductor device 3042 of the present invention is firmly attached in or on goods by being attached to the surface or embedded therein, for example. As shown in FIG. 27E, the semiconductor device 3042 can be embedded in the paper of a book, or embedded in an organic resin of a package. Since the semiconductor device 3042 of the present invention can be small, thin, and lightweight, it can be firmly attached to or in goods without spoiling their design.

In addition, the efficiency of a system such as an inspection system can be improved by providing the semiconductor device of the present invention in, for example, packaging containers, storage media, personal belongings, foods, clothing, everyday articles, electronic appliances, or the like, although this is not illustrated here. Further, by providing the RFID on or in a vehicle, counterfeit and theft can be prevented. Living things such as animals can be easily identified by implanting the individual living things with the semiconductor device. For example, year of birth, sex, breed, or the like can be easily discerned by implanting the semiconductor device in living things such as domestic animals.

Thus, a semiconductor device of the present invention can be applied to any goods (including living things).

This embodiment mode can be freely combined with any description of other embodiment modes in this specification.

This application is based on Japanese Patent Application serial No. 2006-203438 filed in Japan Patent Office on Jul. 26, 2006, the entire contents of which are hereby incorporated by reference.

What is claimed is:

1. A semiconductor device comprising:
an arithmetic processing circuit;
a ROM;
a RAM; and
a memory control circuit,
wherein the arithmetic processing circuit is configured to execute a program to generate processing data and then terminate the program, wherein the ROM is configured to store the program, the program having stack analysis means and optimization means, wherein the RAM comprises a plurality of memory blocks, a border being defined between adjacent ones of the memory blocks wherein the processing data is divided into a plurality of stacks to be stored in the RAM, wherein the stack analysis means analyzes the stacks to obtain an analysis result that identifies a status of use of the stacks, including operations writing to the stacks, operations reading from the stacks, identification of contiguous writing stacks that do not cross the border between adjacent memory blocks, and identification of contiguous writing stacks that do cross the border between adjacent memory blocks, and provides a stack pointer, wherein the optimization means reads the analysis result and performs optimization of the processing data by identifying stacks that are written to but are not read until after the program terminates, reusing the identified stacks for rewriting of additional processing data to reduce the number of stacks used for performing writing of the data, and rearranging contiguous stacks that cross the border between adjacent memory blocks so that writing of such contiguous stacks occurs between borders of the memory blocks so that power consumption of the RAM can be reduced, and wherein the memory control circuit stores the optimized stacks in the memory blocks.

2. The semiconductor device according to claim 1, wherein the arithmetic processing circuit is configured to generate an address signal to store the data into the RAM, wherein the memory control circuit is configured to select one of the memory blocks for storing the data according to the address signal.

3. The semiconductor device according to claim 1, wherein the ROM is at least one of a mask ROM, an organic memory, and an EEPROM.

4. The semiconductor device according to claim 1, wherein the RAM is at least one of a SRAM and a DRAM.

5. The semiconductor device according to claim 1, wherein the RAM comprises a transistor comprising a metal oxide semiconductor.

6. A semiconductor device comprising:
an arithmetic processing circuit;
a ROM;
a RAM; and
a memory control circuit,
wherein the arithmetic processing circuit is configured to execute a program to generate processing data and then terminate the program, wherein the ROM is configured to store the program, the program having stack analysis means and optimization means, wherein the RAM comprises a plurality of memory blocks, a border being defined between adjacent ones of the memory blocks wherein the processing data is divided into a plurality of stacks to be stored in the RAM, wherein the stack analysis means analyzes the stacks to obtain an analysis result that identifies a status of use of the stacks, including operations writing to the stacks, operations reading from the stacks, identification of contiguous writing stacks that do not cross the border between adjacent memory blocks, and identification of contiguous writing stacks that do cross the border between adjacent memory blocks, and provides a stack pointer, wherein the optimization means reads the analysis result and performs optimization of the processing data by identifying stacks that are written to but are not read until after the program terminates, reusing the identified stacks for rewriting of additional processing data to reduce the number of stacks used for performing writing of the data, and rearranging contiguous stacks that cross the border between adjacent memory blocks so that writing of such contiguous stacks occurs between borders of the memory blocks so that power consumption of the RAM can be reduced, wherein the memory control circuit stores the optimized stacks in the memory blocks, and wherein the program is optimized using RAM design information comprising the number of memory blocks included in the RAM and a capacity of each of the memory blocks included in the RAM.

7. The semiconductor device according to claim 6,
wherein the arithmetic processing circuit is configured to generate an address signal to store the processing data into the RAM, wherein the memory control circuit is configured to select one of the memory blocks for storing the processing data according to the address signal.

8. The semiconductor device according to claim 6, wherein the ROM is at least one of a mask ROM, an organic memory, and an EEPROM.

9. The semiconductor device according to claim 6, wherein the RAM is at least one of a SRAM and a DRAM.

10. The semiconductor device according to claim 6, wherein the RAM comprises a transistor comprising a metal oxide semiconductor.

* * * * *

UNITED STATES PATENT AND TRADEMARK OFFICE
CERTIFICATE OF CORRECTION

| | | |
|---|---|---|
| PATENT NO. | : 8,429,634 B2 | Page 1 of 1 |
| APPLICATION NO. | : 11/878518 | |
| DATED | : April 23, 2013 | |
| INVENTOR(S) | : Dembo et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1506 days.

Signed and Sealed this
Sixteenth Day of December, 2014

Michelle K. Lee
*Deputy Director of the United States Patent and Trademark Office*